United States Patent [19]

De Jager et al.

[11] 3,845,390

[45] Oct. 29, 1974

[54] SYSTEM FOR AUTOMATIC EQUALIZATION

[75] Inventors: Frank De Jager; Peter Van der Wurf; Petrus Josephus Van Gerwen; Robert Johannes Sluyter; Wilfred Andre Maria Snijders, all of Emmasingel, Eindhoven, Netherlands

[73] Assignee: U.S. Philips Corporation, New York, N.Y.

[22] Filed: Nov. 21, 1972

[21] Appl. No.: 308,318

[30] Foreign Application Priority Data

| | | |
|---|---|---|
| Dec. 1, 1971 | Netherlands | 7116476 |
| Oct. 4, 1972 | Netherlands | 7213388 |

[52] U.S. Cl. ..................................... 325/42, 333/18
[51] Int. Cl. ............................................ H03h 7/36
[58] Field of Search ........ 325/42, 65; 333/17 R, 18; 178/69 R; 324/77 R, 77 E, 77 F, 77 B

[56] References Cited

UNITED STATES PATENTS

| | | | |
|---|---|---|---|
| 2,102,138 | 12/1937 | Strieby | 333/18 |
| 2,805,398 | 9/1957 | Albersheim | 325/65 |
| 3,003,030 | 10/1961 | Oshima et al. | 333/17 |
| 3,283,063 | 11/1966 | Kawa Shima et al. | 325/65 |
| 3,366,895 | 1/1968 | Lucky | 338/18 |

*Primary Examiner*—Benedict V. Safourek
*Attorney, Agent, or Firm*—Frank R. Trifari; Simon L. Cohen

[57] ABSTRACT

An automatic phase and amplitude equalization is commonly brought about in the time domain by means of an iterative process. According to the invention this purpose is, however, realized by means of an automatic spectrum analysis of the receive signal at discrete frequencies.

This provides the parameters for an exact equalization of the phase and amplitude characteristics which may be adjusted by forward control while using a local phase and amplitude reference source.

Stability is then ensured under all circumstances. It can be provied that by using sub-bandpass filters having a delay circuit and using a matrix of weighting networks all required parameters can be obtained in a time interval corresponding to the transient phenomena of one distorted pulse which leads to a minimum acquisition period.

Not only are the stability and the minimum acquisition period alway ensured, but this system is also distinguished by the combination of a large number of advantages particularly a simple structure using a slight number of elements, suitable for integration in a semiconductor body, adaptation to the properties of the transmission path, universality in the use of automatic equalization systems of different types and flexibility in the use of different types of signals.

74 Claims, 40 Drawing Figures

SYSTEM FOR AUTOMATIC EQUALIZATION

The invention relates to a system for automatic equalization of the transmission characteristic constituted by the amplitude-versus-frequency characteristic and the phase-versus-frequency characteristic of a transmission band associated with a transmission path utilized for the transmission of information signals. Such systems for automatic equalization are used, for example, in the transmission of facsimile, television, telegraphy; synchronous pulse signals and the like.

Due to the increase of the transmission rate of synchronous pulse signals equalization equipment of this kind has lately been in demand for the correction of pulse distortions caused by the transmission characteristic of the transmission path because particularly in the case of increasing the transmission rate the deviations from the desired course of these transmission characteristics affect in an increasing extent in the Nyquist criteria and hence in the resolution of the signal elements. Particularly for an optimum resolution of the signal elements the shape of the transmission characteristics, according to the Nyquist criteria has to fulfil the conditions that at the receiver end the values of the signal elements in the center of the pulse intervals and/or the distances between the transitions of the signal elements are maintained. Dependent on the nature and character of the transmission path the automatic equalization systems it is possible to distinguish between two types, namely the automatic equalization systems of the pre-set type for transmission paths having substantially constant transmission characteristics during signal transmission, for example, fixed connections, in which the automatic equalization system is adjusted by means of a test signal transmitted prior to signal transmission, and automatic equalization systems of the continuously variable or adaptive type for transmission paths having a variable transmission characteristic during signal transmission, for example, switched connections or radio connections in which the adjustment is continuously corrected during signal transmission. If necessary, the two types of automatic equalization systems may be combined.

There have lately been proposals relating to the structure of such automatic equalization systems, which proposals are essentially based on the same principle as has also been concluded in recent literature. More particularly such an automatic equalization system is provided with an adjustable equalization network in which the shape of the output signal as viewed in a time diagram is compared with an adjusting criterion in a test circuit for producing a control voltage which is applied to a control device for the adjustment of the adjustable equalization network, for example, the shape of the eye pattern of the equalized pulses, the correct transition instants of the signal elements in the equalized pulses and the like may be utilized as an adjusting criterion. According to common practice the adjustable equalization network is characterized by time functions and comprises a delay circuit provided with a plurality of taps connected to adjustable attenuation networks which are controlled by the control device. The output signal is obtained from the automatic equalization system by combination of the output signals from the adjustable attenuation networks.

In this automatic equalization system the desired adjustment is achieved in a stepwise or iterative manner, particularly after determination of the deviation of the output signal of the automatic equalization system from the adjusting criterion an adjustment of the said adjustable attenuation networks by the control device occurs whereafter the process described is repeated every time until the imposed adjusting criterion is satisfied. These automatic equalization systems may be used both at the receiver end and at the transmitter end and in the latter case, which is known under the name of pre-equalization system, a control signal is returned for adjustment from the receiver end through a return circuit to the transmitter end.

In practice satisfactory results were achieved with the system described, but under special circumstances difficulties were still found to occur. On the one hand a relatively large adjusting period or acquisition period is required in this known equalization system due to the iterative adjusting process which gives rise inter alia to difficulties when switching on the pulse connections, as well as in the case of signaling rapid variations in the transmission characteristics of the transmission path as may occur in the case of rapid fading phenomena in radio cmmunications. On the other hand it was found that the adjustment of the desired equalization characteristic was not achieved in the case of transmission paths of a very poor quality having a very strong pulse distortion, which means that the automatic equalization system is unstable in the case of very strong pulse distortions.

An object of the invention is to provide a different conception of an automatic equalization system of the kind described in the preamble in which the following advantages are jointly realized at the same time. 1. Minimum acquisition period because all data are simultaneously available for the desired equalization. 2. Stable operation under all circumstances even in transmission paths of very poor quality. 3. Suitable for adaptation to the properties of the transmission path so that a considerable simplification in structure can be realized. 4. Universality in the use of automatic equalization systems of different types, for example, equalization systems of the preset and adaptive type but also automatic equalization systems of the pre-equalization type. 5. Flexibility to operate on different types of signals, for example, television, facsimile, telegraphy, synchronous pulse signals and the like. 6. Suitable for construction in digital techniques and integration in a semiconductor body.

The automatic equalization system according to the invention is characterized by the combination of the following measures:

a. a frequency analyzer for splitting up the transmission band into a number of frequency sub-bands, comprising a delay circuit and a plurality of parallel arranged output channels each incorporating a sub-bandpass filter. The sub-bandpass filters are constituted by connecting each of the output channels through a plurality of weighting networks to points having a different time delay in the delay circuit, while the frequency-split frequency sub-bands are derived from the parallel arranged output channels;

b. the sub-bandpass filters in the output channels of the frequency analyzer for the frequency components of the information signal jointly constitute an uninterrupted pass region without reject-areas;

c. different output channels of the frequency analyzer incorporate a phase and amplitude control circuit which are controlled by a control voltage;

d. a control voltage generator for generating the control voltages for controlling the amplitude and phase control circuits incorporated in the output channels of the frequency analyzer, The control voltage generator comprises a plurality of comparators fed by at least a spectrum component of a received adjusting signal which is split up into its frequency components in the frequency analyzer and a local reference source for the phase and amplitude reference of the adjusting signal split up into its different frequency components, the control voltage for adjustment of the different phase and amplitude control circuits being derived from the output of the comparators; and e. a system output circuit constituted by a combination device connected to the phase and amplitude control circuits in the output channels of the frequency analyzer.

The invention and its advantages will now be described in detail with reference to the Figures.

FIG. 1 shows a transmitter for binary synchronous pulse signals and FIG. 2 shows the associated receiver provided with an automatic equalization system according to the invention, FIG. 2a shows in greater detail a component used in the receiver according to FIG. 2;

FIGS. 3, 5, 7 and 8 show some frequency diagrams to explain the transmitter and receiver shown in FIGS. 1 and 2, while FIGS. 4 and 6 show some time diagrams for this purpose;

FIG. 16a shows a component used in FIG. 16, while

FIGS. 22 and 23 show systems according to the invention accounting for the transmitted signal as such and FIG. 23a shows a modification of a component used in FIG. 23, while

FIG. 25 and FIG. 26 show systems according to the invention suitable for adaptive equalization while

Figure 25:
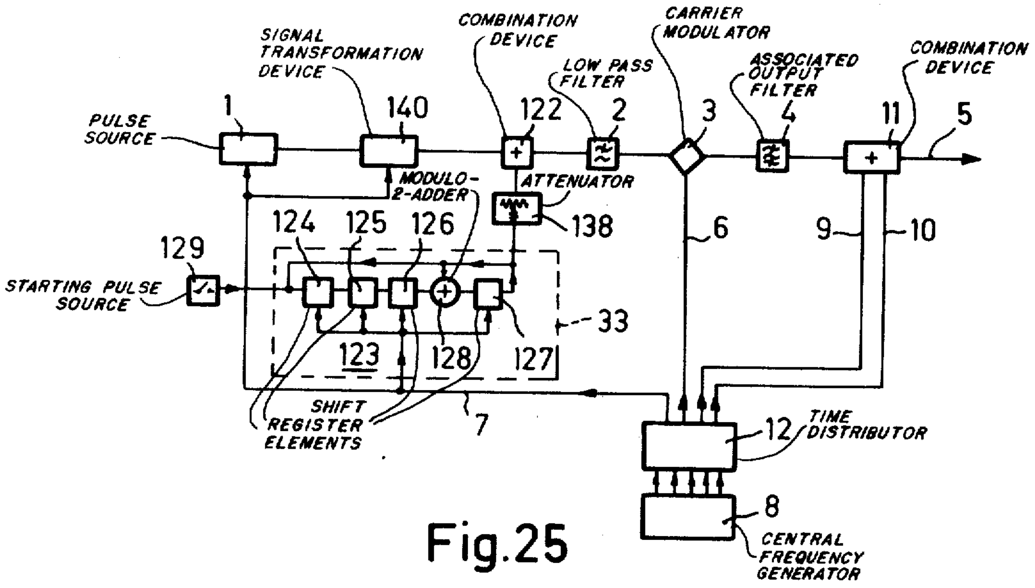
Figure 26:
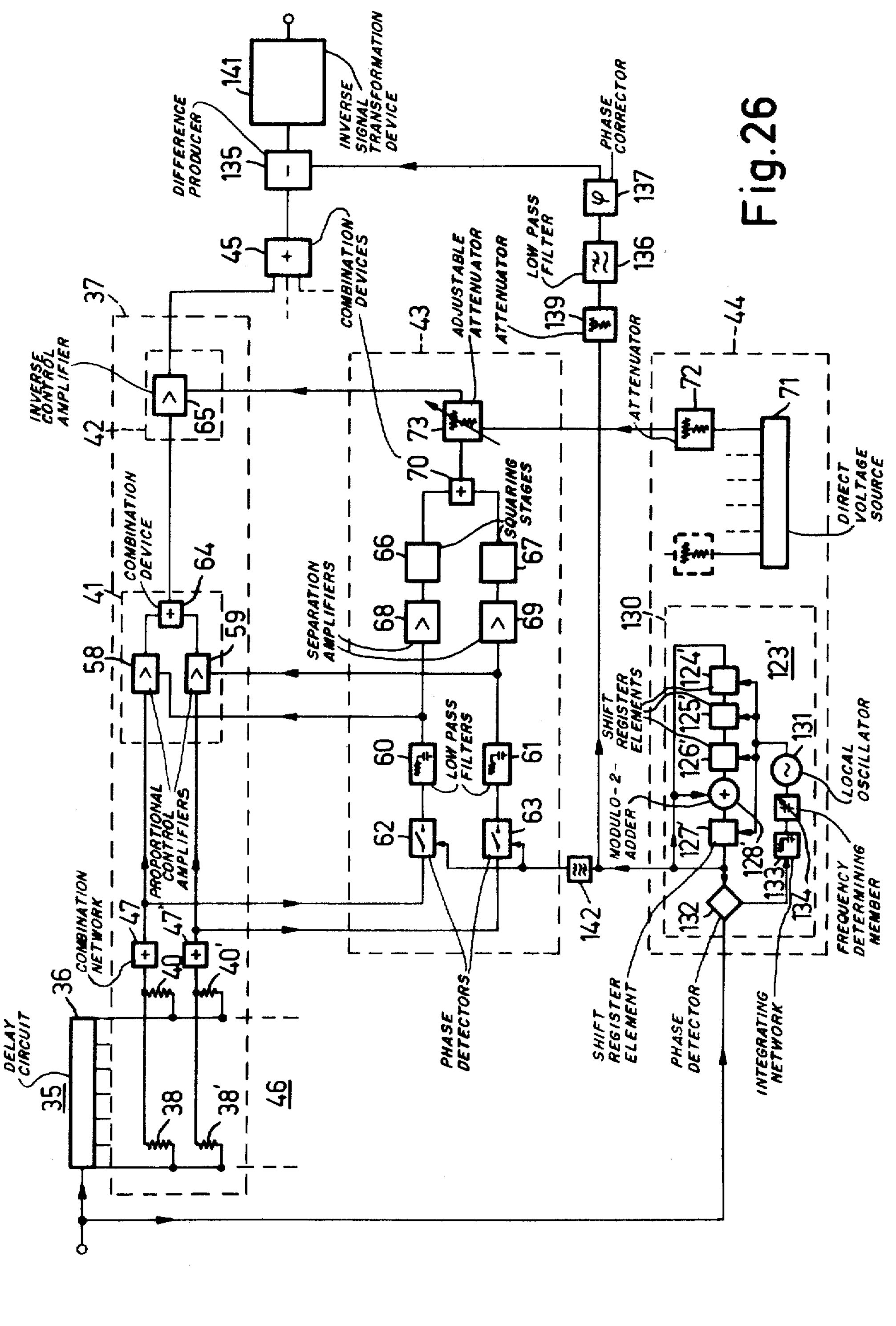
Figure 28:
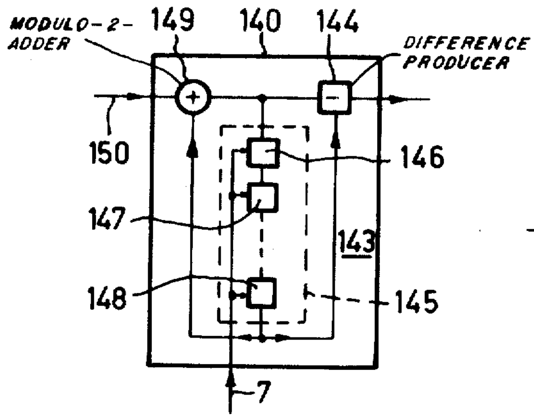
Figure 29:
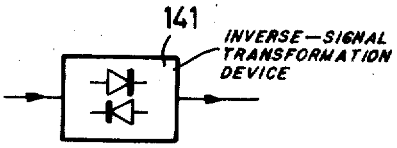
Figure 30:
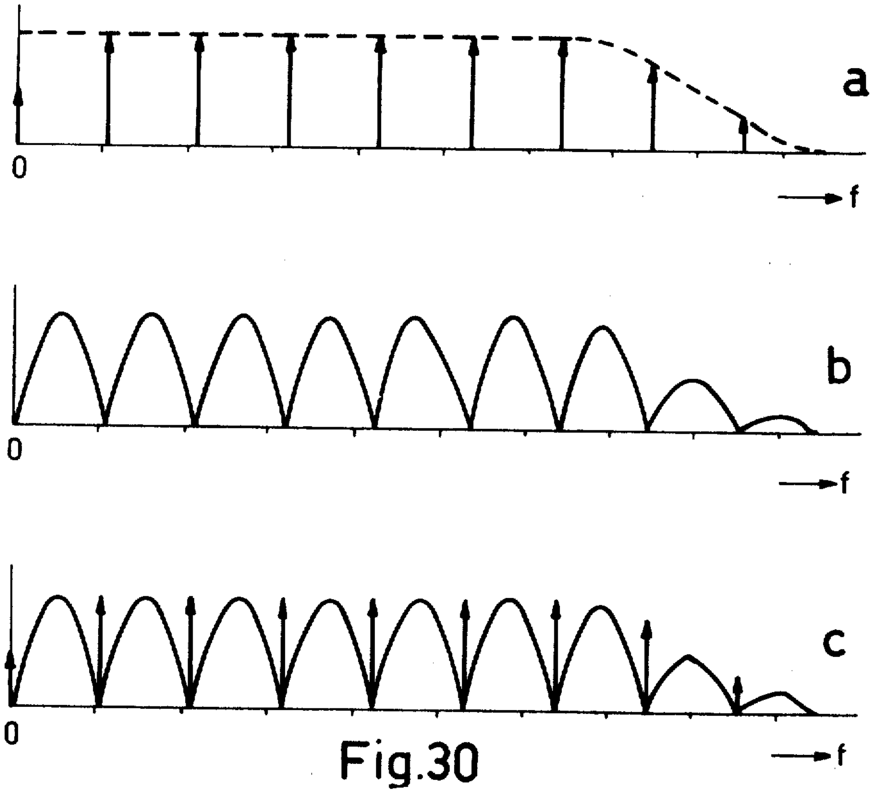
Figure 31:
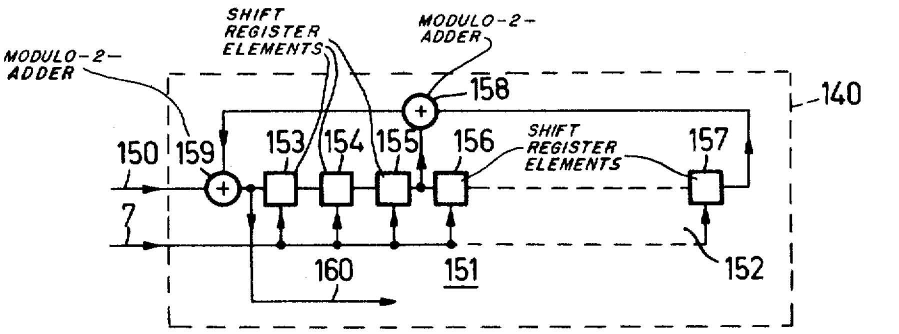
Figure 32:
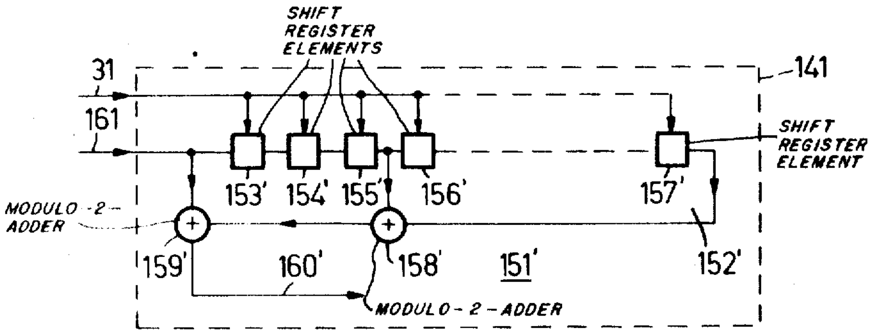
Figure 33:
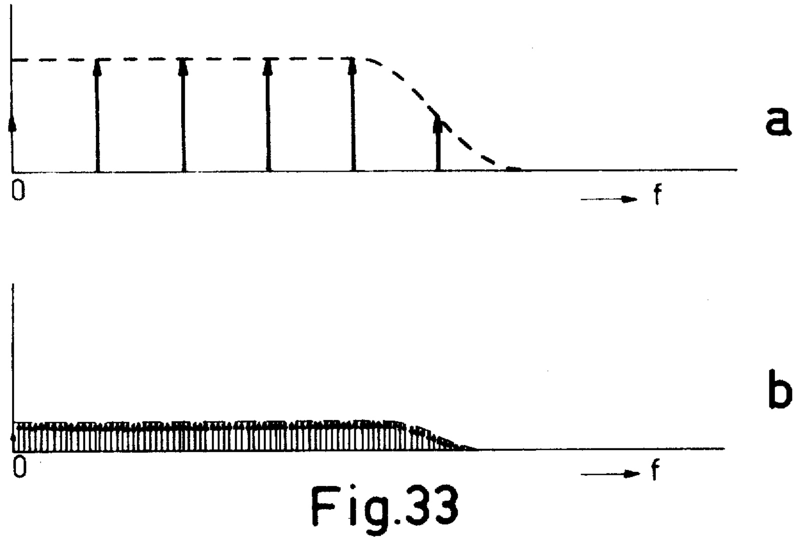

FIGS. 28, 29 and 31, 32 show detailed embodiments of components in the systems according to FIGS. 25 and 26, while FIGS. 30 and 33 show the associated frequency diagrams.

Figure 34:
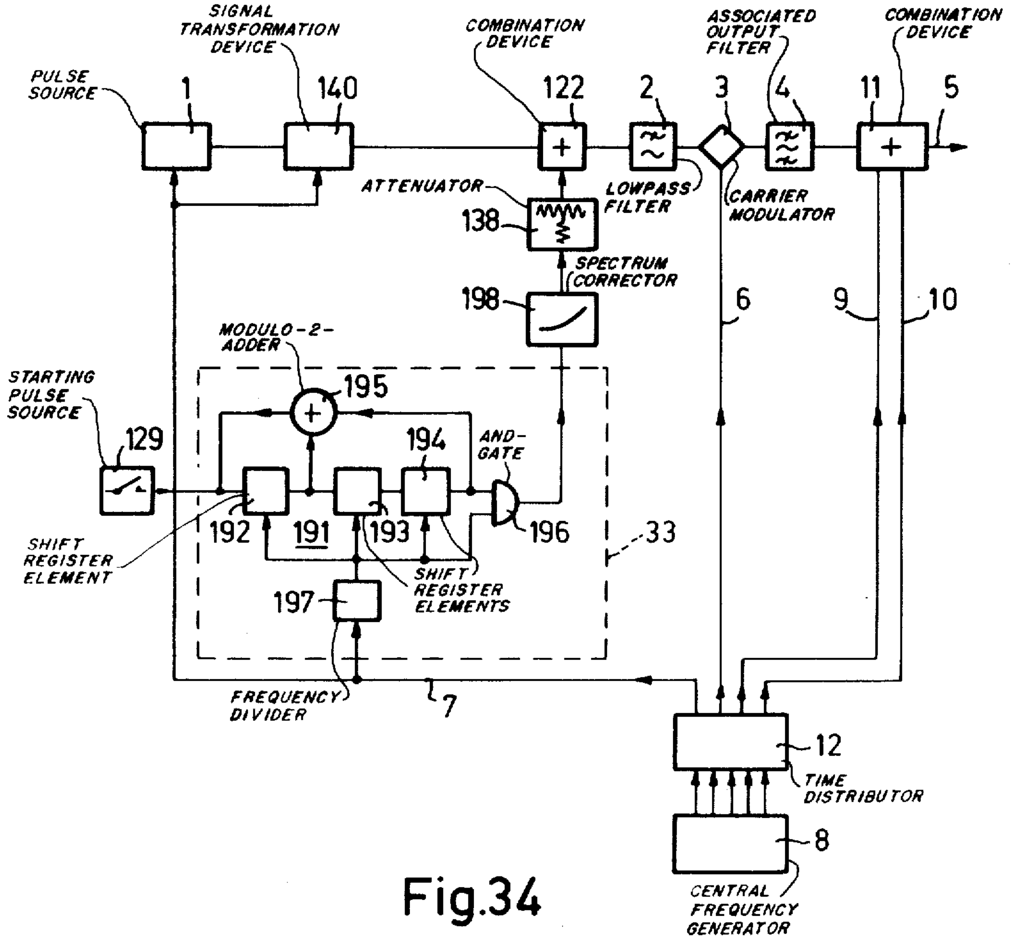
Figure 35:
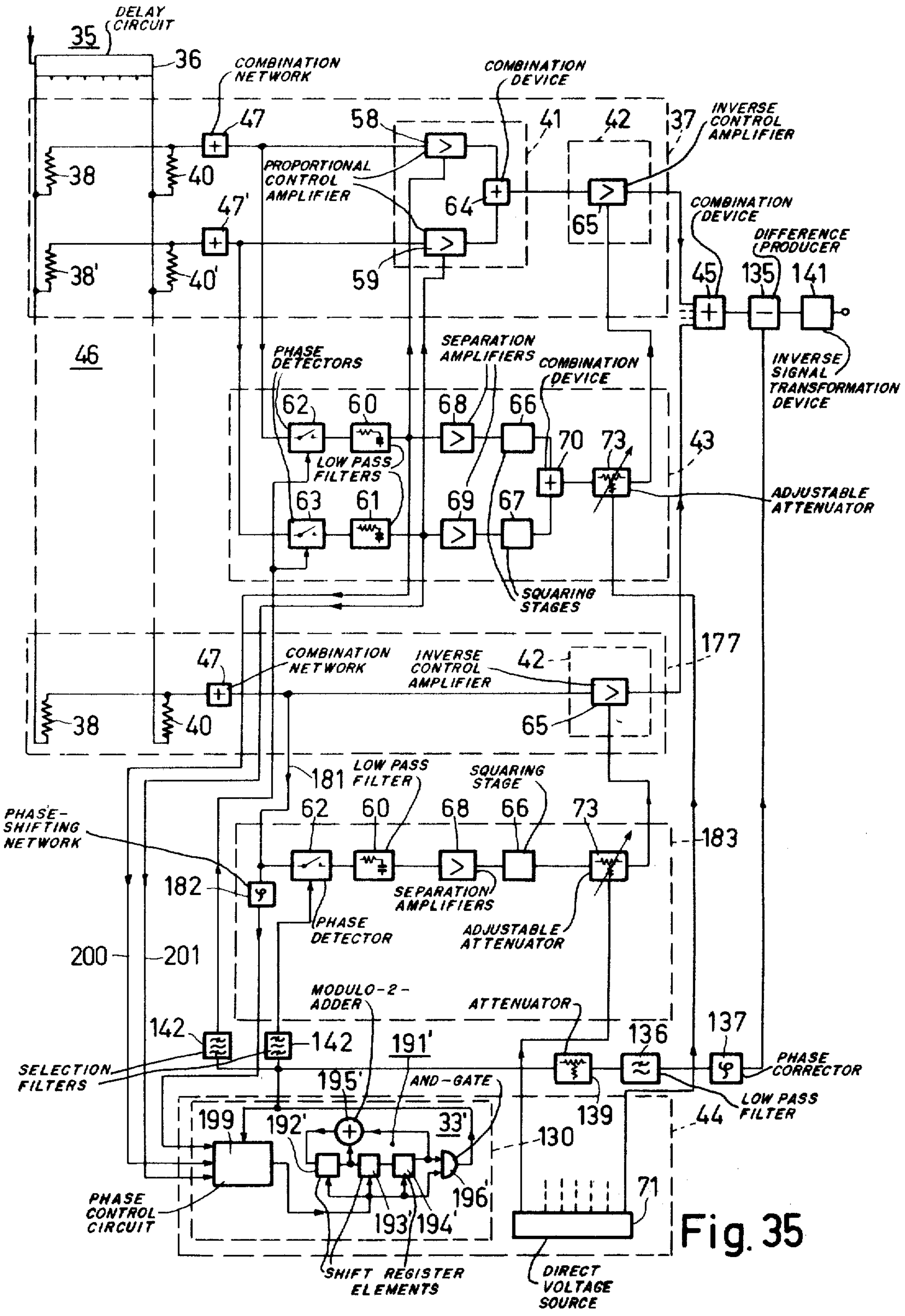
Figure 36:
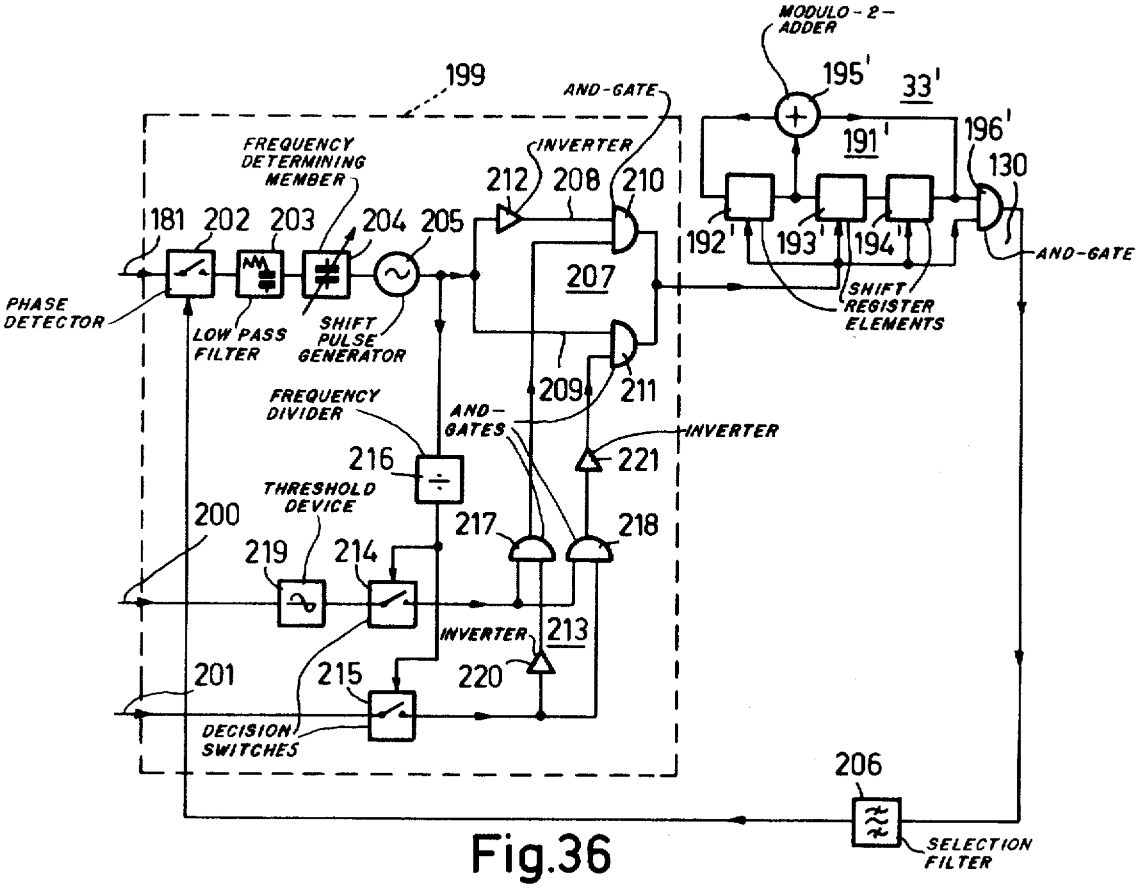
Figure 37:
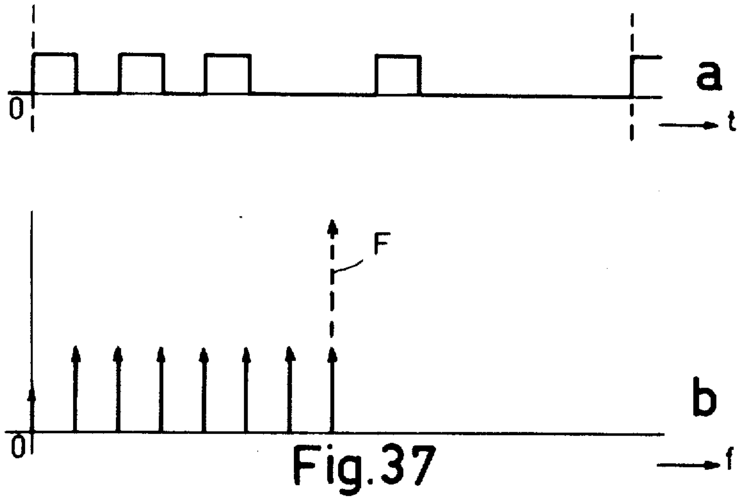

FIGS. 34 and 35 show very advantageous embodiments of a system according to the invention adapted for adaptive equalization in which FIG. 36 shows one element of the system shown in FIG. 35 in greater detail and FIG. 37 shows some diagrams for the purpose of explanation.

Figure 1:
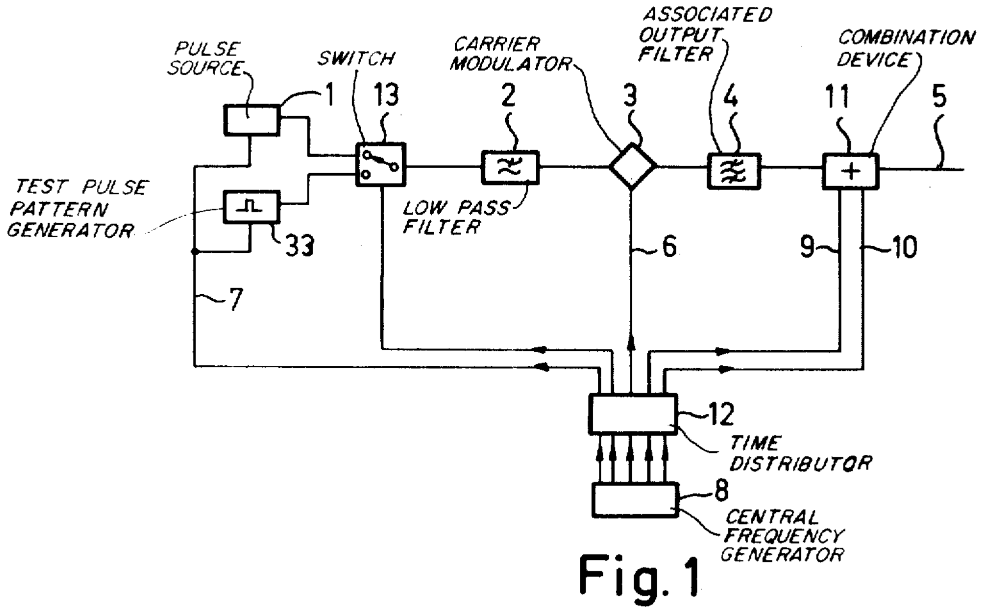
Figures 2, 2A:
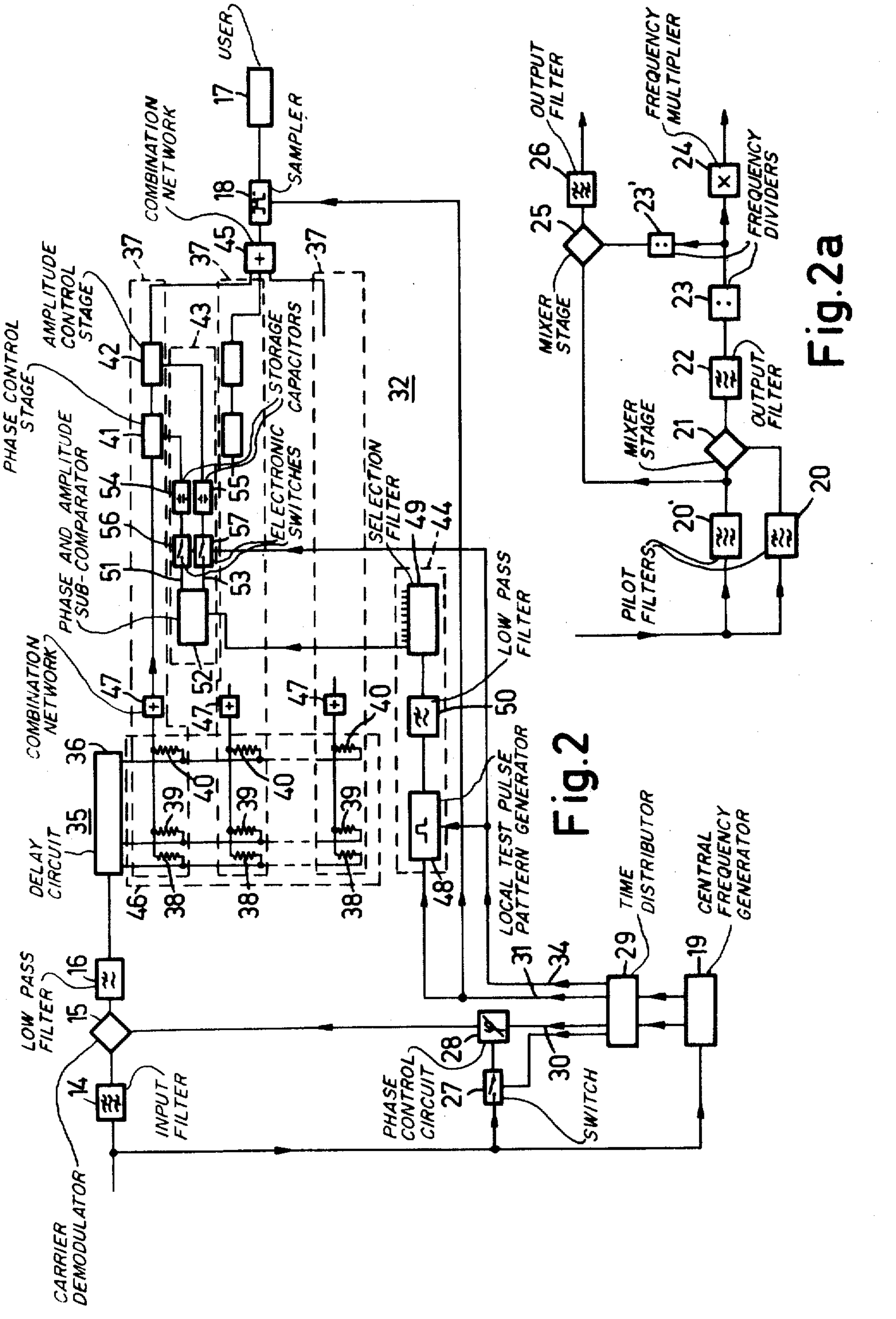

FIGS. 1 and 2 shows a transmitter and a receiver, respectively, of a transmission system according to the invention for the transmission of binary pulse signals in a transmission channel of, for example, 300–3,400 Hz, the receiver being provided with a system for automatic equalization of the transmission characteristic of the transmission path constituted by the amplitude-versus-frequency characteristic and the phase-versus-frequency characteristic.

At the transmitter end the synchronous binary pulse signals are derived from a pulse source 1 at a transmission rate of, for example, 3,2 k bit/sec and applied through a lowpass filter 2 having a cut-off frequency of 1.6 kHz to a carrier modulator 3 with an associated output filter 4 for the transmission of pulse signals along a line 5 by means of single sideband modulation having a partially suppressed second sideband. A carrier oscillation of, for example, 2.6 kHz being applied to the carrier modulator 3 through carrier lead 6. The instants of occurrence of the pulse signals from pulse source 1 coincide with a series of equidistant clock pulses of, for example, 3,2 kHz which control the pulse source 1 via lead 7.

Both the carrier oscillation and the clock pulses are derived from a central frequency generator 8 from which two pilot oscillations of 0.6 and 3 kHz are derived through pilot frequency leads 9, 10. These pilot oscillations are combined with the output signals from the carrier modulator 3 in a combination device 11 and are thus transmitted for the local recovery of the carrier and the clock frequency at the receiver end. A time distributor 12 is provided at the output of the central frequency generator 8. Upon switching on of the transmitter this time distribution is activated to successively connect pilot frequency leads 9, 10, carrier lead 6 and clock frequency lead 7 to the central frequency generator 8 prior to the operation of a switch 13 connecting pulse source 1 to the carrier modulator 3 so that the cooperating elements at the receiver end for the reception of the pulse signals will have sufficient time for correct adjustment.

Figure 3:
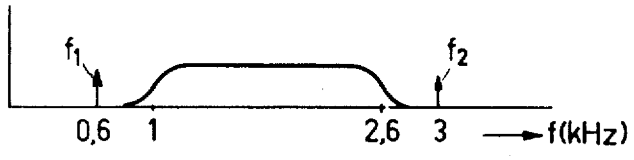

FIG. 3 shows a frequency diagram of the signals transmitted by the transmitter of FIG. 1 which signals are formed by pulse signals modulated in the band of from 0.7 to 2.9 kHz on a carrier of 2.6 kHz, as well as the two pilot frequencies of 0.6 and 3 kHz. These two pilot frequencies are denoted in the Figure by the arrows $f_1$ and $f_2$.

FIG. 2 shows the receiver co-operating with the transmitter. This receiver comprises an input filter 14, a carrier demodulator 15 controlled by a local carrier and an associated output filter 16 in the form of a lowpass filter, the demodulated pulse signals being applied through a sampler 18 to a user 17 for further processing. Sampler 18 is controlled by locally generated clock pulses. In order to generate the local carrier and the local clock pulses the receiver includes a central frequency generator 19 which is controlled by the two pilot signals. The central frequency generator 19 is built up in, for example, the manner shown in FIG. 2a. Particularly after separation of the two received pilot frequencies of 0.6 and 3 kHz in pilot filters 20 and 20' the difference frequency of 2.4 kHz is produced from these pilot frequencies by mixing in a mixer stage 21 with output filter 22. The clock frequency of 3.2 kHz is obtained by frequency division of the difference frequency of 2.4 kHz by a factor of 3 in frequency divider 23 and a subsequent frequency multiplication by a factor of 4 in a frequency multiplier 24. The carrier frequency of 2.6 kHz being produced by difference production in a mixer stage 25 with output filter 26 of the selected pilot frequency of 3 kHz and a frequency of 0.4 kHz which is obtained by frequency division dividing the output frequency of 0.8 kHz from frequency divider 23 by a factor of 2 in a frequency divider 23'.

Likewise as the transmitter, the receiver is provided with a time distributor 29 at the output of the central frequency generator 19 which on reception of the two pilot signals, for example, in the case of occurrence of the difference frequency of 2.4 kHz is rendered operative while for the reception of the modulated pulse signals from the transmitter the local carrier and the local clock pulses are consecutively applied through carrier lead 30 and clock frequency lead 31 to the demodulator 15 and sampler 18. In this case carrier lead 30 is provided in known manner with a phase control circuit 28 for correcting the phase of the locally generated carrier in accordance with the phase of the carrier which is transmitted at the commencement of transmission and which is applied for a short period of time through switch 27 to the phase control circuit 28 whose phase is maintained after switch 27 is opened. The local carrier and clock pulses are thus already present at the carrier demodulator 15 and sampler 18 prior to the reception of the modulated pulse signals.

In order to obtain optimum resolution of the binary pulses consisting of "1" and "0" pulses in the sampler 18, the transmission characteristic, constituted by the amplitude-versus-frequency characteristic and the phase-versus-frequency characteristic of the transmission path, is to satisfy the condition according to Nyquist that for the received pulse signals in the sampler 18 the signal values in the center of the pulse intervals and/or the distances between the transitions of the amplitude values are maintained.

Figure 4:
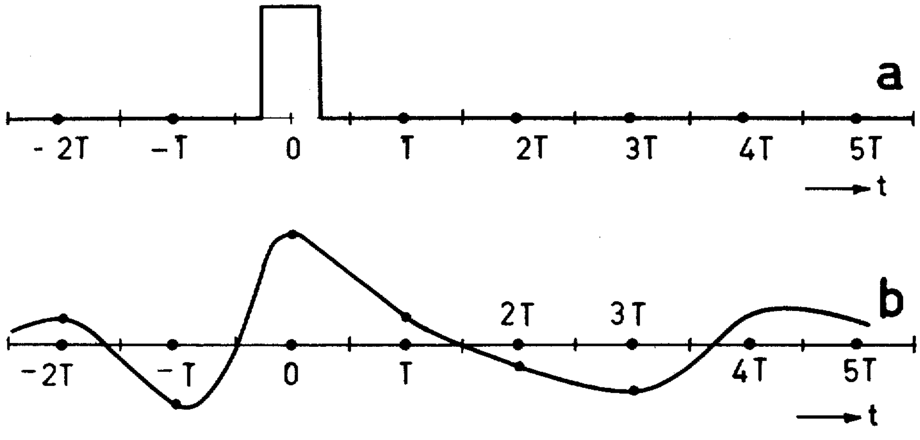

FIG. 4 shows some time diagrams to explain the phenomena occurring in the pulse transmission system described so far.

FIG. 4*a* shows a single "1" pulse transmitted by pulse source 1 in the transmitter of FIG. 1, whose center of the pulse interval is denoted by the instant 0 and whose centers of the pulse intervals preceding and following the "1" are denoted by the instants ± T, ± 2T, ± 3T. The centers of the pulse intervals at the receiver end correspond to the sampling instants in sampler 18.

When the "1" pulse shown in FIG. 4*a* originating from pulse source 1 is transmitted at the transmitter end through the transmission path constituted by lowpass filter 2, carrier modulator 3, output filter 4, combination device 11, lead 5, input filter 14, carrier demodulator 15, lowpass filter 16 to the sampler 18, the transmitted "1" pulse will occur distorted at the output of the lowpass filter 16 due to the deviations from the Nyquist conditions of the transmission characteristic given by the transmission path which results in the reduction of the pulse resolution in the sampler 18. When, for example, the distorted pulse has the course shown in FIG. 4*b* at the output of lowpass filter 16, the occurring transient phenomena will adversely affect the pulse resolution in sampler 18 because these transient phenomena have a considerable value at the sampling instants ± T, ± 2T, ± 3T.

To improve the pulse resolution an automatic equalization system 32 of the preset type is arranged between lowpass filter 16 and sampler 18 in the receiver shown in FIG. 2. During the period of time preceding the transmission of the information pulses from the pulse source 1 the adjustment of the automatic equalization system 32 is effected by means of a test pulse pattern as an adjusting signal. For this purpose the transmitter of FIG. 1 is provided with a test pulse pattern generator 33 controlled through clock pulse lead 7 by the clock pulses, which generator 33 is to this end connected to carrier modulator 3 with the aid of the switch 13 controlled by time distributor 12 prior to the transmission of the data pulses through the lowpass filter 2.

In the receiver the adjustment of the automatic equalization system 32 is effected during this period of time, which adjustment in the known systems of this kind is generally effected by comparison of the variation with time of the adjusting signal and the shape of the received test pulse patterns occurring at the output of the automatic equalization system 32 with the adjusting criteria, for example, the transition instants of the transient phenomena, the magnitude of the eye opening in the eye pattern and the like, the deviations of the course in time of the test pulse patterns relative to the relevant adjusting criterion being reduced by an iterative or stepwise adjustment until the adjusting criterion is satisfied. After adjustment of the automatic equalization system 32 making use of the test pulse patterns as adjusting signal each further adjustment of the automatic equalization system 32 is interrupted by the time distributor 29 through control lead 34 and the information pulses from pulse source 1 can be transmitted.

In these known automatic equalization systems 32 very long adjusting or acquisition times are found to occur in the case of a very poor quality of the phase-versus-frequency characteristic and of the amplitude-versus-frequency characteristic of the transmission path. It may even occur in such a case that the adjustment of the desired equalization is not achieved at all which means that the automatic equalization system has become unstable.

According to the invention instabilities are prevented under all circumstances together with a considerable reduction in the acquisition times by a novel conception in the embodiment of the automatic equalization system consisting in that the system for automatic equalization is characterized by the combination of the following features:

a. a frequency analyzer 35 for splitting up the transmission band into a plurality of frequency sub-bands comprising a delay circuit 36 and a plurality of parallel arranged output channels 37, each output channel incorporating a sub-bandpass filter, which sub-bandpass filters are constituted by connecting each of the output channels through a plurality of weighting networks 38, 39 . . . 40 to points having a different time delay in the delay circuit 36, while the frequency-split frequency sub-bands are derived from the parallel-arranged output channels;

b. the sub-bandpass filters in the output channels 37 of the frequency analyzer 35 for the frequency components of the information signal jointly constitute an uninterrupted pass region without reject-areas;

c. a phase and amplitude control circuit 41, 42 controlled by a control voltage is incorporated in different output channels 37 of the frequency analyzer;

d. a control voltage generator for generating the control voltages for controlling the amplitude and phase control circuits 41, 42 incorporated in the output channels 37 of the frequency analyser 35, which control voltage generator comprises a plurality of comparators 43 which are fed by at least one spectrum component of a received adjusting signal which is split up into its frequency components in the frequency analyzer 35, and a local reference source 44 for the phase and amplitude reference of the adjusting signal split up into its different frequency components, while the control voltages for adjustment of the different phase and amplitude control circuits 41, 42 are derived from the outputs of the comparators 43; and e. a system output circuit constituted by a combination device 45 connected to the phase and amplitude control circuits 41, 42 in the output channels 37 of the frequency analyzer.

For the sake of simplicity corresponding elements in different output channels 37 of the frequency analyzer 35 and the associated phase and amplitude control circuits 41, 42 as well as the comparators 43 are denoted by the same reference numerals in the Figure because these components are built up in the same manner.

In the embodiment shown the delay circuit 36 of the frequency analyzer 35 is constituted by an analog delay circuit, for example, a delay line composed of inductors and capacitors, a capacitor shift register and the like provided with delay elements each having a time delay $s$ of not more than one clock period T. In this case the weighting networks 38, 39, 40 in the form of attenuation networks are incorporated in a matrix 46, in which the ends of each delay element are connected to the weighting networks 38, 39, 40 located in a column of the matrix 46, while sub-bandpass filters in the output channels 37 of the frequency analyzer 35 are constituted by connecting the attenuation networks 38, 39, 40 incorporated in a row of the matrix to a combination network 47, the frequency-split sub-bands being derived from the combination networks 47.

In the case of suitable proportioning of the transmission factors of the weighting networks 38, 39, 40 constituted by the attenuation networks, the split-up of the transmission bands into the successive sub-bandpass filters can be realized with the described frequency analyzer 35 in accordance with the desired amplitude-versus-frequency characteristic and phase-versus-frequency characteristic in a surprisingly simple manner and with a great mutual freedom as will now be mathematically explained. If the number of delay elements of the delay circuit is 2M and if the attenuation networks 38, 39, 40 of a given sub-bandpass filter are rendered pairwise equal starting from the ends of the delay circuit 36, and provided their transfer coefficients $C_p$ satisfy:

$$C_{-p} = C_p \text{ with } p = 1, 2, \ldots M \quad (1)$$

a transfer function is obtained whose amplitude-versus-frequency characteristic has the shape $\psi(\omega)$:

$$\psi(\omega) = C_0 + \sum_{p=1}^{M} 2C_p \cos p\omega s \quad (2)$$

and whose phase-versus-frequency characteristic $\phi(\omega)$ has an exact linear course in accordance with:

$$\phi(\omega) = M\omega s \quad (3)$$

The amplitude-versus-frequency characteristic thus constitutes a Fourier series developed in cosine terms whose periodicity $\Omega$ is given by:

$$\Omega = 2\pi/s \quad (4)$$

If a given amplitude-versus-frequency characteristic $\psi_0(\omega)$ is to be realized, the coefficients $C_p$ in the Fourier series may be determined with the aid of the relation:

$$C_p = (1/\Omega) \int_0^{\Omega} \psi_0(\omega) \cdot \cos p\omega s d\omega \quad (5)$$

The shape of the amplitude-versus-frequency characteristic is completely determined thereby, but the periodical behavior of the Fourier series results in the desired amplitude-versus-frequency characteristic being repeated with a periodicity $\Omega = 2\pi/s$, hence at sufficiently small values of the delay time $s$ of the delay elements the frequency distance between the desired and the next additional pass region may be sufficiently large to suppress the additional pass regions by means of a simple suppression filter without noticeably influencing the amplitude-versus-frequency characteristic and the linear phase-versus-frequency characteristic in the desired pass region. For example, in the embodiment shown the delay time $s$ has been rendered equal to half a clock period T.

An essential extension of the uses is obtained by effecting a phase inversion of the signals derived from the delay elements by using phase inverters so that it becomes possible to realize negative coefficients $C_p$ in the Fourier series. Furthermore a Fourier series developed in sine terms can be realized at a linear phase-frequency characteristic. To this end the attenuation networks 38, 39, 40 again starting from the ends of the delay circuit 36 have been rendered pairwise equal but the central attenuation network has a transfer coefficient $C_0$ which is equal to zero and the phase-inverted signal is applied to the attenuation networks following this attenuation network so that for M shift register elements the transfer coefficients satisfy:

$$C_{-p} = -C_p \text{ with } p = 1, 2, \ldots M \quad (6)$$

Consequently, there applies for the transfer function that:

$$\psi(\omega) = \sum_{p=1}^{M} 2C_p \sin p\omega s \quad (7)$$

$$\phi(\omega) = -M\omega s + \pi/2 \quad (8)$$

The linear phase-versus-frequency characteristic $\phi(\omega)$ according to (8) exhibits a phase shift $\pi/2$ relative to $\phi(\omega)$ according to (3). The coefficients $C_p$ in the Fourier series can now be determined with the aid of the relation:

$$C_p = (1/\Omega) \int_0^{\Omega} \psi_0(\omega) \sin p\omega s \cdot d\omega \quad (9)$$

In addition to transfer functions having a linear phase-versus-frequency characteristic, transfer functions having non-linear phase-versus-frequency characteristics can also be realized to which purpose the relevant transfer function is written in complex form. In this case use is made of the two Fourier series (2) and (7), namely of the cosine series (2) for the real part and of the sine series (7) for the imaginary part of the transfer function, the transfer coefficient of each attenuation network 38, 39, 40 being constituted by the algebraic sum of the relevant transfer coefficient $C_p$ according to (5) and the relevant transfer coefficient $C_p$ according to (9).

In the manner described the frequency-split sub-bands of the transmission band are derived from the combination networks 47 by suitable proportioning of the attenuation networks 38, 39, 40 in the matrix 46, for example, the sub-bands of 0 – 100 Hz, 100 – 300 Hz, . . . 1,700 – 1,900 Hz which are applied for further processing to the combination network 45 after a phase and amplitude control in the phase and amplitude control circuits each provided with a phase control stage 41 and an amplitude control stage 42.

To generate the required control voltage for the phase and amplitude control stages 41, 42 in the comparators 43 the phase and amplitude of the frequency components of the adjusting signal split up in frequency analyzer 35 are compared with the phase and amplitude references originating from reference source 44. Reference source 44 comprises a local test pulse pattern generator 48 corresponding to the test pulse pattern generator 33 at the transmitter end, a selection filter 49 for the selection of the different frequency components of the local test pulse pattern and a lowpass filter 50 incorporated between the local test pulse pattern generator 48 and selection filter 49 and having a Nyquist characteristic, that is to say, a lowpass filter 50 whose attenuation slope exhibits a radial symmetry relative to the 6 dB attenuation point at the Nyquist frequency of half the clock frequency In this case the local test pulse pattern generator 48 is synchronized through lead 31 by the clock frequency generated in the central frequency generator 19, for example, the local test pulse pattern generator 48 provides a "1" pulse after 16 clock periods so that the frequency components of the test pulse pattern are 0, 200, 400, . . . , Hz, respectively. The control voltages for the phase control stages 41 occur at the outputs 51 of the phase and amplitude sub-comparators 52 in the comparators 43 and the control voltages for the amplitude control stages 42 occur at the outputs 53, which control voltages are applied to a storage network in the form of a storage capacitor 54, 55 through an electronic switch 56, 57 which is opened by a switching signal from time distributor 29 after the adjusting period preceding the transmission of the information pulses.

During transmission of the information pulses the control voltages in the storage capacitors 54, 55 are maintained and hence the phase and amplitude control stages 41, 42 remain adjusted at the correct values. When the transmission of the message has taken place, the transmitter is switched off and, due to the pilot frequencies dropping out, the receiver is switched off, the time distributor 29 rendering the different circuits inoperative. When the transmitter is switched on again, there follows in the receiver the switching on of the different circuits by the time distributor 29 and the adjustment of the automatic equalization system for the transmission of the information pulses in the manner already described.

In the system described the frequency analyzer 35 with pass regions 0 – 100 Hz, 100 – 300 Hz, . . . 1,700 – 1,900 Hz is utilized for frequency splitting of the adjusting signal and the information pulses having mutually different frequency spectra. Particularly the frequency spectrum of the adjusting signal is a line spectrum and that of the information pulses is a continuous spectrum. For the purpose of illustration FIGS. **5*b* and 5*c* show the amplitude variation of the information pulses and the frequency spectra, respectively, of the received adjusting signal with frequency components 0, 200, 400, . . . Hz when passing through a transmission path having the transmission characteristic shown in FIG. 5*a*, while curve A represents the amplitude-frequency characteristic and curve B represents the phase-frequency characteristic; the broken lines A' and B' in the Figure show the ideal amplitude-frequency characteristic and phase-frequency characteristic. Thus the frequency-split components 0 Hz, 200 Hz, 400 Hz . . . of the adjusting signal, or the sub-bands 0 – 100 Hz, 100 – 300 Hz, . . . . 1,700 – 1,900 Hz of the continuous spectrum of the information pulses, occur at the outputs of the sub-bandpass filters of the frequency analyzer 35, the outputs being formed by the combination networks 47**.

During the adjusting period of the automatic equalization system 32 the local test pulse pattern generator 48 synchronized by the clock pulses in the reference signal source 44 is connected, through the lowpass filter 50 having a Nyquist characteristic, to selection filter 49 for generating the frequency components of 0, 200, 400, . . . Hz which constitute the phase and amplitude references in the comparators 43 for the components of the same frequency of the received adjusting signal which has a phase and amplitude distortion given by the phase-frequency characteristic and amplitude-frequency characteristic of the transmission path. In the structure of the reference signal source 44 it has been ensured that the frequency components derived from the outputs of selection filter 49 occur without phase distortion and with an amplitude variation given by the Nyquist characteristic of the lowpass filter 50. This can be advantageously realized by forming the lowpass filter 50 together with the selection filter 49 as a frequency analyzer of the type described at 35. For the purpose of illustration, the frequency diagram of FIG. **5*d*** shows the amplitude of the locally generated reference signals of 0, 200, 400, . . . Hz, whereby in the given embodiment the Nyquist frequency is, for example, 1,600 Hz and the width of the Nyquist flank $b$ = 600 Hz.

Simultaneously in the comparators 43 for all frequency components of the received adjusting signal the phase and amplitude control voltages for thP phase control stages 41 and the amplitude control stages 42 are generated by means of the phase and amplitude comparison with the components of equal frequency of the locally generated adjusting signal, and also the phase and amplitude correction of all components of the received adjusting signal occur hereby simultaneously, while by combination of the phase and amplitude-corrected components in the combination device 45 the output signal is obtained from the equalizing system. More particularly, the phase and amplitude control voltages whose polarities and values are given by the mutual phase and amplitude difference occurring between these components are generated in the comparators 43 by means of the phase and amplitude comparison of the frequency components of the received adjusting signal and the corresponding components of the locally generated adjusting signal. These phase and amplitude control voltages in the phase and amplitude control stages 41 and 42 bring the phase and amplitude of the components of the received adjusting signal in conformity with the phase and amplitude of the components serving as a reference of the locally generated adjusting signal at the output of the reference signal source 44.

Figure 6:
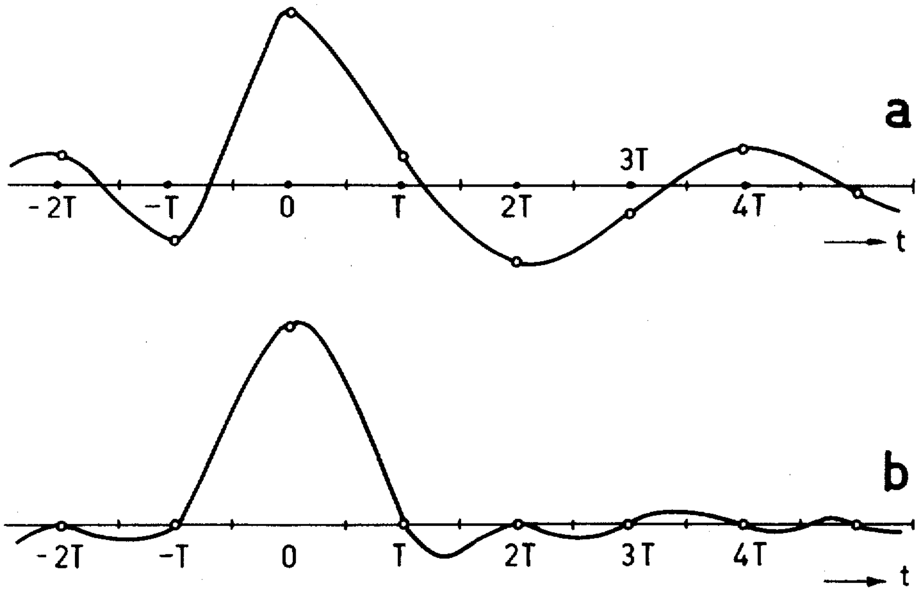

Since the phase distortion of the different frequency components of the received adjusting signal is eliminated in the phase control stages 41 and since, moreover, the amplitude variation in the amplitude control stages 42 is brought in conformity with the Nyquist characteristic, an accurate equalization of the transmission path for the adjusting signal is obtained after combination of these phase and amplitude-equalized frequency components in the combination device 45. For example, FIG. 6*a* shows a time diagram of the received adjusting signal which is constituted by a "1" pulse in 16 clock periods and FIG. 6*b* shows the equalized adjusting signal produced in combination device 45, the latter signal exhibits an optimum pulse resolution because at the sampling instants $\pm T, \pm 2T, \pm 3T$ the transient phenomena have been reduced to substantially zero. In contradistinction to the known equalization systems the adjustment in this case is not effected in an iterative but in a direct manner so that the difficulties occurring in the case of iterative adjustment do not occur. Particularly, the system described is distinguished by a considerably shorter acquisition period as well as by the absence of instabilities even in transmission paths of a very poor quality.

Figure 7:
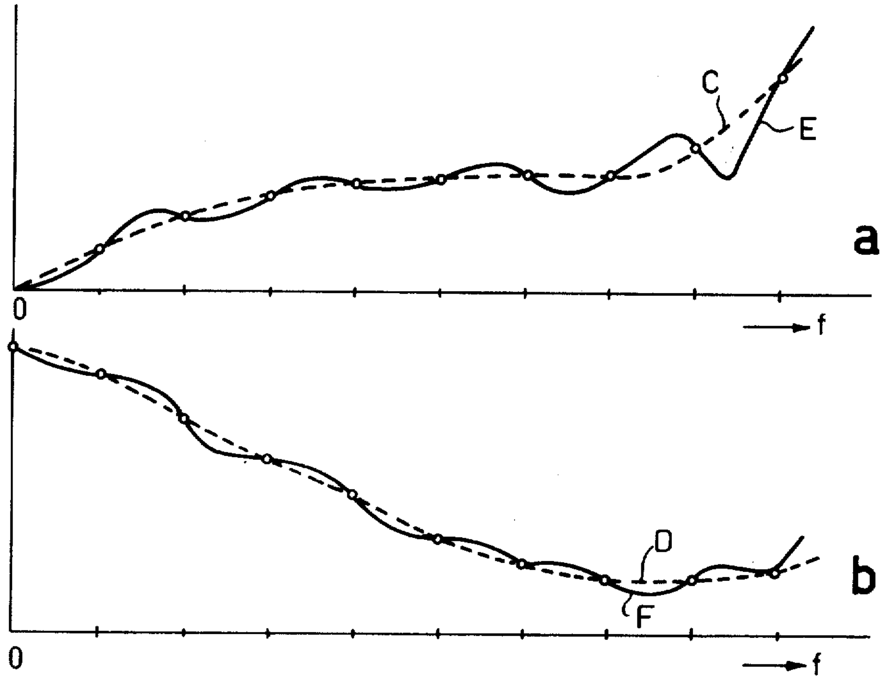

In the equalization characteristic of the equalization system described, an accurate equalization as regards phase and amplitude is obtained for the frequency components of the line spectrum of the adjusting signal, though for the continuous spectrum of the information pulses the equalization is to be extended over the entire transmission band from 0 to 1,900 Hz. In addition to selection of the frequency components of the adjusting signal the sub-bandpass filters in the different output channels of the frequency analyzer for equalization of the information pulses are to satisfy the condition that these sub-bandpass filters for the frequency components of the information pulses jointly constitute an uninterrupted continuous pass region without reject areas. For example, the phase equalization characteristic of FIG. 7*a* and the amplitude equalization characteristic of FIG. 7*b* show the circles representing the adjusting points at the frequency components of 0 Hz, 200 Hz, 400 Hz, . . . , 1,800 Hz of the adjusting signal, and in that case the equalization for the continuous spectrum of the information pulses is to be extended over the complete sub-bands of all sub-bandpass filters. For the sake of comparison the broken-line curves C and D in these Figures show the ideal phase and amplitude equalization characteristics which are associated with a transmission path having the amplitude and phase transmission characteristics as shown in FIG. 5*a* by A and B.

These requirements for equalization of the continuous spectrum of the information pulses are satisfied in an elegant manner in the system according to the invention by the choice of the frequency analyzer 35 used in the form of a delay network 36 having weighting networks 38, 39, 40 connected thereto. In fact, in this type of frequency analyzer 35 the shape of the amplitude-frequency characteristic and that of the phase-frequency characteristic can be arbitrarily adjusted independently of each other for the different sub-bandpass filters. For example, a linear phase characteristic at a desired amplitude characteristic, which is in contrast with the known frequency analyzer in which very large phase shifts occur especially at the edges of the relatively narrow-bands. On the other hand the sub-bandpass filters must have additional sub-bandpass regions over the total transmission band for realizing a continuous pass region and must not cause any frequency-dependent feedbacks.

While using the automatic equalization system according to the invention the phase equalization and amplitude equalization characteristics were obtained as are shown by the solid-line curves E and F in FIGS. 7*a* and 7*b*. Thus an accurate equalization as regards phase and amplitude was obtained over the total transmission band from 0 to 1,900 Hz which makes this equalization system likewise suitable for equalization of other signals for example, facsimile and stereo signals.

Not only is the automatic equalization system according to the invention distinguished by a short acquisition period, absence of instabilities, accurate equalization flexibility of use, but also an unexpected result occurs in that the practical realization can be effected in a remarkably simple manner.

When first of all the embodiment of the frequency analyzer 35 is considered and when primarily the sub-bandpass filters are required to fully suppress frequency components of both the adjusting signal and of the information pulses located outside the sub-bands in the case of a continuous pass characteristic of all sub-bandpass filters jointly, the pass characteristics of all sub-bandpass filters are to be given a rectangular shape. For example, the pass characteristics for the sub-bands of from 0 to 100 Hz, 100 to 300 Hz . . . and 1,700 to 1,900 Hz as viewed in a frequency diagram exhibit the shape shown in FIG. 8*a* by G and the total pass characteristic of all sub-bandpass filters has the shape shown by H while arrows represent the frequency components of the adjusting signal. In this embodiment a very large number of elements is required for the frequency analyzer 35, for example, in the given embodiment 200 delay elements, and 200 weighting networks per sub-band corresponding to 1,800 weighting networks in the matrix network 46 are used.

The Applicant found from further investigations that for realization of equalization characteristics of eminent quality, the requirements to be imposed on the sub-bandpass filters of the frequency analyzer 35 can be simplified to a considerable extent. Thus, it is not necessary that the frequency components of the information pulses located outside the sub-bands of the sub-bandpass filters are completely suppressed which in the frequency analyser 35 leads to sub-bandpass filters of the class having overlapping pass characteristics requiring a considerably smaller number of elements. A mathematical calculation proves that a maximum economy is obtained by using sub-bandpass filters of the kind sin $(\omega-\omega_m)/{}_m)$, and particularly for sub-bandpass filters of this kind the number of delay elements is reduced to 32 and the number of weighting networks in the matrix 46 is reduced to 288.

In the abovementioned formula of the sub-bandpass filters of the kind sin $(\omega-\omega_m)$ / $(\omega-\omega_m)$, $\omega_m$ represents the frequency component of the adjusting signal, for example, when in the given embodiment the period of the periodical adjusting pulses amounts to the N-fold of the clock period T corresponding to an angular frequency $\omega = 2\pi/NT$, then the angular frequency of an arbitrary spectrum component of the adjusting signal, for example, the $m^{th}$ harmonic $\omega_m$ is given by $\omega_m = 2\pi m/NT$ and the weighting factors of the weighting networks are proportioned in accordance with the formula:

$$C_{rq} = \cos\left[2\pi r\,(q-a)/KN\right], \qquad (10),$$

in which the indices $r$ from $o$ to $R-1$ and the indices q from 0 to $KN-1$ represent the rows and columns, respectively, of the matrix. In this case $a$ represents a constant which is proportional to the delay between the input of the delay circuit 36 and the combined output of the subbandpass filters 38, 39, 40, 47, and K represents the ratio between the clock period T and the time delay $s$ of the delay elements; in practice the value of approximately KN/2 is taken for $a$.

Figure 8:
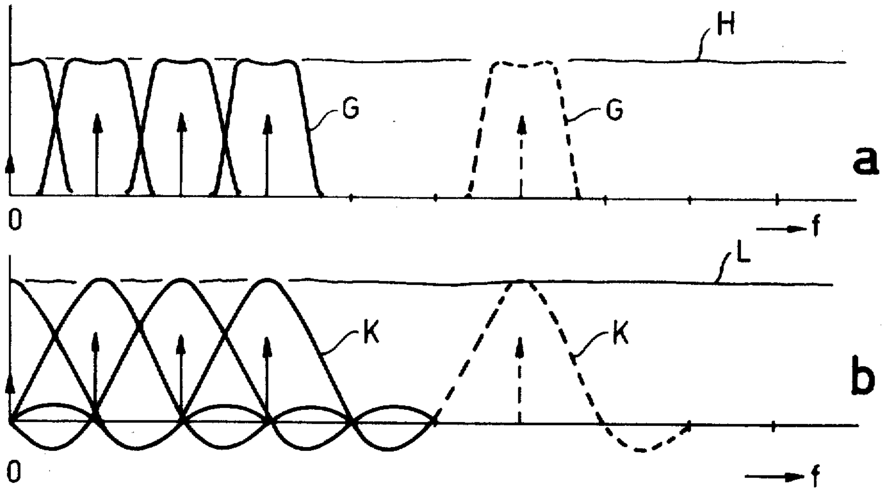

Likewise as in FIG. 8*a*, FIG. 8*b* shows for this type of frequency analyzer 35 the pass characteristics for the sub-bands from 0 to 100 Hz, 100 to 300 Hz . . . and from 1,500 to 1,700 Hz as well as the total pass characteristic of all sub-bands which are, however, indicated in these Figures by the characters K and L. In accordance with FIG. 8*a* the pass characteristics in FIG. 8*b* only pass the frequency components of the adjusting signal of 0 Hz, 200 Hz and 400 Hz . . . in the relevant sub-bands of 0 – 100 Hz, 100 – 300 Hz, . . . 1,700 – 1,900 Hz and the other components are suppressed while in contrast with FIG. 8*a* the frequency components of the information pulses located outside the relevant sub-band are not completely suppressed.

For the quality of the equalization characteristic this incomplete suppression of the frequency components of the information pulses located outside the relevant sub-band does not cause a disturbing influence; in fact the shape of the overlapping pass characteristic of the sub-bandpass filter may be varied within wide limits provided that it is ensured that the sub-bandpass filters constitute an uninterrupted continuous pass region for the frequency components of the information pulses.

Figure 9:
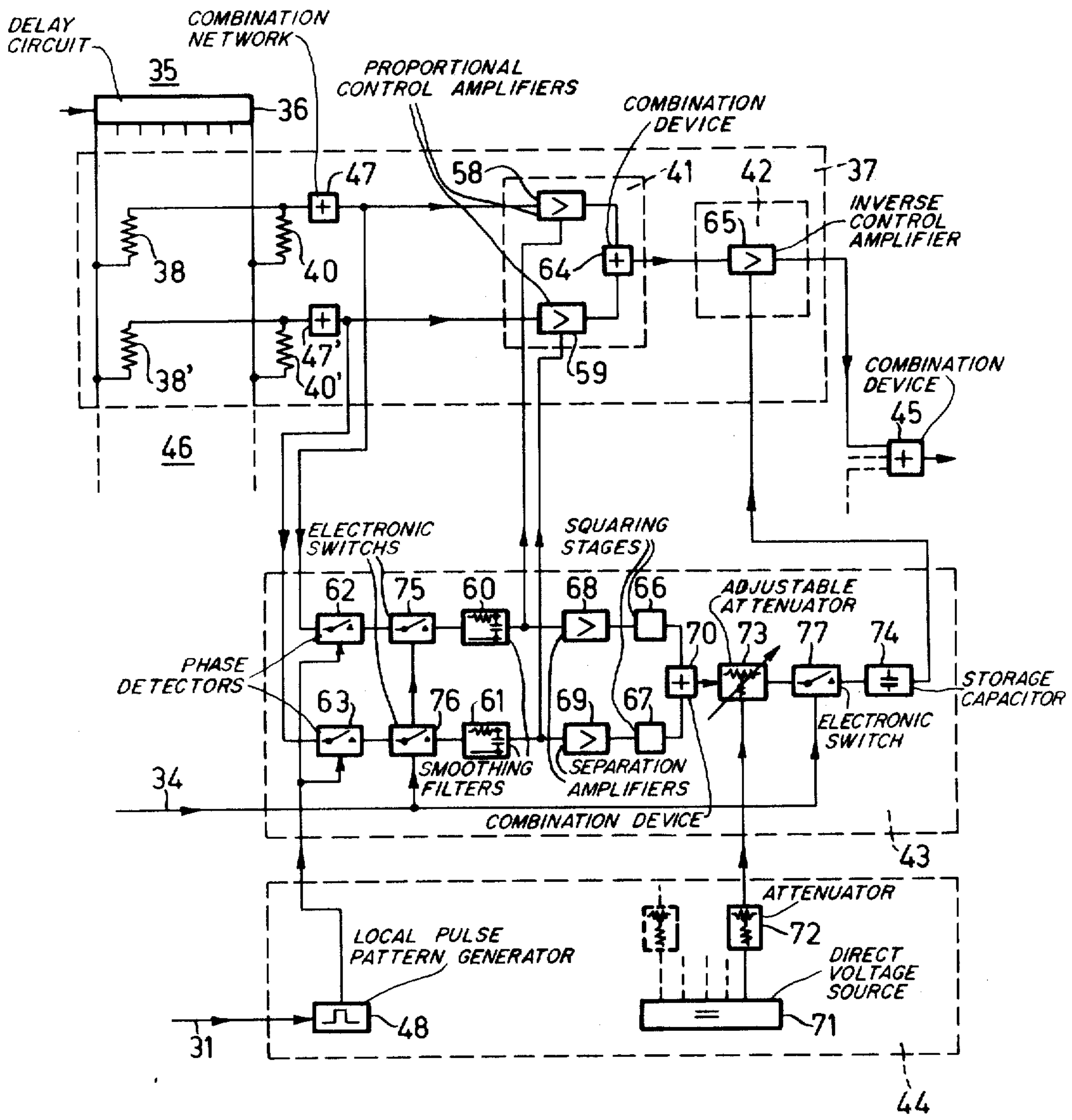
FIGS. 9, 10, 11 show more detailed embodiments of the system according to the invention which are simplified in their structure.

FIG. 9 shows a more detailed output channel and an associated phase and amplitude control stage for an automatic equalization system according to the invention in a receiver as shown in FIG. 2, as well as a more detailed comparator and a reference source. In the embodiment shown the detailed elaboration of one of the output channels suffices because the other output channels are formed in exactly the same manner.

To realize phase control stages 41 which can especially be used to advantage in sub-bandpass filters of the sin $(\omega-\omega_m)$ / $(\omega-\omega_m)$ type, the output channel 37 of the frequency analyzer 35 is not only provided with the sub-bandpass filter shown in FIG. 2, but also with an additional sub-bandpass filter for selection of each sub-band those reference numerals are provided with indices for the purpose of distinction. Both sub-bandpass filters for the selection of one and the same sub-band exhibit the same amplitude-frequency characteristics, but phase-frequency characteristics mutually shifted $\pi/2$ in phase which in the given frequency analyzer 35 in accordance with the previous explanation (compare formulas 2, 3, 5 and 7, 8, 9) is realized in a particularly simple manner by the correct choice of the weighting factors 38, . . . 40 of the first sub-bandpass filter and 38′, . . . 40′ of the additional sub-bandpass filter. For example, the weighting factors in the matrix network 46 of the first mentioned sub-bandpass filters according to formula (10) are given by:

$C_{rq} = \cos\left[2\pi r\,(q-a)/KN\right]$, in which the indices $r$ from $o$ to $R-1$, and the indices $q$ from $o$ to $KN-1$ denote the rows and columns, respectively, of the matrix of the firstmentioned filters and in that case the weighting factors of the additional sub-bandpass filters are given by:

$$C'_{rq} = \sin\left[2\pi r\,(q-a)/KN\right],$$

in which in exactly the same manner the indices $r$ from 0 to $R-1$ and the indices $q$ from 0 to $KN-1$ denote the rows and columns, respectively, of the matrix of the additional filters.

For phase control each of the sub-bandpass filters 38, 40, 47; 38′, 40′, 47′ is connected in the phase control stage 41 to proportional control amplifiers 58, 59 controlled by a phase control voltage, which amplifiers in known manner have an amplification factor which is proportional to the phase control voltage. The control voltages for the proportional control amplifiers 58, 59 are derived from smoothing filters 60, 61 in the output circuit of two phase detectors 62, 63 included in the comparator 43 which detectors are fed by the output signals from the two sub-bandpass filters 38, 40, 47; 38′, 40′, 47′. Particularly to this end the pulses from the local pulse pattern generator 48 are directly utilized as a phase reference without selection of the relevant frequency component of the locally generated pulse spectrum as is the case in the embodiment of FIG. 2, while the phase detectors 62, 63 are constituted by normally open switches which are closed whenever a pulse from the local pulse pattern generator 48 occurs preferably after pulse narrowing in a pulse narrower.

An output signal which is accurately corrected in phase is obtained at the output of the phase control stage 41 constituted by a combination device 64 connected to the outputs of the proportional control amplifiers 58, 59, and this will hereinafter be described in greater detail.

If in accordance with the foregoing it is assumed that the period of the locally generated pulse pattern is the N-fold of a clock period T, corresponding to an angular frequency $2\pi/NT$ and if it is furthermore assumed that the two sub-bandpass filters 38, 40, 47; 38', 40', 47' select the $m^{th}$ harmonic of the adjusting signal exhibting a phase error $_m$, the oscillations $a_m\cos(2\pi mt/NT+\phi_m)$ and $a_m\sin(2\pi mt/NT+\phi_m)$ occur at the outputs of the sub-bandpass filters 38, 40, 47; 38', 40', 47' in which $a_m$ represents the amplitude of the selected oscillations.

Whenever a pulse from the local pulse pattern generation 48 occurs at the instants $t=0$, NT, 2NT . . . the switches 62, 63 formed as phase detectors are released, and pulsatory output voltages are thus produced at the outputs which after smoothing in the smoothing filters 60, 61 provide the control voltages $a_m\cos\phi_m$ and $a_m\sin\phi_m$ for the proportional control amplifiers 58, 59 adapted for the amplification of the oscillations $a_m\cos(2\pi mt/NT+\phi_m)$ and $a_m\sin(2\pi mt/NT+\phi_m)$ selected in the sub-bandpass filters 38, 40, 47; 38', 40', 47'. Amplification in the proportional control amplifiers 58, 59 and combination in the combination device 64 produces an output signal given by the formula: $a_m^2\cos\phi_m\cos(2\pi mt/MT+\phi_m)+a_m^2\sin\phi_m\sin(2\pi mt/NT+\phi_m)$, which can be simplified to $a_m^2\cos 2\pi mt/NT$.

Thus an accurately phase-equalized signal is produced at the combination device, but the amplitude value $a_m^2$ in the subsequent amplitude control stage 42 is to be brought in conformity with the amplitude value $b_m$ in accordance with the Nyquist criterion applying to this spectrum component of the adjusting signal. For this purpose the amplitude control stage 42 is formed as an inverse amplitude control device in the form of an inverse control amplifier 65 which in known manner has an amplification factor which is inverse to the amplitude control voltage applied thereto. Particularly when an amplitude control voltage of the magnitude $a_m^2/b_m$ is applied to the inverse control amplifier 65, the inverse control amplifier 65 produces an accurately amplitude-corrected output signal:

$$(b_m/a_m^2)\,a_m^2\cos 2\pi mt/NT=b_m\cos 2\pi mt/NT,$$

which for further processing in the receiver is applied to the combination device 45.

To generate the amplitude control voltage of the value $a_m^2/b_m$ for the inverse control amplifier 65 the device described comprises at one end two squaring stages 66, 67 which are connected at the input end through separation amplifiers 68, 69 to the smoothing filters 60, 61 of the phase detectors 62, 63 and at the output end to a combination device 70. An amplitude reference source in the form of a direct voltage source 71 whose output circuit incorporated attenuators 72 for adjusting the attenuation factor of an adjustable attenuator 73 is incorporated in the combination device 70 at the value $b_m$ according to the Nyquist criterion for the relevant frequently component $\omega_m$. Particularly by squaring in the squaring stages 66, 67 of the output voltages $a_m\cos\phi_m$ and $a_m\sin\phi_m$ of the smoothing filters 60, 61 of the phase detectors 62, 63 and after combination in the combination device 70, an output signal is produced which has the form $a_m^2\cos^2\phi_m+a_m^2\sin\phi_m=a_m^2$ which after attenuation in the adjustable attenuator 73 by the attenuation factor $b_m$ yields the desired control voltage $a_m^2/b_m$ through a storage capacitor 74 for the inverse control amplifier 65.

In the manner described during the adjusting period of the automatic equalization system the orrect adjustment of the phase control stages 41 and the amplitude control stages 42 in all output channels 37 is effected, which output channels 37 are jointly connected to the combination device 45. As in the system of FIG. 2 the control voltages generated for the phase control stages 41 and the amplitude control stages 42 are maintained in the storage networks constituted by the lowpass filters 60, 61 and the storage capacitor 74 during the transmission of the information pulses subsequent to the adjusting period. To this end electronic switches 75, 76, 77 are provided, which every time after the adjusting period are opened by a switching pulse from lead 34 originating from time distributor 29.

In spite of the filter characteristics having the overlapping pass regions of the sub-bandpass filters of the $\sin(\omega-\omega_m)/(\omega-\omega_m)$ type (compare FIG. 8b) unwanted feedback phenomena as well as frequency-dependent phase shifts, which might cause a perturbation of the equalization characteristics, are not found to occur in the frequency analyzer 35. In combination with the described frequency analyser 35 the phase control stages shown with the proportional amplitude control devices 58, 59 which are connected to the sub-bandpass filters 38, 40, 47 and additional sub-bandpass filters 38', 40', 47' are of special advantage because the phase control stage 41 has a broad band, that is thus to say that these control stages 58, 59 prevent frequency-dependent phase shifts and amplitude variations over a very wide frequency range, which shifts and variations might detrimentally influence the equalization characteristic.

In addition to a considerable economy of elements, simplification of the reference source 44 and a structure which is quite suitable for integration in a semiconductor body, the given embodiment ensures a phase and an amplitude equalization characteristic of eminent quality.

In this respect it is to be noted that proportional and inverse amplitude control devices are known per se in different embodiments and for this reason these devices will not be described in detail. Instead of control amplifiers these proportional and inverse amplitude control devices may alternatively be formed as attenuators having voltage-dependent elements, for example, diodes or transistors, in which there always applies that the transmission factor varies proportionally or inversely with the control voltage.

Figure 10:
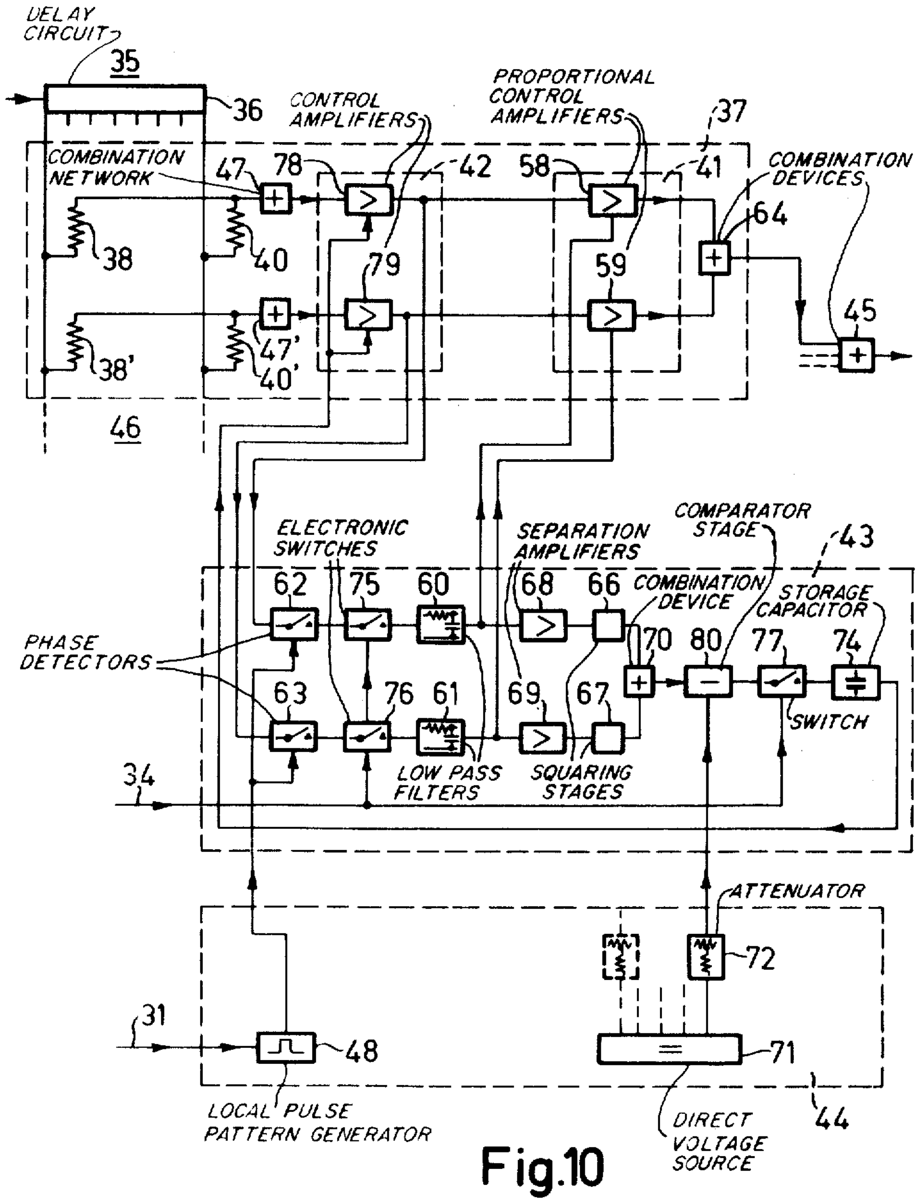

FIG. 10 shows a further embodiment of a system according to the invention which is distinguished from the system according to FIG. 9 in that the amplitude control stages 42 are incorporated in the output channels 37 for the phase control stages 41; corresponding elements have the same reference numerals.

In this embodiment the amplitude control stage 42 consists of two control amplifiers 78, 79 controlled by an amplitude control voltage which amplifiers are connected to the sub-bandpass filters 38, 40, 47; 38', 40', 47'. The subsequent phase control stage 41 is formed as in FIG. 9 by two proportional control amplifiers 58, 59 connected to a combination device 64, while the output of the output channel 37 of the frequency analyzer 35 is constituted by the combination device 64. The output of the described output channel and the outputs of the other output channels are connected for further processing to the combination device 45. In the same manner as in the systems of FIG. 2 and FIG. 9 an output signal is derived from the combination device 64, which output signal is accurately equalized in phase and whose amplitude is brought into conformity with the amplitude value $b_m$ according to the Nyquist criterion applying to the relevent spectrum component.

In the given embodiment the comparator 43 is connected to the outputs of the control amplifiers 78, 79 which comparator includes, as in FIG. 9, successively the phase detectors 62, 63 formed as switches, electronic switches 75, 76 controlled by switching pulses from lead 34, lowpass filters 60, 61, separation amplifiers 68, 69, squaring stages 66, 67 and the combination device 70. The phase control voltage for the proportional amplifiers 58, 59 in the phase control stage 41 is derived from the lowpass filters 60, 61, while the amplitude control voltage is obtained by comparing the output signal from combination device 70 with the amplitude reference voltage originating from the attenuator 72 connected to the direct voltage source 71 in a comparator stage 80, which is connected to the control amplifiers 78, 79 preceding the switch 77, controlled by switching pulses 34 and the storage capacitor 74.

In the control amplifiers 78, 79 the amplitude of the spectrum component of the adjusting signal $a_m\cos(2\pi mt/NT + \phi_m)$ and $a_m\sin(2\pi mt/NT + \phi_m)$ derived from the sub-bandpass filters 38, 40, 47; 38', 40', 47' is adjusted to such a value by the amplitude control, that after amplification in the proportional amplifiers 58, 59 of the phase control stage the output signal derived from the combination device 64 has its amplitude value in conformity with the amplitude value $b_m$ according to the Nyquist criterion applying to the relevant spectrum component. This is achieved in a simple manner by suitable adjustment of the attenuator 72, because for a sufficiently large loop gain in the comparator 43 the output signal from the combination device 70 corresponding to the square value of the amplitude of the output signals from the control amplifiers 78, 79 (compare FIG. 9) is rendered substantially equal to the amplitude reference voltage. When particularly by suitable adjustment of the attenuator 72, the amplitude of the spectrum component $a_m\cos(2\pi mt/NT + \phi_m)$ and $a_m\sin(2\pi mt/NT + \phi_m)$ derived from the sub-bandpass filters 38, 40, 47; 38', 40', 47' is adjusted to the amplitude $\sqrt{b_m}$ in the control amplifier, the desired output signal $(\sqrt{b_m})^2 \cos 2\pi mt/NT = b_m \cos 2\pi mt/NT$ is produced due to the action of the proportional amplifiers 58, 59 in the phase control stage 41 in the manner as in FIG. 9 of the combination device 64. Accordingly this signal is equalized in its phase and its amplitude is brought in conformity with the amplitude value $b_m$ according to the Nyquist criterion applying to the relevant spectrum component.

As in FIG. 9 the generated phase and amplitude control voltages in this embodiment are maintained during the transmission of the information pulses after the adjusting period in the stroage networks 60, 61, 64 by using the electronic switches 75, 76, 77 which are opened after each adjusting period by a switching pulse from lead 34.

As compared with the system shown in FIG. 9 the embodiment in this case is distinguished by the fact that the frequency-dependent amplitude differences caused by the transmission path of the signals applied to the comparator 43 and phase control stage 41, which differences may be considerable, for example, 20 dB at the edges of the transmission band, are eliminated due to the action of the control amplifiers 78, 79 in the amplitude control stage. This feature, in practice, has the important advantage that the elements of the comparator 43 and of the phase control stage 41 are much less critical in their construction.

Figure 11:
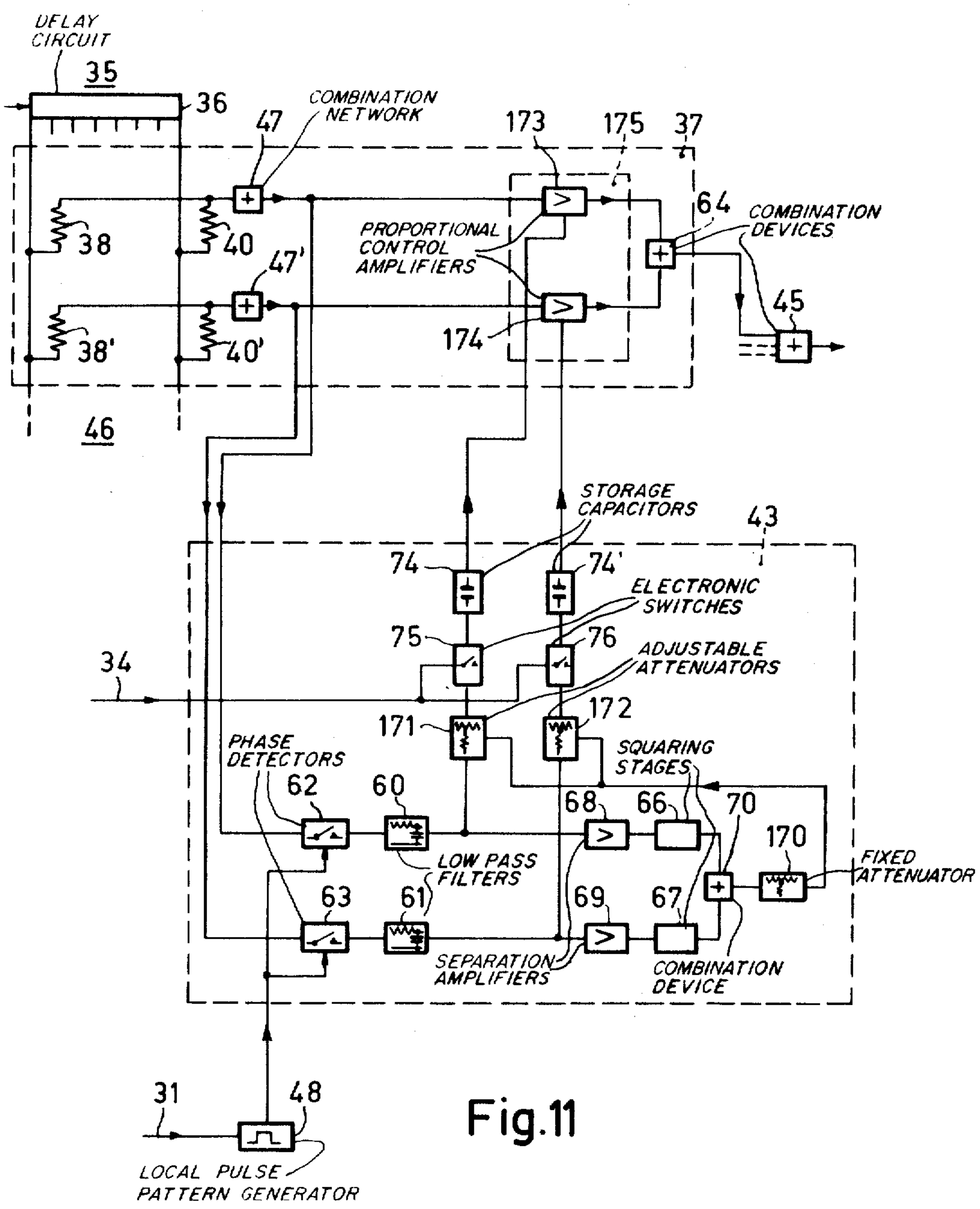

FIG. 11 shows a simplification of the embodiments shown in FIGS. 9 and 10 of the system according to the invention consisting in that the phase control stage and the amplitude control stage are combined in a single stage 175 which is made possible because both the phase control stage and the amplitude control stage are formed as amplitude control devices in the form of control amplifiers. Both functions, namely the phase control and the amplitude control are performed by proportional control amplifiers 173, 174 whose input ends are connected to the sub-bandpass filters 38, 40, 47; 38', 40', 47' and whose output ends are connected to a combination device 64. The output signal derived from combination device 64 is combined in the combination device 45 for further processing with the signals from the other output channels of the frequency analyzer.

As in the embodiment shown in FIG. 9, the comparator 43 connected to the sub-bandpass filters 38, 40, 47; 38', 40', 47' successively includes the phase detectors 62, 63 formed as switches, lowpass filters 60, 61, separation amplifiers 68, 69, squaring stages 66, 67 and combination device 70. For proportional control amplifiers 173, 174 the control voltages are derived from the lowpass filters 60, 61. These voltages are applied through amplitude control devices controlled by a control voltage and being formed as adjustable attenuators 171, 172, electronic switches 75, 76 and storage capacitors 74, 74' to the proportional control amplifiers 173, 174. For the adjustable attenuators 171, 172 the control voltage is derived from the combination device 70 through a fixed attenuator 170 serving as an amplitude reference whose attenuation factor is in conformity with the amplitude value $b_m$ according to the Nyquist criterion applying to the relevant spectrum components.

An output signal is obtained at the combination device 64 with this system, which signal is accurately equalized in its phase and whose amplitude is brought in conformity with the amplitude value $b_m$ according to the Nyquist criterion applying to the relevant spectrum component.

When the spectrum component of the adjusting signal selected by the sub-bandpass filters 38, 40, 47; 38', 40', 47' is again represented by $a_m\cos(2\pi mt/NT + \phi_m)$ and $a_m\sin(2\pi mt/NT + \phi_m)$ likewise as in the embodiment of FIG. 9, phase control signals $a_m\cos\phi_m$ and $a_m\sin\phi_m$ are then derived from the lowpass filters 60, 61 in the comparator 43 and a control signal $a_m^2$ is derived from the combination device 70, in which by attenuation by the attenuation factor $b_m$ in the attenuator 170 functioning as an amplitude reference a control signal $a_m^2/b_m$ is obtained for an adjustment desired in accordance with this control signal of the attenuation factor of the adjustable attenuators 171, 172 so that control signals $a_m\cos(\phi_m/a_m^2 = b_m\cos(\phi_m)/a_m$ and $a_m\sin(\phi_m). b_m/a_m^2 = b_m\sin(\phi_m)/a_m$ are produced at the proportional control amplifiers 173, 174. Proportional amplification of the spectrum components $a_m\cdot\cos(2\pi mt/NT + \phi_m)$ selected in the sub-bandpass filters 38, 40, 47; 38', 40', 47' in the proportional control amplifiers 173, 174 provides an output signal: $a_m\cdot\cos(2\pi mt/NT + \phi_m) \cdot b_m\cos(\phi_m)/a_m + a_m\sin(2\pi mt/NT$ $+ \phi_m) \cdot b_m \sin(\phi_m/a_m = b_m \cos 2\pi mt/NT$ in combination device 64 which signal, as in the embodiments of FIG. 9 and FIG. 10, is accurately equalized in its phase and whose amplitude is brought in conformity with the amplitude value $b_m$ according to the Nyquist criterion applying to the relevant spectrum component.

Also in this system the generated control voltages are maintained during the transmission of information pulses in the storage capacitor 74, 74' because the electronic switches 75, 76 are opened by a switching pulse from lead 34 every time after the adjusting period.

It has been described hereinbefore that different embodiments are possible within the scope of the invention, for example, according to FIGS. 9 and 10 the sequence of the phase control stage and the amplitude control stage may be exchanged or according to FIG. 11 they may be combined to one single stage. Likewise the elements used may have different forms, for example, the phase control stage. The embodiment shown in this case, using an additional sub-bandpass filter and proportional control amplifiers in the described equilization system, has special advantages as has already been described in greater detail with reference to FIG. 9. Also the amplitude control may be realized in a different manner, for example, the amplitude control voltage might be obtained by rectification of the output signal from a sub-bandpass filter in a rectifier stage having a rectifier filter and the signal thus rectified might be compared in a comparison stage with the amplitude reference. Generation by squaring phase control voltages and a subsequent combination in the manner as described, however, has the advantage, especially important for integration in a semiconductor body, that voluminous rectifier filters are economized. In principle it might likewise be possible to compare the input signal from the frequency analyser 35 in phase detectors for the purpose of generating phase control voltages with the components of the test pulse pattern generator 48 whose output pulses are then to be split up in its frequency components in the manner as described with reference to FIG. 2.

Figure 12:
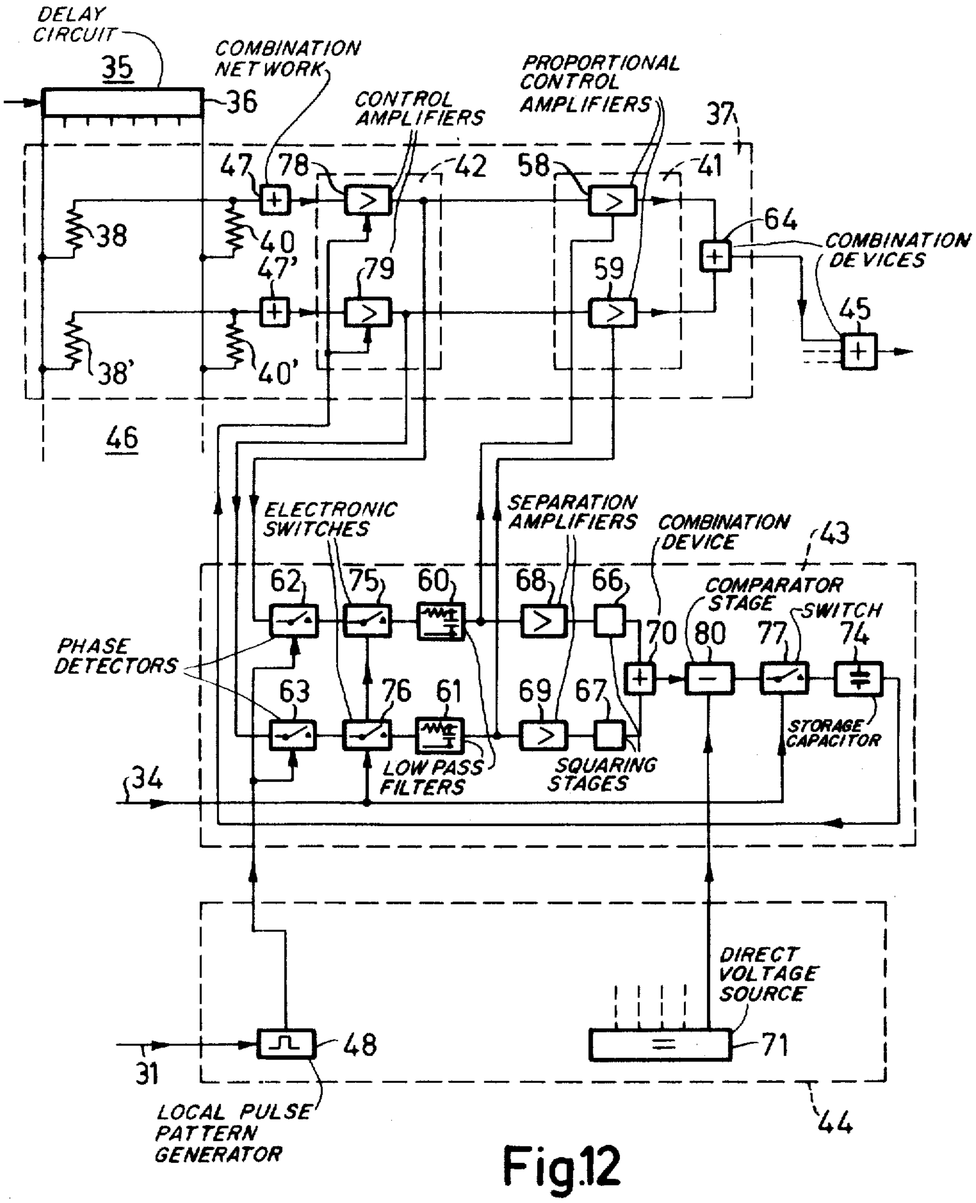
FIG. 12 shows a further considerable simplification in the structure of a system according to the invention while some frequency diagrams are shown for the purpose of explanation in FIG. 13.

FIG. 12 describes a considerable simplification of the system according to the invention by using the periodical pass regions of the sub-bandpass filters 38, 40, 47; 38', 47' in case of a delay time of the successive delay elements in the delay circuit 36 equal to the clock period T of the received pulses. In the system shown in FIG. 12 the starting point is the embodiment described with reference to FIG. 10.

Figure 5:
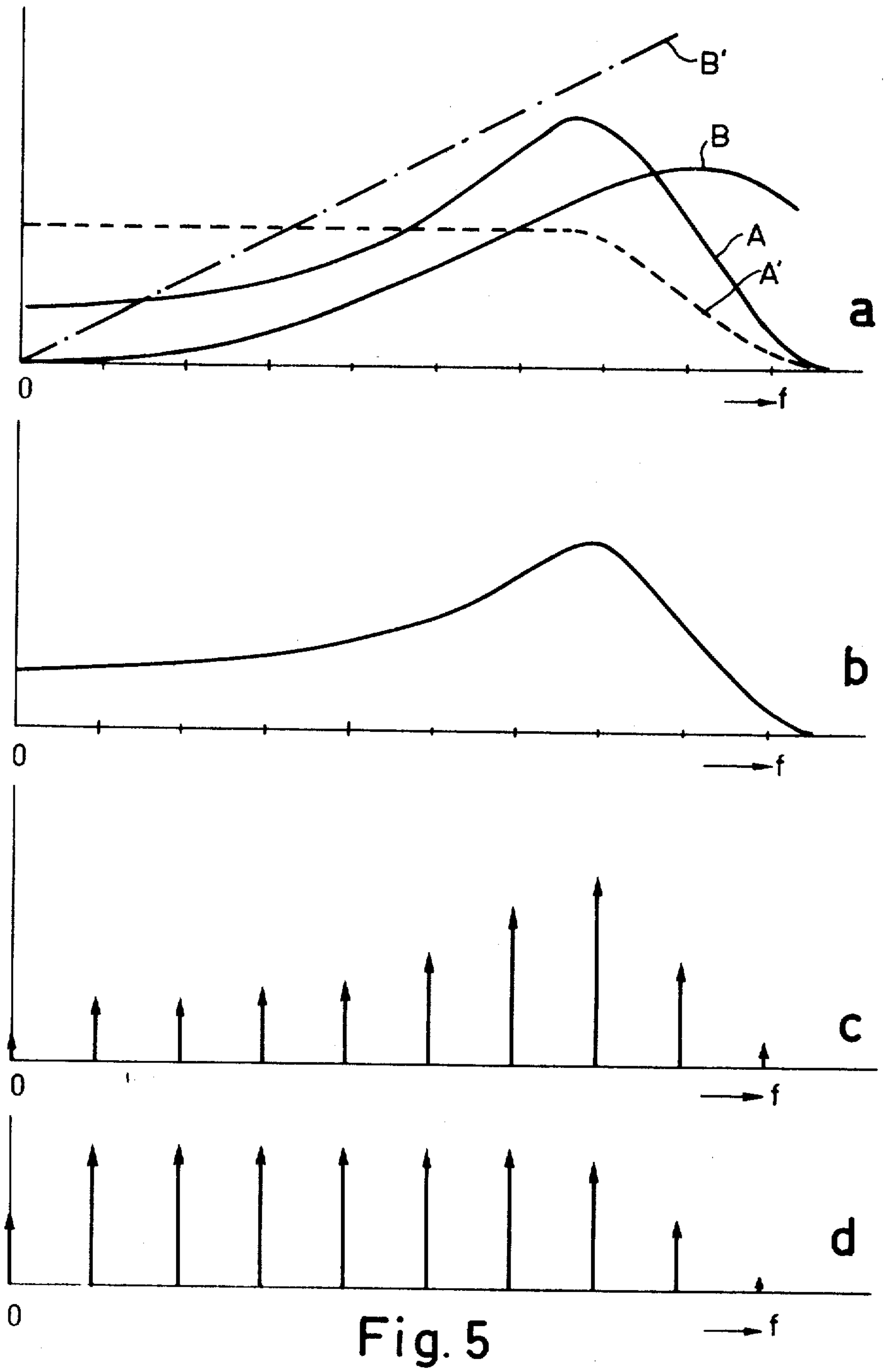
Figure 13:
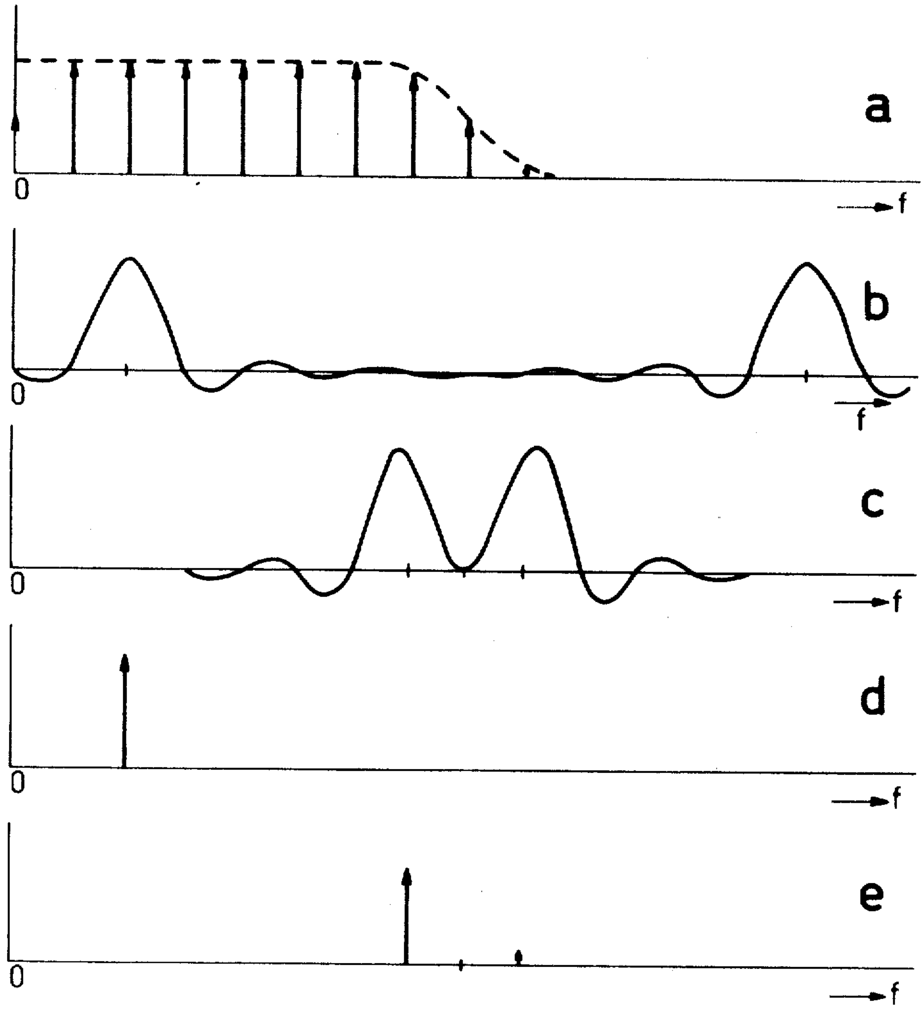

To explain the periodical behavior of the pass regions and the phenomena occurring FIG. 13 shows several frequency diagrams in which, likewise as in FIG. 5, the frequency ranges 0 – 100 Hz, 100 – 300 Hz, . . . , are taken for the pass regions of the sub-bandpass filters 38, 40, 47; 38', 40', 47' for the frequency components of the adjusting signal 0 Hz, 200 Hz, 400 Hz, . . . . , for the clock frequency of the transmitted pulses 3,200 Hz corresponding to a Nyquist frequency of 1,600 Hz. The Nyquist slope is located in this case, for example, between 1,300 and 1,900 Hz while the bandwidth is limited to 1,900 Hz by the filter 2 in the transmitter (FIG. 1) and 16 in the receiver (FIG. 2).

In FIG. **13*a*** the arrows represent the value of the frequency components of the adjusting signal of 0 Hz, 200 Hz, . . . . while the frequency components with respect to the Nyquist slope of 1,300 Hz must have a mutually equal amplitude and must subsequently decrease in accordance with the Nyquist slope by the Nyquist frequency as a symmetry point, that is to say, the amplitude sum of the two spectrum component of the adjusting signal located symmetrically on either side of the Nyquist frequency of 1,600 Hz must always be equal to the amplitude of a frequency component of the adjuting signal located below the Nyquist edge.

FIG. 13b shows the pass region of a sub-bandpass filter 38, 40, 47 and 38', 40', 47' in a frequency range located below the Nyquist slope, for example, the pass region of 300 – 500 Hz which pass region is repeated at the clock frequency of 3,200 Hz, that is to say, the pass regions of 2,700 – 2,900 Hz and 3,500 – 3,700 Hz occur on either side of 3,200 Hz, the pass regions of 5,900 – 6,100 Hz and 6,700 – 6,900 Hz occur on either side of 6400 Hz and so forth; in FIG. **13*b*** not only the pass region of 300 – 500 Hz is illustrated but also the second pass region of 2,700 – 2,900 Hz below the clock frequency of 3,200 Hz because the pass regions below the clock frequency of 3,200 Hz are important for the following considerations.

When using the described frequency analyzer 35 the sub-bandpass filter 38, 40, 47; 38', 40', 47' with the pass region of 300 – 500 Hz exclusively selects the frequency component of the adjusting signal of 400 Hz while the pass region of 2,700 – 2,900 Hz does not pass any frequency component because this pass region is located outside the transmission band of 0 – 1,900 Hz. For the purpose of illustration FIG. **13*d* shows the frequency component of 400 Hz selected by sub-bandpass filter 38, 40, 47 and 38', 40', 47'**.

The situation is completely different for the sub-bandpass filters 38, 40, 47 and 38', 40', 47' having a pass region located within the Nyquist slope of 1,300 – 1,900 Hz as is illustrated in FIG. **13*c*, for example, for a sub-bandpass filter 38, 40, 47; 38', 40', 47' having a pass region of 1,300 – 1,500 Hz, namely the second pass region of 1,700 – 1,900 Hz below the clock frequency of 3,200 Hz is likewise located within the Nyquist slope symmetrically relative to the Nyquist frequency of 1,600 Hz. With the indicated sub-bandpass filters 38, 40, 47; 38', 40', 47' the spectrum components of the adjusting signal of 1,400 Hz and 1,800 Hz located within the two pass regions of 1,300 – 1,500 Hz and 1,700 – 1,900 Hz are thus selected which are shown for the purpose of illustration in FIG. 13*e***.

Thus, while only a spectrum component of the adjusting signal is passed by the sub-bandpass filters 38, 40, 47; 38', 40', 47' having a pass region below the Nyquist slope of 1,300 – 1,900 Hz, the sub-bandpass filters having a pass region within the Nyquist slope always pass two spectrum components of the adjusting signal which are located symmetrically relative to the Nyquist frequency.

For these frequencies located within the Nyquist slope it may be mathematically shown that by simultaneous phase and amplitude control of these two spectrum components of the adjusting signal the Nyquist condition can be satisfied and to this end the phase of the vectorial sum of the two spectrum components of the adjusting signal passed by the sub-bandpass filters is to be brought in conformity with the phase of the vectorial sum of the corresponding oscillations of the phase reference, while furthermore the vector sum amplitude of the spectrum components passed is to be rendered equal to the amplitude of the spectrum components located before the Nyquist slope, which components as already described in the foregoing exhibit a mutually equal amplitude. In their construction the output channels 37 of the frequency analyzer 35 and the associated amplitude control stage 42 and phase control stage 41, as well as comparator 43 in FIG. 12 are exactly equal for these frequency sub-bands located within this Nyquist edge to those for the frequency sub-bands below the Nyquist slope, but here the remarkable effect occurs that sub-band regions located symmetrically relative to the Nyquist frequency are simultaneously equalized.

On the one hand the number of output channels 37 of the frequency analyzer 35 with the sub-band regions within the Nyquist slope is reduced to 50 percent so that in the given embodiment the number of output channels 37 of the frequency analyzer and the associated phase control stage 41, amplitude control stage 42 and comparator 43 is brought from 10 to 9. On the other hand it has been achieved that the amplitude reference for the comparators 43 is mutually equal for all output channels 37, for example, in the embodiment of FIG. 10, as is illustrated in greater detail in FIG. 12, the attenuators 72 connected to the direct voltage source 71 of the amplitude reference source can be economized. Likewise when using the given steps in which the delay time of the delay elements of the delay circuit 36 is rendered equal to a clock period T of the received pulses, the attenuators 72 connected to the direct voltage source 71 in the embodiment according to FIG. 9 may be omitted, which in the embodiment shown in FIG. 11 the attenuators 170 serving as amplitude references may be mutually rendered equal for all comparators 43 or may be omitted. This involves the use of attenuators having an attenuation factor of 0.

Apart from the uniformity obtained by these steps of all output channels 37 and the comparators 43 used, as well as the economy of output channels 37 and simplification of the amplitude reference source, the number of delay elements of the delay circuit 36 and hence the number of weighting networks 38, 40; 38', 40' of the matrix 46 is reduced by a factor of 2.

Figure 14:
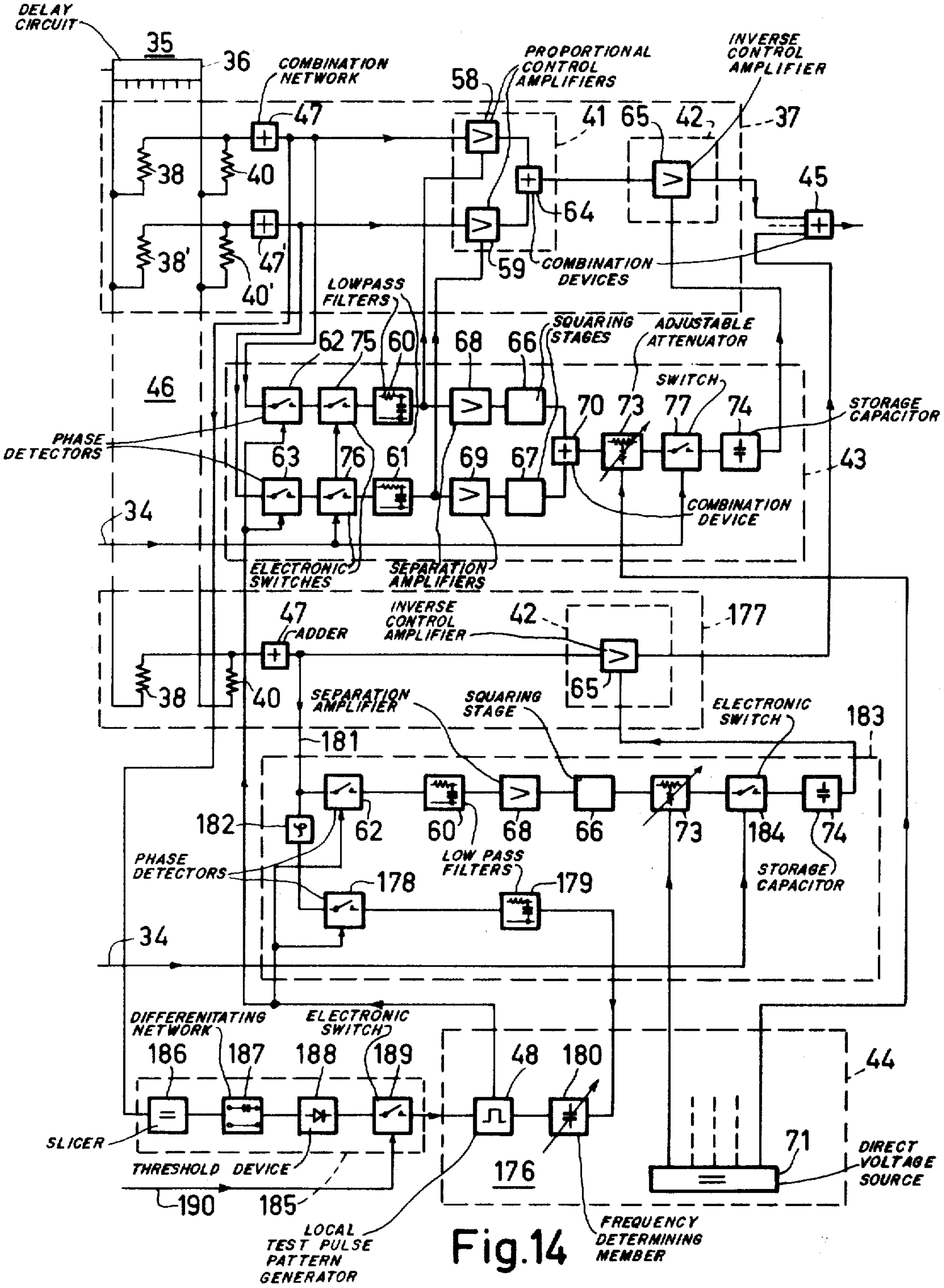
FIG. 14 shows an important improvement of the system shown in FIG. 12 and to this end

FIG. 14 shows a further elaboration of an equalization system according to the invention of the type shown in FIG. 12 in which the equalization characteristics are improved to a considerable extent using the steps shown in FIG. 12 while maintaining the realized simplification in equipment.

Figure 15:
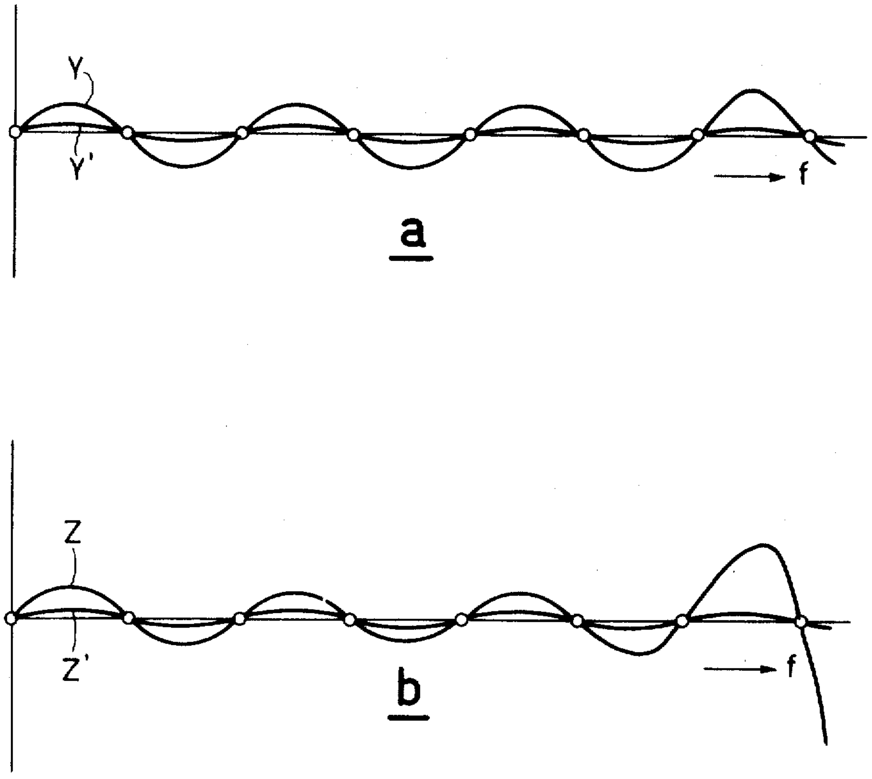
FIG. 15 shows some frequency diagrams.

For the purpose of illustration FIGS. 15*a* and 15*b*, using the steps shown in FIG. 12, show an amplitude-versus-frequency and a phase-frequency diagram, respectively, which, as is well known, extend in frequency slightly beyond the Nyquist frequency of half the clock frequency. Particularly the curve Y in FIG. 15*a* shows the amplitude deviation between the total amplitude frequency characteristic of the transmission path and equalization network and the ideal total amplitude-frequency characteristic, while the curve Z in FIG. 15*b* shows the phase deviations between the total phase-frequency characteristic of the transmission path and equalization network and the ideal total phase-frequency characteristic. At the area of the adjusting points shown by circles of the curves Y and Z located on the frequency components of the adjusting signal the amplitude and phase control used has reduced the amplitude and phase deviations to substantially zero, while beyond the adjusting points amplitude and phase deviations occur whose value will decrease with a decreasing frequency distance between the consecutive frequency components of the adjusting signal.

In accordance with the system shown in FIG. 14 a considerable improvement of the equalization characteristics is realized in that the frequency component selected in a selector and located at half the clock frequency in the received adjusting signal comprising this frequency component is applied as a control signal to a phase control circuit 176 connected to the local test pulse pattern generator 48, which phase control circuit brings the phase deviation between this frequency component in the output channel 177 connected to the frequency analyzer 35 and in the local test pulse pattern of the local test pulse pattern generator 48 to an integral number of times k the phase shift $\pi$ with $k = 0, 1, 2, 3, 4, \ldots$. In the given embodiment the phase control circuit 176 connected to the local test pulse pattern generator 48 is constituted by a phase stabilization loop provided with a phase detector 178 in the form of an electronic switch, a subsequent low-pass filter 179 and a local test pulse pattern generator 48 having a frequency-determining member 180, for example, a variable capacitor, the selected frequency component of half the clock frequency of the received adjusting signal being applied as a control signal to the phase detector 178 through control lead 181. Particularly the sub-bandpass filter in the output channel 177 with weighting networks 38 . . . . 40 and adder 47 is utilized as a selector for the selection of the frequency component of half the clock frequency in the received adjusting signal, while the adder 47 is connected to the control lead 181.

Whenever a pulse from the local test pulse pattern generator 48 occurs, the electronic switch 178 operating as a phase detector is closed and a control voltage which is dependent on the phase difference between the frequency components of half the clock frequency of the control signal and of the local pulse pattern is produced in the low-pass filter 179, which control voltage realizes the phase control of the local test pulse pattern generator 48 through the variable capacitor 180 so that a mutual fixed phase shift of $\pi/2$ is produced between the said frequency components independently of phase variations of the control signal in the transmission path. To ensure that the mutual phase shifts between these frequency components of half the clock frequency in the ouptut channel 177 and in the local test pulse pattern of the test pulse pattern generator 48 is always equal to $k\pi$ with $k = 0, 1, 2, 3, 4, \ldots$ the control lead 181 between sub-bandpass filter 38, . . . 40, 47 in outut channel 177 and the electronic switch 178, operating as a phase detector, incorporates a $\pi/2$ phase-shifting network 182.

Since it is achieved by the phase control of the local test pulse pattern generator 48 that the mutual phase shift between the freqeuncy component of half the clock frequency in the output channel 177 and in the local test pulse pattern is already brought to the desired value $k\pi$ independent of the properties of the transmission path, the output signal from the sub-bandpass filter 38, 40, 47 in the output channel 177 is only to be brought to the correct amplitude value in an amplitude control stage 42 without phase control in a phase control stage, which in the manner as in the output channel 37 is effected while using an inverse control amplifier 65 controlled by an amplitude control voltage. The phase control of the local test pulse pattern generator 48 has also the result that for generating the amplitude control voltage in the comparator 183 of the output channel 177 an additional sub-bandpass filter 38' . . . 40', 47' and a phase detector 63 connected thereto as in the output channel 37 has become superfluous, namely in the comparator 183 of output channel 177 a phase detector connected to an additional sub-bandpass filter would provide no output voltage as a result of the $\pi/2$ phase shift in the frequency component of half the clock frequency introduced in this additional sub-bandpass filter. Particularly for generating the amplitude control voltage exclusively the output voltage of the phase detector 62 connected to the sub-bandpass filter 38, 40, 47 is utilized which in the manner as in the comparator 43 of the output channel 37 provides the control voltage for the inverse control amplifier 65 through lowpass filter 60, separation amplifier 68, squaring stage 66, attenuator 73 controlled by the direct voltage source 71 and storage capacitor 74.

Both the phase and the amplitude of the output signal from output channel 177 are brought to the correct value in this manner thereafter this output signal is applied to the combination device 45. During the information pulse transmission after the adjusting process the correct phase adjustment and amplitude adjustment are maintained to which end only an electronic switch 184 preceding the storage capacitor is required which switch is opened after each adjusting period by a switching pulse from lead 34 originating from a time switch in the receiver.

The effect realized by using the described system will now be described with reference to the amplitude-frequency and phase-frequncy diagram shown in FIGS. 15*a* and 15*b*, in which curve Y' in FIG. 15*a* and curve Z' in FIG. 15*b* represents the deviations between the total amplitude-frequency characteristic and the phase-frequency characteristic of the transmission path and equalization network and the ideal total characteristics. Likewise as the curves Y and Z the curves Y' and Z' pass through the adjusting points located on the frequency components of the adjusting signal constituted by periodical pulses, but the Applicant found after extensive experiments, which were also confirmed mathematically, a considerable improvement of the equalization characteristics for the information pulses, because outside the adjusting points the deviations of the curves Y' and Z' as compared with the curve Y and Z are reduced to a considerable extent relative to the ideal characteristic. Thus, the use of the steps according to the invention led to the surprising effect that although the pulse resolution of the adjusting signal in the form of periodic pulses after equalization in the equalization networks remains substantially equal, the pulse resolution of the equalized information pulses is improved to a considerable extent which is to be ascribed to the differences in frequency spectral of the periodic adjusting pulses and information pulses, namely the periodic test pulses exhibit a line spectrum and the information pulses exhibit a continuous freqeuncy spectrum. Without reduction of the frequency distance between the frequency components of the adjusting signal, that is to say, without increasing the number of output channels a considerable improvement of the equalization of the information pulses was thus realized, or conversely for the same equalization of the information pulses the number of output channels can be reduced.

In the indicated equalization network as a result of the phase control of the local test pulse generator 48 by the selected frequency component of half the clock frequency in the received test pulses there exists between the said received test pulses and the pulses from the local test pulse pattern generator 48 a given time or phase relation having a multiform character because the control signal of half the clock frequency derived from control lead 181 is a higher harmonic of the repetition frequency of the test pulses. Although not critical, the best results were found to be realized by ensuring that at the instant of occurrence of a test pulse from the local test pulse pattern generator 48 the received test pulse is located approximately in the middle of the delay circuit 36, which is realized in a simple manner by applying the selected repetition frequency of the received adjusting signal, for example, originating from subbandpass filter 38, 40, 47 in the output channel 37 after pulse conversion in a pulse converter 185 as adjusting pulses to the local test pulse pattern generator 48. In this embodiment this pulse converter 185 is simple, particularly the pulse converter 185 is constituted by a slicer 186 followed by a differentiating network 187 and a threshold device 188 in which the pulses passed by the threshold device 188 having a given polarity and a repetition frequency which is equal to the repetition frequency of the received test pulses are applied as adjusting pulses to the local test pulse pattern generator 48.

When it is ensured by some times of occurrence of the adjusting pulses of pulse converter 185 that the local test pulse pattern generator 48 is brought to the correct time position, this adjustment of the local test pulse pattern generator 48 is rendered inactive for the adjusting pulses by using an electronic switch 189 which is opened, for example, by a switching pulse from lead 190 originating from the time distributor in the receiver, whereafter accurate phase synchronization of the local test pulse pattern generator 48 in the phase stabilization loop 176 is effected at half the clock frequency of the received test pulse pattern. Simultaneously with the phase synchronization at half the clock frequency the received and locally generated test pulse patterns are brought to a mutually desired time position.

In addition to the embodiment shown in FIG. 14 further embodiments are possible within the scope of the invention. For example, as a selector for the control signal of half the clock frequency for the phase control circuit 176 connected to the local test pulse pattern generator 48 it is possible to use a separate selector which to this end is connected, for example, to the input of the delay circuit 36, instead of the sub-bandpass filter 38, 40, 47 in the output channel 177 of the frequency analyzer 35.

Figure 16:
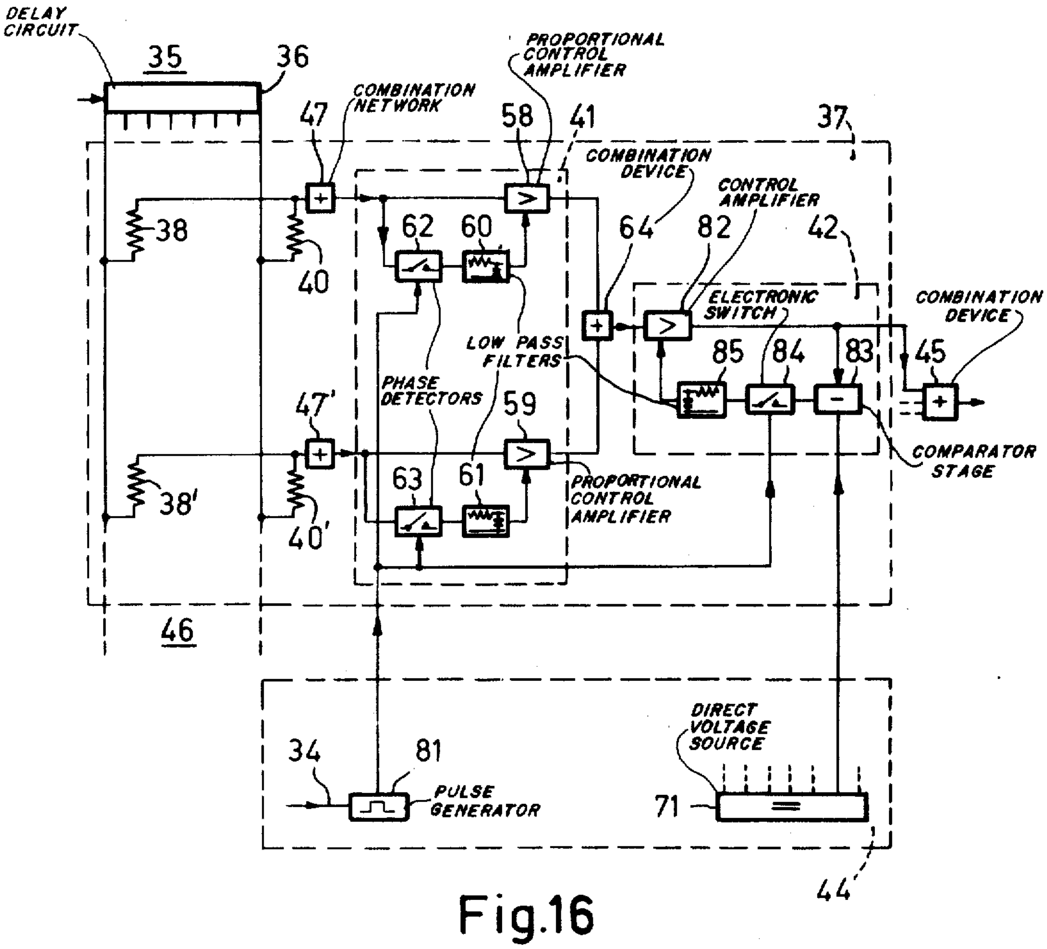
FIGS. 16, 17, 18 and 20 show further embodiments of a system according to the invention in which additional simplifications in structure are realized by using the properties of the transmission path
Figure 17:
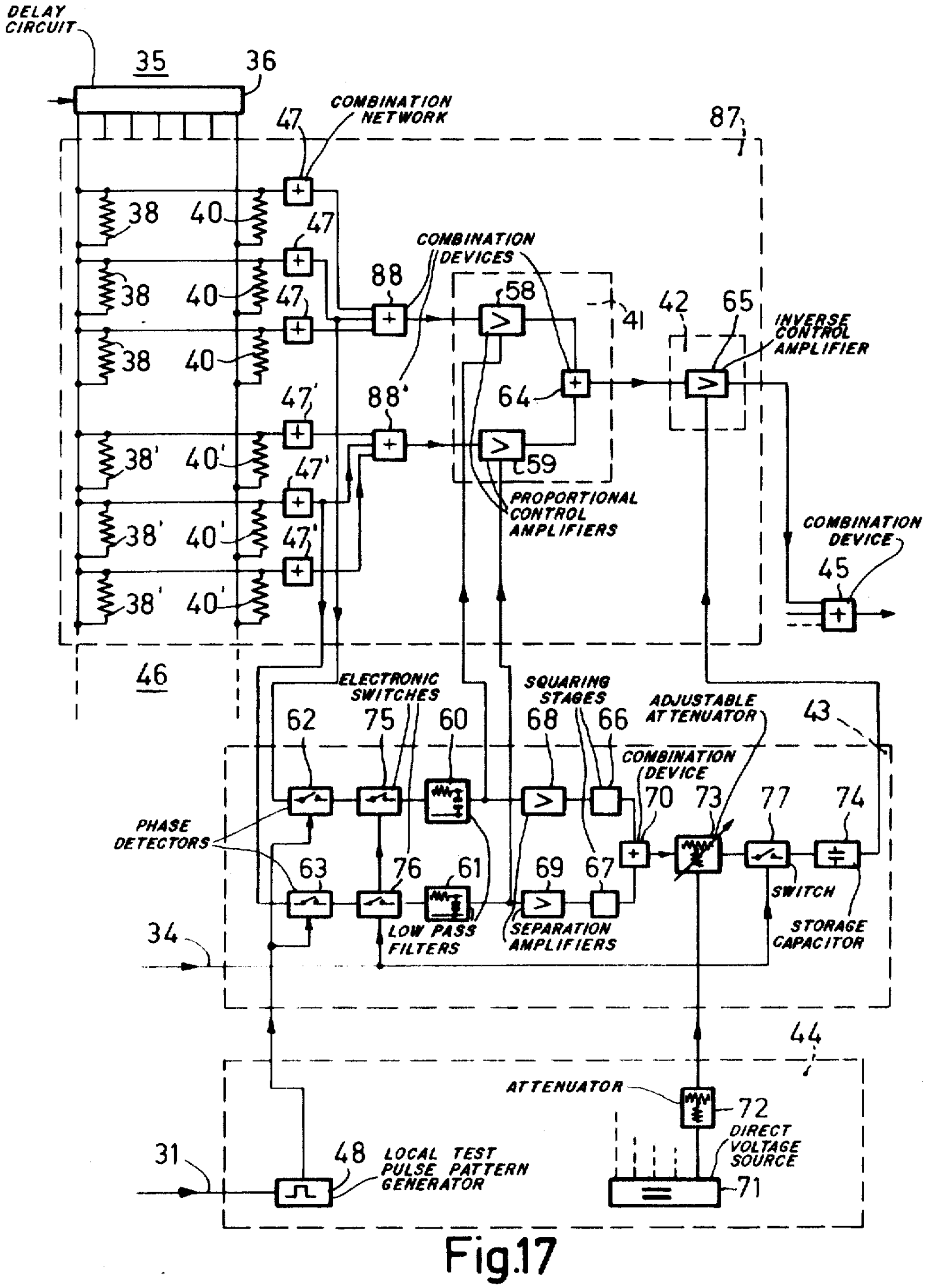

While the embodiments of FIGS. 9, 10, 11, 12, 14 show simplifications in equipment without accounting for the transmission path, FIGS. 16 and 17 show embodiments having further simplifications by accounting for the properties of the transmission path.

FIG. 16 shows an embodiment adapted for the reception of signals which are not perturbed by interference signals of essential amplitude or interruptions in the transmission path, hence for received signals which are substantially only distorted as a result of the transmission characteristic of the transmission path.

As in the embodiment shown in FIG. 9 the signals derived from the two sub-bandpass filters 38, 49, 47; 38', 40', 47' having the same amplitude-versus-frequency characteristic but phase-frequency characteristics which are mutually shifted over $\pi/2$ in phase are applied in the system described to the phase control stage 41 including proportional control amplifiers 58, 59 and combination device 64 in which in the manner as in FIG. 9 the control voltage is derived from the lowpass filters 60, 61 at the output of the electronic switches 62, 63 formed as phase detectors, which in case of occurrence of a pulsatory reference voltage are closed for a short period. Since in this system there is the certainty of an unperturbed transmission of the received pulses, the phase reference need not be used with a local test pulse pattern generator synchronized with the test pulse pattern generator 33 in the transmitter of FIG. 1 but it is sufficient to use a pulse generator 81 which as a phase reference provides only a single pulse. For example, the pulse generator 81 may be connected for this purpose through lead 34 to a switching signal originating from the time divider 29 which signal releases the pulse generator 81 once during the adjusting period.

When it is assumed, as in FIG. 9, that the frequency component of the adjusting signal selected by the subbandpass filters 38, 40. 47; 38', 40', 47' can be represented by $a_m\cos(2\pi mt/NT + \phi_m)$ and $a_m\sin(2\pi mt/NT + \phi_m)$ and that the pulse from the pulse generator 81 occurs at the instant $t = 0$, control voltages $a_m\cos\phi_m$ and $a_m\sin\phi_m$ are produced in case of a sufficiently short time constant of the lowpass filters 60, 61 for the proportional control amplifiers 58, 59. In conformity with the system of FIG. 9 the phase-corrected signal $a_m^2\cos(2\pi mt/NT)$ is thus produced at the combination device 64 and likewise in conformity with FIG. 9 the amplitude equalization of the signal thus phase-equalized is effected in the subsequent amplitude control stage 42 in which, however, the amplitude control stage 42 has a different construction. Particularly, the amplitude control stage 42 is constituted by a control amplifier 82 having a control voltage circuit provided with the cascade arrangement of a comparator stage 83 for comparing the output voltage of the control amplifier 82 with the amplitude reference $b_m$ originating from the direct voltage source 71, an electronic switch 84 controlled by the pulse generator 81 and a lowpass filter 85 which provides the control voltage for the control amplifier 82.

When at the instant $t = 0$ a pulse from pulse generator 81 occurs, the electronic switch 84 is closed for a short period and the instantaneous input voltage of the control amplifier 82 occurring at this instant and having a value of $a_m^2$ is applied after amplification in the control amplifier 82 and after comparison with the amplitude reference $b_m$ to the lowpass filter 85 so that a control voltage is generated in the lowpass filter 85 such that the output voltage of the control amplifier 82 occurring after the occurrence of the pulse at the instant $t = 0$ is equal to the amplitude reference $b_m$.

The signal $b_m\cos(2\pi mt/NT)$ which is both equalized in phase and in amplitude is then produced at the output of the control amplifier 82, which signal is applied in the manner as in the previous embodiment together with the signals from the other output channels 37 to the combination device 45. With their function for generating the phase and amplitude control voltages the electronic switches 62, 63, 84, due to the interruption of the control voltage circuits of the phase and amplitude control stages 41, 42, also ensure that during the transmission of the information pulses the generated control voltages after the adjusting period are maintained in the storage networks constituted by the lowpass filters 60, 61, 85.

Using the property of the transmission path shown it is thus achieved that on the one hand the adjustment of the equalization network is considerably accelerated, for example, by a factor of 10, while on the other hand the construction of the phase reference source is very simple.

Figure 16A:
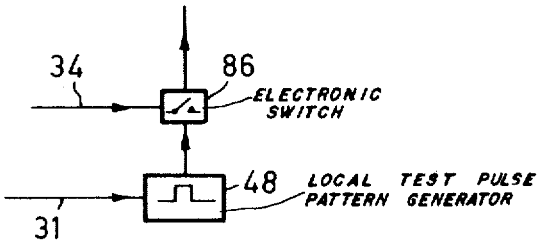

For completeness' sake it is noted that in the given system as illustrated in FIG. 16a instead of the phase reference source 81 the phase reference source shown in the previous embodiments may be used, which source is formed by a local test pulse generator 48 synchronized by clock pulses through lead 31. In this case the lead from the local test pulse generator 48 to the electronic switches 62, 63, 84, incorporate an electronic switch 86 which after the adjusting period is opened by a switching pulse from time distributor 29 through lead 34. The operation of this system is furthermore completely identical to that of the system shown in FIG. 16.

As already noted hereinbefore a pulse pattern generator may be used for the phase reference source for generating periodical pulse patterns, but also a pulse source which supplies a single pulse; generally the instant of occurrence of the output signal from the phase reference source constitutes the phase reference for the phase of all spectrum components of the adjusting signal at the outputs of the sub-bandpass filters 38, 40, 47; 38', 40', 47'. It is alternatively possible to use a signal occurring once instead of a periodical signal for the transmitted adjusting signal.

Figure 18:
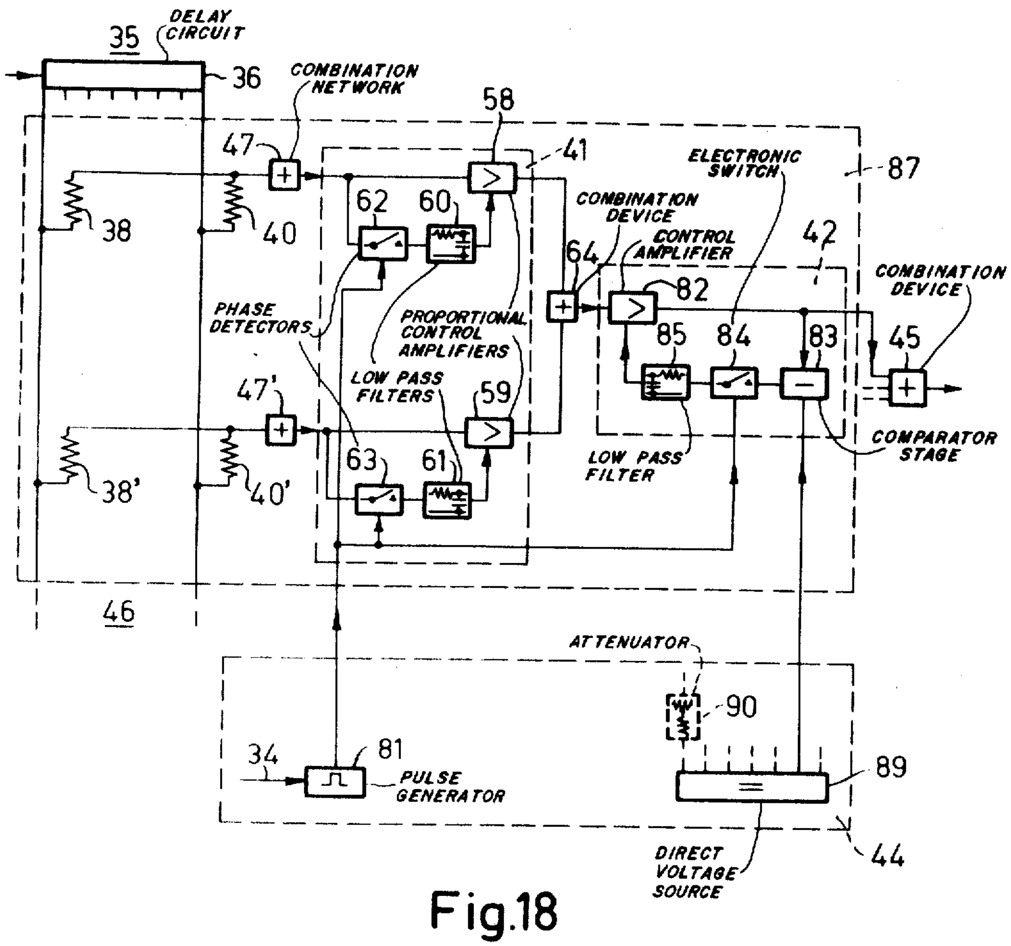

In the embodiment according to FIG. 17 and FIG. 18 simplifications in the structure are obtained by using the property of the transmission path, which in the central part of the high-frequency transmission band of the carrier-modulated information signals has a linear phase-frequency characteristic and a constant amplitude-frequency characteristic course, which has the result that in the freqeuncy range of the demodulated information signals corresponding to the central part of the high-frequency transmission band the deviations of the phase and amplitude equalization characteristics relative to the ideal phase and amplitude equalization characteristics are at a minimum. Especially in case of signal transmission over broad bands such as, for example, the base group of a carrier telephony system of 60 – 180 kHz this property of the transmission path is characteristic.

For the purpose of illustration FIGS. 19a and 19b show for such a broad band transmission system the solid line curves K and L for the phase and amplitude equalization characteristics for the demodulated information signals and the broken line curves M and N for the ideal phase and amplitude equalization characteristics from which it may be apparent that in the frequency range of 10 to 22 kHz corresponding to the central part of the high-frequency transmission band of 78 – 90 kHz at a carrier frequency of 100 kHz the deviations of the equalization characteristics K and L from the ideal equalization characteristics M and N are considerably smaller than those in the freqeuncy ranges of 0 -10 and 22 – 38 kHz corresponding to the edges of the high-frequency transmission band of 62 – 78 kHz and 90 – 106 kHz. In this broad band transmission system a pulse signal having a repetition frequency of 4 kHz is used as an adjusting signal whose spectrum components are thus 0, 4, 8, . . . . 36 kHz and the bandwidth of the sub-bands associated thereto is 4 kHz.

Without noticeably influencing the phase and amplitude equalization characteristics in the region of 10 – 22 kHz corresponding to the central part of the high-frequency transmission band a more course distribution in sub-bands may be used, for example, having a three times larger bandwidth, thus of 3 × 4 kHz = 12 kHz instead of the fine distribution in sub-bands of 4 kHz in the frequency ranges of 0 – 10 kHz and 22 – 38 kHz.

In the structure of the embodiment shown in FIG. 17 the starting point is the system of FIG. 9 in which in the Figure only the output channel 87 having a sub-band of 12 kHz in the frequency range corresponding to the central part of the high-frequency transmission band is shown; the output channels corresponding to the edges of the transmission band having a bandwidth of 4 kHz are not further shown in this Figure because they are built up in the same manner as those in FIG. 9.

In this embodiment the output channel 87 has three sub-bandpass filters 38, 40, 47 and associated additional sub-bandpass filters 38', 40', 47' having pass regions of 10 – 14 kHz, 14 – 18 kHz, 18 – 22 kHz as is shown in the frequency diagram of FIG. 19*c* by the broken line curves P in which by combination in the combination devices 88, 88' the sub-band Q of 10 – 22 kHz shown by the solid line curve is obtained which is further processed in the output channel 87. Entirely in the same manner as in FIG. 9 the sub-band of 10 – 22 kHz thus obtained is applied for phase control to the proportional control amplifiers 58, 59 and after combination in the combination device 64 is applied for amplitude control to the inverse control amplifier 65 whose output signal is combined with those of the other output channels in a combination device 45.

In this system the sub-bandpass filters 38, 40, 47; 38', 40', 47' having pass regions of 14 – 18 kHz select the freqeuncy component of 16 kHz (compare FIG. 19*d*) of the adjusting signal for generating the phase control voltage and the amplitude control voltage in the comparator 43 in which in the manner as is shown in FIG. 9 the phase control voltage is derived from the lowpass filters 60, 61 and the amplitude control voltage is derived from capacitor 74. The operation of the system described is furthermore exactly equal to that according to FIG. 9 and for this reason this system need not be further described.

FIG. 19*e* and FIG. 19*f* show solid line curves R, S representing the phase and amplitude equalization characteristics, respectively, of the system shown in FIG. 17 in which the number of output channels has been reduced from 10 to 8 by threefold enlargement of the sub-bands in the frequency range of 10 – 22 kHz. For the purpose of illustration FIG. 19*e* and FIG. 19*f* show the broken line curves M, N representing the ideal phase and amplitude equalization characteristics.

When simultaneously using the steps already described with reference to FIG. 12 and FIG. 14 of rendering the delay time in the successive delay elements in the delay circuit 36 equal to one clock period, the number of output channels is once more reduced by one so that the original number of output channels is reduced from 10 to 7. Together with the realized essential economy of 30 percent of output channels by using the properties of the transmission path this economy, according to FIG. 19*e* and FIG. 19*f*, is found to have no noticeable influence on the quality of the phase and amplitude equalization characteristics.

FIG. 18 shows a modification of the system shown in FIG. 17 in which a further simplification is obtained in that the enlargement of the sub-bands in the frequency range corresponding to the central part of the high-frequency transmission band is not obtained by combining a number of narrow sub-bandpass filters but by a single braod sub-bandpass filter 38, 40, 47; 38', 40', 47' which by suitable proportioning of the weighting networks 38, 40; 38', 40' can be realized in a simple manner. Particularly the pass region of the sub-bandpass filter in FIG. 18 is equal to the total sub-band of 10 – 22 kHz of the three sub-bandpass filters in FIG. 17 and in that case the transmission factors of the weighting networks 38, 40; 38', 40' in FIG. 18 are to be rendered equal to the sum of the transmission factors of the corresponding weighting networks 38, 40; 38', 40' in the three sub-bandpass filters of FIG. 17.

For the purpose of illustration the frequency diagram of FIG. 19*g* shows the curve T representing the pass region of the sub-bandpass filter of 10 – 22 kHz while FIG. 19*h* shows the selected frequency components of 12, 16, 20 kHz of the adjusting signal in this pass region.

In the structure of the embodiment shown in FIG. 18 the starting point is the system of FIG. 16 in which Figure only the output channel 87 with a sub-band of 10 – 22 kHz corresponding to the central part of the high-frequency transmission band is illustrated; the output channels for the sub-bands corresponding to the edges of the high-frequency transmission band are not further shown in this Figure because they are identically built up as those in FIG. 16. Entirely in the same manner as in FIG. 16 the sub-band of 10 – 22 kHz thus obtained is applied for phase control to the proportional control amplifiers 58, 59 and after combination in the combination device 64 it is applied for amplitude control to the control amplifier 82 including comparator stage 83, the output signal of said control amplifier 82 being combined with those of the other output channels in the combination device 45.

In this system the three selected spectrum components of 12, 16, 20 kHz of the adjusting signal (compare FIG. 19*h*) for generating the phase control voltage in the phase detectors constituted by the electronic switches 62, 63 are compared with the pulsatory phase reference of the pulse source 81 while the phase control voltage thus obtained controls the proportional control amplifiers 58, 59 through the lowpass filters 60, 61.

Each of the said spectrum components of 12, 16, 20 kHz provides a control voltage in the electronic switches 62, 63 with the relevant component of the pulsatory reference, so that a total control voltage is used at the lowpass filters 60, 61 which voltage is substantially three times as large as the control voltage for the central spectrum component of 16 kHz of the adjusting signal. Particularly the central spectrum component of 16 kHz selected in the sub-bandpass filters 38, 40, 47; 38', 40', 47' is represented by $a_m \cos(2\ \pi mt/NT + \phi_m)$ and $a_m \sin(2\ \pi\ mt/NT + \phi_m)$ and in that case the control voltage derived from the lowpass filters 60, 61 is substantially $3a_m\cos\phi_m$ and $3a_m\sin\phi$ which ensures the phase correction of the said spectrum component because after proportional amplification in the control amplifiers 58, 59 the phase-corrected signal of the value: $3a_m^2\cos\phi_m\cos(2\pi mt/NT+\phi_m)+3a_m^2\sin\phi_m(2\pi mt/NT+\phi_m)=3a_m^2\cos(2\pi mt/NT)$ is produced at the combination device 64.

Exactly as in FIG. 16 the amplitude control voltage is generated also in the circuit constituted by the cascade arrangement of the comparison stage 83, the electronic switch 84 controlled by the pulse source 81 and the low-pass filter 85, the value of the output voltage of the control amplifier 82 at the instant of a pulse from the pulse source 81 being brought to the value of the amplitude reference of the direct voltage source 89 by closing of the switch 84.

Since at this instant the amplitude of the three spectrum components of 12, 16, 20 kHz is three times as large as that of a single component, the amplitude reference derived from direct voltage source 89 is to be rendered three times as large as the amplitude reference $b_m$ for a single component. Therefore the direct voltage source 89 yields an amplitude reference of approximately $3b_m$ for the output channels in the frequency range of 10 – 22 kHz corresponding to the central part of the high frequency transmission band, and this amplitude reference for the output channels in the frequency ranges of 0 - 10 and 22 - 38 kHz corresponding to the edges of the high frequency transmission band is brought to the value $b_m$ by means of attenuators 90.

For the purpose of illustration the solid line curves V and W shown in FIGS. 19*i* and 19*j* represent the phase and amplitude equalization characteristics for this system while again the broken line curves M and N show the ideal phase and amplitude equalization characteristics.

Likewise as in FIG. 17 a considerable economy in output channels is realized also in this system by using the said property of the transmission path with an eminent phase and amplitude equalization characteristic. As compared with FIG. 17 the advantage is obtained in this case that the construction of the sub-bandpass filters 38, 40, 47; 38', 40', 47' in the frequency range corresponding to the central part of the high frequency transmission band is considerably simplified.

Figure 19:
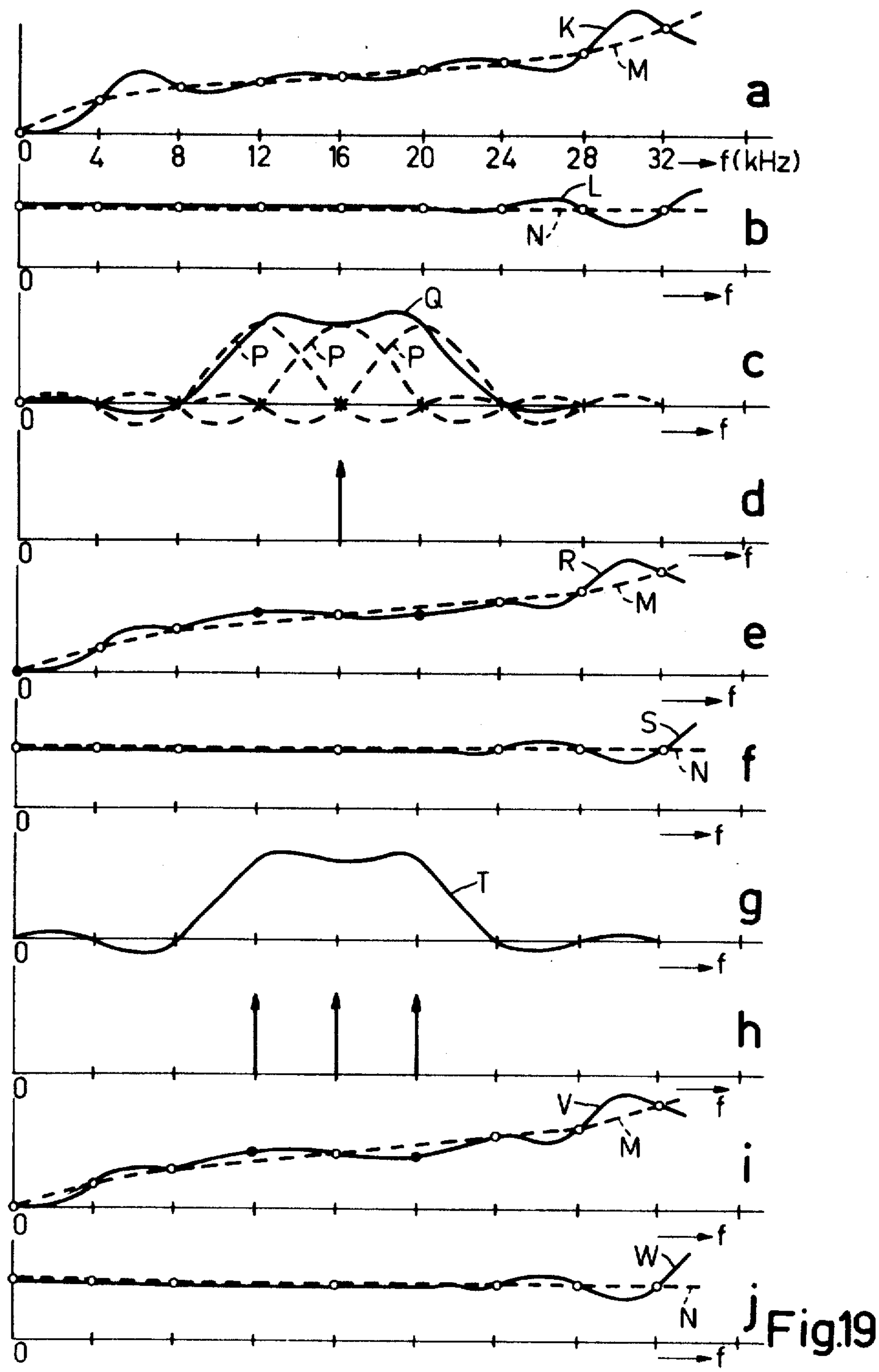
FIG. 19 shows some frequency-diagrams to explain the system shown in FIGS. 17, 18 and 20.
Figure 20:
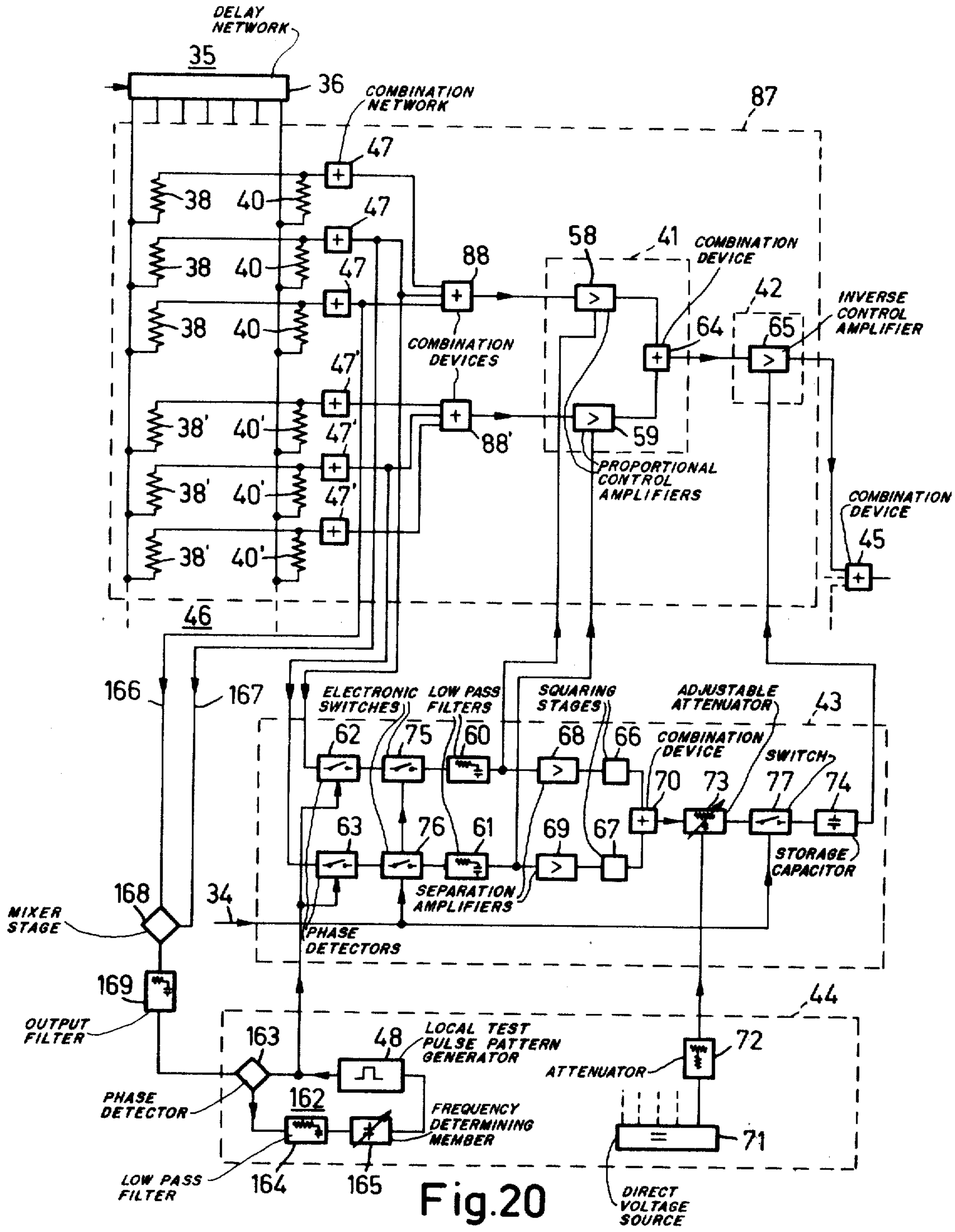

FIG. 20 shows an improvement of the automatic equalization systems already shown in FIGS. 17 and 18 whose operations have been described with reference to the frequency diagrams of FIG. 19. In its construction FIG. 20 constitutes a modification of the equalization system shown in FIG. 17 in which elements corresponding to those in FIG. 17 have the same reference numerals.

In the system according to FIG. 20 the purpose is to reduce the deviations of the phase equalization characteristics realized with the system according to FIGS. 17 and 18 (compare curves R and V in FIGS. 19*e* and 19*i*) relative to the ideal phase equalization characteristic shown by the broken line curve M. For this purpose the slope of the linear phase-frequency characteristic on which the spectrum components of the phase reference source constituted by pulse pattern generator 48 are located are brought in conformity with the slope of the linear phase-frequency characteristic in the central part of the transmission path.

In contradistinction to the system shown in FIGS. 17 and 18 pulse generator 48 is not phase-stabilized by clock pulses of the lead 31 connected to time distributor 29, but by the difference frequency of two successive frequency components of the received adjusting signal, which components are selected in the sub-bandpass filters 38, 40, 47 because the phase of the said difference frequency is characteristic of the slope of the linear phase-frequency characteristic in the central part of the transmission path.

In the embodiment shown the pulse pattern generator 48 is to this end incorporated in a phase stabilization loop 162 comprising a phase detector 163 connected to the pulse generator 48, the output signal from said detector controlling a frequency-determining member 165 of the pulse generator 48 through a lowpass filter 164. The difference frequency between two successive frequency components of the received adjusting signal is applied as a control signal to the phase detector 163, which control signal is obtained by applying the frequency components selected in sub-bandpass filters 38, 40, 47 through leads 166, 167 to a mixer stage 168 having an output filter 169.

Since due to this control of the pulse pattern generator 48 the slope of the linear phase-frequency characteristic with its frequency components is brought in conformity with the slope of the linear phase-frequency characteristic in the central part of the transmission path, a constant phase difference between these two characteristics is to be corrected which is entirely ensured by the phase control stage 41. Thus the phase control of the pulse generator 48 substantially avoids deviations between the realized and the ideal phase equalization characteristics.

Under certain circumstances it may even occur that for the said range the phase control stages 41 may be economized, namely in those cases where the phase difference between the linear phase-frequency characteristics of the frequency components of the locally generated adjusting signal and of the central part of the transmission path is equal to zero, that is to say, both characteristics coincide.

With the mentioned advantages of a short acquisition period, absence of instability, accurate equalization, flexibility in the use of the system according to the invention the foregoing embodiments also included the considerable simplifications in their structure which were realized in the practical construction. Particularly the embodiments according to FIGS. 9, 10, 11, 12, 14 show the simplifications without accounting for the properties in the transmission path while the embodiments according to FIGS. 16, 17, 18, 20 show further drastic simplifications while accounting for the properties of the transmission path. In addition the elements used in the automatic equalization system according to the invention can be rendered very suitable for integration in a semiconductor body as will now be further described with reference to FIG. 21.

Instead of an analog delay circuit 36 in the frequency analyzer 35 this embodiment uses a shift register for binary pulse signals 91 provided with shift register elements which are connected in the manner as already previously described to weighting networks 38, 40; 38', 40' in a matrix network 46 of which the weighting networks 39, 40; 38', 40' are connected every time in a row of the matrix network 46 to a combination network 47, 47'. An analog-to-digital converter 92 precedes the shift register 91 and has the form of a delta modulator which is composed in known manner of a difference producer 93, a pulse modulator 95 connected to a pulse generator 94, a pulse generator 96 whose output pulses are applied at one end through a pulse widener 97 to the shift register 91 and at the other end to a feedback circuit connected to the difference producer 93 and incorporating an digital-to-analog-converter 98 in the form of an integrating network. The pulse generator 94 also provides the shift pulses for shift register 91 whose shift frequency is higher than twice the highest frequency in the frequency band to be transmitted, for example, in the given embodiment the pulse frequency is 40 kHz for a maximum frequency of 1.9 kHz in the frequency band to be transmitted.

Dependent on whether the instantaneous value of the output signal from the digital-to-analog converter 98 is smaller or larger than the analog signal also applied to the difference producer 93, a difference signal of negative or positive polarity is produced at the output of the difference producer 93. Dependent on this polarity of the difference signal the pulses originating from the pulse generator 94 occur or do not occur at the output of pulse modulator 95. These pulses are applied through pulse regenerator 96 for suppression of the variations in amplitude, duration or shape produced in pulse modulator 95 to the digital-to-analog converter 98 formed as an integrating network and having a time constant of, for example, 0.5 m sec.

The above-described delta modulator 92 has the tendency to render the difference signal zero so that the output signal from the digital-to-analog converter 98 is a quantized approximation of the analog signal. In fact, for a difference signal of negative polarity the pulse modulator 95 applies a pulse to the digital-to-analog converter 98 so that the negative difference signal is counteracted, whereas for a difference signal of positive polarity the pulse modulator 95 does not apply a pulse to the digital-to-analog converter 98 and thus counteracts the continuance of the positive difference signal. Thus the delta modulator 92 constitutes a pulse series in which the pulses characterize the incoming analog signal by their presence and absence.

If the weighting networks 38, 40; 38', 40' are proportioned in accordance with the rules mentioned hereinbefore for a given sub-band characteristic H (ω), H' (ω), the relevant sub-band is obtained at the output of a digital-to-analog converter 99, 99' incorporated after the combination devices 47, 47'. Particularly the filter action is found to be realized by the arrangement constituted by shift register 91, weighting networks 38, 40; 38', 40' and the combination device 47; 47' because without this arrangement just between the delta modulator 92 and the associated digital-to-analog converter 99; 99' at the output of the digital-to-analog converter 99; 99' apart from a certain quantization noise there would just occur the analog signal, which is applied to the delta modulator 92. Thus, when an analog signal having a frequency spectrum S (ω) is applied to the delta modulator 92 and when the said arrangement 91, 38, 40, 47; 91, 38', 40', 47' has the sub-band characteristic H (ω); H' (ω) as mentioned hereinbefore, the desired sub-band signal of the frequency spectrum H (ω) S (ω ); H' (ω) S' (ω) occurs at the output of the digital-to-analog converter 99; 99' which signal is applied for further processing to the combination device 45 through the phase and amplitude control circuit in the output channel 37. Instead of delta modulation a different type of pulse code modulator may alternatively be used because the filter action given by the formula H(ω) S(ω); H'(ω) S'(ω) is independent of the pulse code used.

Figure 21:
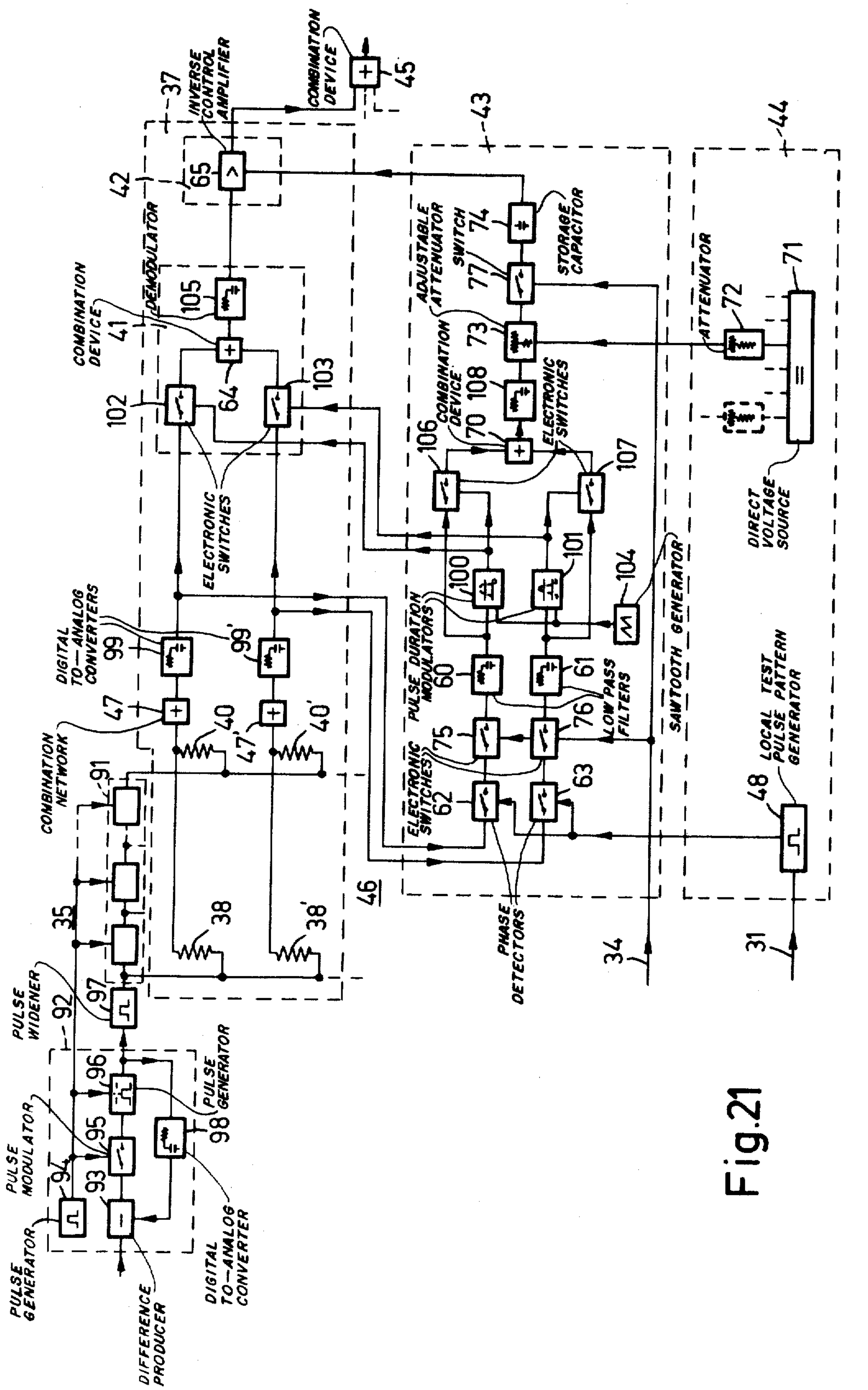
FIG. 21 shows a system according to the invention which is particularly suitable for integration in a semiconductor body owing to its construction in digital techniques.

Not only is the frequency analyzer 35 of FIG. 21 rendered very suitable in this manner for integration in a semiconductor body but also the construction of the output channel 37 and the associated comparator 43 is suitable as in the system according to FIG. 9 the signals for phase correction derived from sub-bandpass filter 38, 40, 47; 38', 40', 47' are applied to the phase control stage 41 which is controlled as a function of the generated output voltages of the phase detectors 62, 63 formed as electronic switches, while the amplitude control is realized in the amplitude control device 65 having an inverse control characteristic whose control voltage is obtained by squaring the smoothed output voltages from phase detector 62, 63 followed by combination in the combination device 70 and attenuation in the attenuator 73 controlled by the amplitude reference.

To obtain an embodiment which is very suitable for integration in a semiconductor body the output voltages of the phase detectors 62, 63 are not immediately utilized but are first converted in the pulse duration modulators 100, 101 into duration-modulated pulses so that it is made possible for the proportional control amplifiers in the phase control stage 41 to utilize normally blocked electronic switches 102, 103 which are released every time for an output pulse from the pulse duration modulators 100, 101. In the given embodiment the pulse duration modulators 100, 101 are formed as slicers to which together with the smoothed output voltages from the phase detectors 62, 63 also a sawtoothshaped auxiliary signal having a frequency of 50 kHz is applied which signal originates from a sawtooth generator 104 which is common to all output channels 37.

Thus, duration-modulated pulses which also vary in amplitude with the output voltages of the sub-bandpass filters 38, 40, 47; 38', 40', 47' are produced at the outputs of the electronic switches 102, 103 while after combination in the combination device 64 and demodulation in demodulators 105 formed by a lowpass filter the phase-corrected sub-band signal is obtained as will now be described in greater detail.

When, likewise as in FIG. 9, it is assumed that the frequency component of the adjusting signal derived through the sub-bandpass filters 38, 40, 47; 38', 40', 47' is represented by $a_m \cos(2\pi mt/NT + \phi_m)$ and $a_m \sin(2\pi mt/NT + \phi_m)$ phase control voltages $a_m \cos \phi_m$ and $a_m \sin \phi_m$ are generated in the phase detectors 62, 63 after smoothing in the filters 60, 61 which voltages are applied as modulation voltages to the pulse duration modulators 100, 101. Thus pulses are derived from the outputs of the electronic switches 102, 103, the duration of which pulses varies proportionally to the phase control voltages $a_m \cos \phi_m$ and $a_m \sin \phi_m$ and the amplitude to the output signals $a_m \cos(2\pi mt/NT + \phi_m)$ and $a_m \sin(2\pi mt/NT + \phi_m)$ of the sub-bandpass filters, so that by demodulation of these duration and amplitudemodulated pulses in the demodulator 105 formed as low-pass filters, an output signal is obtained which simultaneously varies proportionally to the duration and amplitude of these pulses.

Mathematically, an output signal of the demodulator 105 is then produced which is given by the formula: $_m^2\cos\phi_m\cos(2\pi mt/NT + \phi_m) + a_m^2\sin\phi_m\sin(2\pi mt/NT + \phi_m) = a_m^2\cos 2\pi mt/Nt$.

Exactly as in FIG. 9 the accurately phase-equalized signal of the value $a_m^2\cos\pi mt/Nt$ is produced in this manner whose amplitude value $a_m^2$ as described with reference to this Figure in the amplitude control stage including in the inverse amplitude control device 65 is brought in conformity with the amplitude value $b_m$ according to the Nyquist criterion applying to this frequency component of the adjusting signal. Thus, the phase and amplitude-equalized signal $b_m\cos 2\pi mt/Nt$ occurs at the output of the amplitude control device 65 which in the manner as in the previous embodiments is applied together with the signals from the output channels 37 to the combination device 45.

In the given embodiments the squaring stages of the smoothed output voltages of phase detectors 62, 63 for generating the amplitude control voltage are likewise brought to a form which is suitable for integration in a semiconductor body by the combined use of pulse duration and amplitude modulation. To this end the output voltages from the pulse duration modulators 100, 101 control two further electronic switches 106, 107 which, likewise as the pulse duration modulators, are fed by the smoothed output voltage from the phase detectors 62, 63. In conformity with the previous explanation an output signal of the value $a_m^2$ is obtained after combination in the combination device 70 and demodulation in a demodulator 108 in the form of a lowpass filter as in FIG. 9, which output signal controls in the manner described the inverse control amplifier 65 through the adjustable attenuator 73, electronic switch 77, storage capacitor 74.

The automatic equalization system according to the invention is brought in an elegant manner to a form which is suitable for integration in a semiconductor body by using modulation techniques, particularly pulse code modulation for the construction of the frequency analyzer 35 and by the combined use of pulse duration and amplitude demodulation for both the construction of the phase control stage 41 and for the squaring stages 66, 67.

Also in this embodiment the advantages may be obtained for a delay time of the successive delay elements which is equal to the clock period T as already extensively described with reference to the system of FIGS. 12 and 14. To this end an integral number of times P of the shift period of the shift register elements is rendered equal to one clock period T while the weighting networks 38, 40, 38', 40' are provided every time after P shift register elements. Although it is not strictly necessary, the pulse generator 94 may be synchronized for this purpose by locally generated clock pulses, for example, originating from the time distributor 29.

In this respect it is to be noted that other modifications of the system shown in FIG. 21 are possible. There is all freedom in the position of the digital-to-analog converters, for example, the digital-to-analog converters can be directly connected to the elements of shift register 91 or a single digital-to-analog converter may be sufficient which is then to be connected to the output of the combination device 45. This system may alternatively be formed in accordance with the modification shown in FIG. 10 in which the amplitude control stage 42 is to be provided preceding the phase control stage 41.

Since the received signals are available in a digital form by using the analog-to-digital converter, there is the possibility to form the given functions with digital circuits.

After the foregoing description of the automatic equalization system according to the invention with reference to a number of embodiments possibly accounting for special properties of the transmission path, some embodiments will now be referred to in which the properties of the transmitted signal as such have been accounted for. In a first embodiment the transmission of an information signal comprising a DC component will now be referred to which is, for example, the case in the transmission of binary pulse signals as is shown in FIGS. 5c, 5d and 8a, 8b. The particular aspect in this case is that the output channel of the frequency analyzer 35 adapted for the DC component can be simplified in a considerable manner because for the adjustment exclusively the amplitude of the DC component $a_0$ of the adjusting signal selected in the frequency analyzer 35 can be adjusted without phase control to the correct value.

Figures 22, 23A:
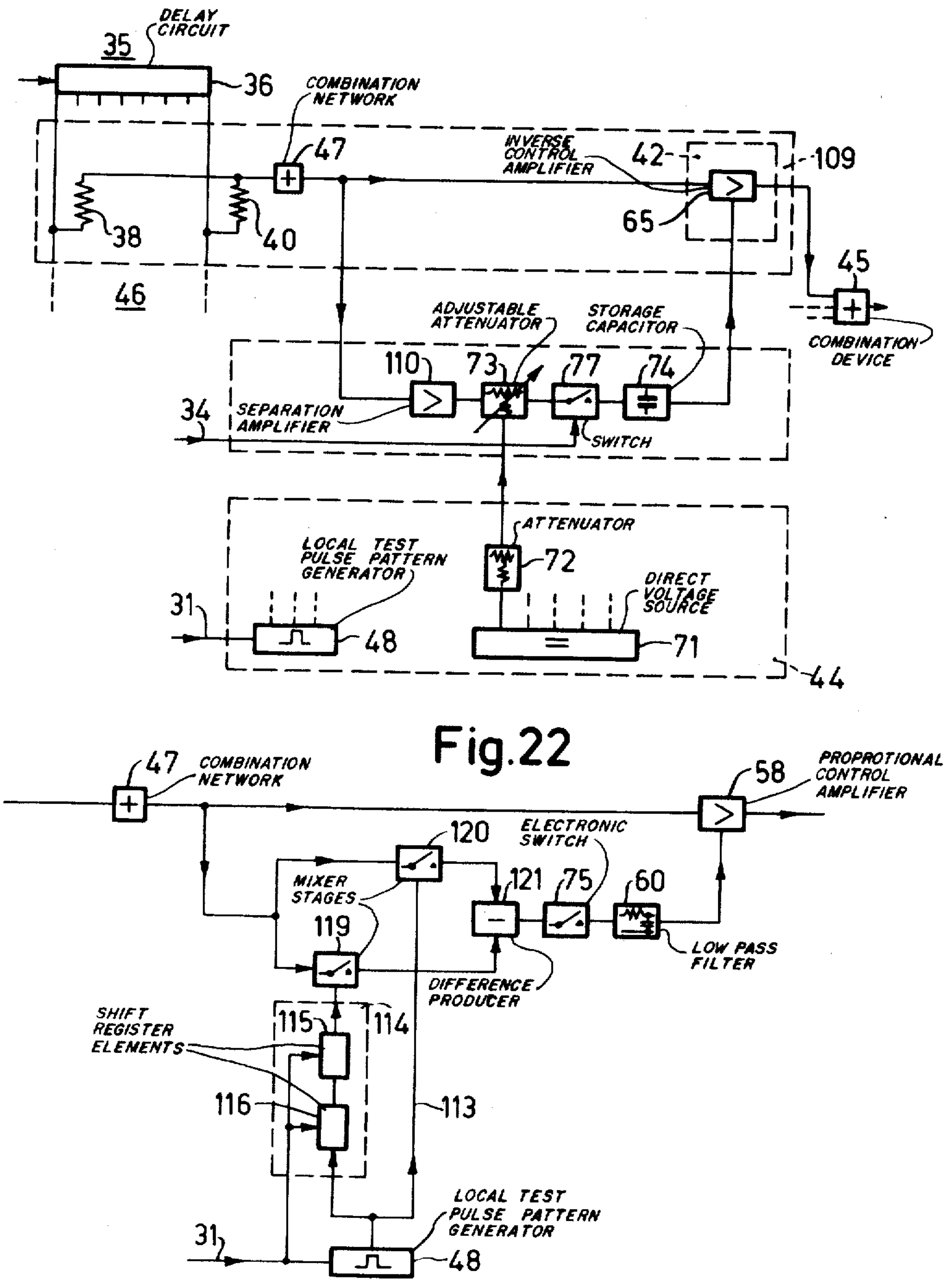

For the purpose of illustration FIG. 22 shows the output channel 109 of the frequency analzyer 35 for the DC component; the other output channels are formed in the manner as described in the previous embodiments and therefore reference is made to these previous embodiments for the structure and operation of these output channels.

Since the DC component does not require phase control, the phase control stage and the additional sub-bandpass filter are omitted in the illustrated output channel 109 for the DC component so that the output signal from sub-bandpass filters 38, 40, 47 is directly applied in this case to the combination device 45 through the amplitude control stage 42. Simultaneously the DC component $a_0$ of the adjusting signal selected in the sub-bandpass filter 38, 40, 47 can immediately be used for generating the control voltage of the amplitude control stage 42. Particularly in the given embodiment the selected DC component $a_0$ is applied to this end through a separation amplifier 110 to an adjustable attenuator 73 controlled by the amplitude reference 71, 72, while the output signal from this attenuator controls the amplitude control stage 42 constituted by an inverse control amplifier 65 in a forward control through the electronic switch 77 and storage capacitor 74 in the manner as shown in FIG. 9.

Instead of a forward control a backward control may alternatively be used for the amplitude control of the DC component in the manner as is shown in FIG. 10. In this case the DC component selected at the output of the amplitude control stage 42 is applied as an amplitude control voltage to the amplitude control stage 42 constituted by a control amplifier after amplitude comparison in a comparison stage 80 with the amplitude reference voltage originating from the attenuator 72 connected to the direct voltage source 71 through the electronic switch 77 and storage capacitor 74 in the manner as is shown in FIG. 10.

In this respect it is noted that the given simplifications of the output channel of frequency analyzer 35 are not strictly necessary for the DC component. For example, due to the uniformity of the output channels of the frequency analyzer 35 it may be important under circumstances to form the output channel adapted for the DC component in the same manner as the other output channels 37 of frequency analyzer 35.

In a second embodiment in which the properties of the transmitted signal as such are accounted for, the case will be referred to where for the purpose of transmission a spectrum conversion of the signals to be transmitted is effected at the transmitter end in a spectrum converter. Such spectrum converters are used for multivalent code converters such as pseudo-ternary converters, for example, for single sideband transmission of pulse signals.

When a spectrum converter of this kind is used at the transmitter end, the phase and amplitude reference for the frequency components of the local adjusting signal is to be brought in conformity for the adjustment of the automatic equalization system in the reference signal source 44 with the phase and amplitude of the frequency components of the adjusting signal at the output of the spectrum converter at the transmitter end.

Figure 23:
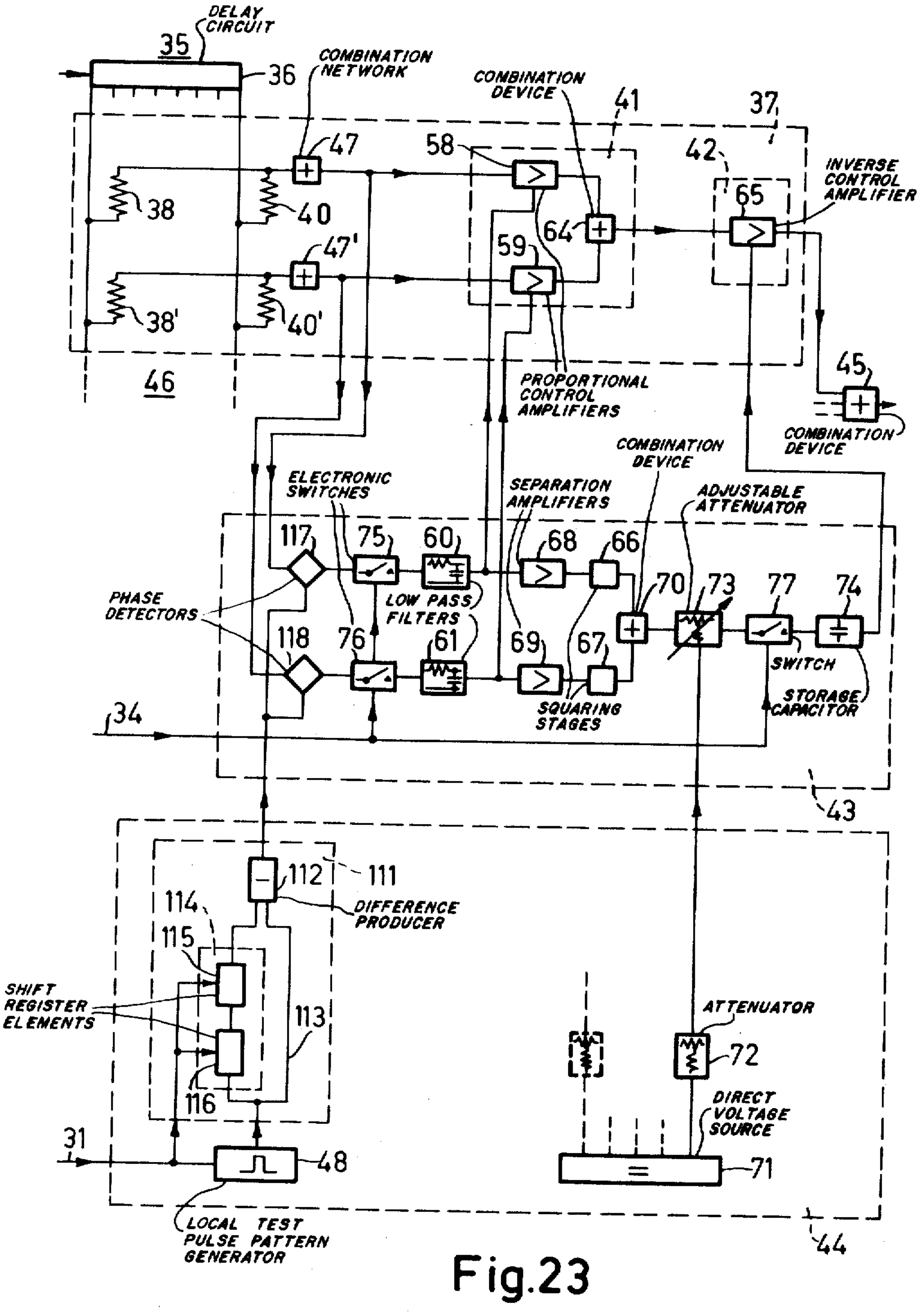

Such an automatic equalization system adapted for a pulse signal transmitted by spectrum conversion is shown in FIG. 23 in which for the purpose of single side-band transmission in the manner as described in United Kingdom Pat. Specification No. 1,132,274 a spectrum converter is used at the transmitter end which is provided with a difference producer to which the pulse signals to be transmitted are directly applied on the one hand and on the other hand through a delay circuit having a delay time of two clock periods. In its construction the system shown in FIG. 23 constitutes a modification of the system shown in FIG. 9 in which elements corresponding to those in FIG. 9 have the same reference numerals.

In order to satisfy the above-mentioned conditions in the reference signal source 44, a spectrum converter 111 is connected to the output of the pulse generator 48 synchronized through lead 31 in the first place for forming the local test pulse generator. This spectrum converter is formed in accordance with the spectrum converter at the transmitter end by a difference producer 112 to which the pulses from pulse generator 48 are applied directly on the one hand through a lead 113 and on the other hand through a delay circuit 114 having a delay time of two clock periods. Particularly, the delay circuit is constituted by a shift register having two shift register elements 115, 116 whose contents are shifted by clock pulses from lead 31. In the spectrum converter 111 each pulse from pulse generator 48 will thus produce two pulses of opposite polarity and mutually shifted over two clock periods as an output signal whose frequency components accurately correspond in phase and amplitude with the phase and amplitude of the adjusting signal transmitted at the transmitter end, because the spectrum converter 111 is rendered equal to the spectrum converter used in the transmitter. For the purpose of illustration FIG. 24*a* shows the pulses from pulse generator 48 and FIG. 24*b* shows the output signal from spectrum converter 111.

Figure 24:
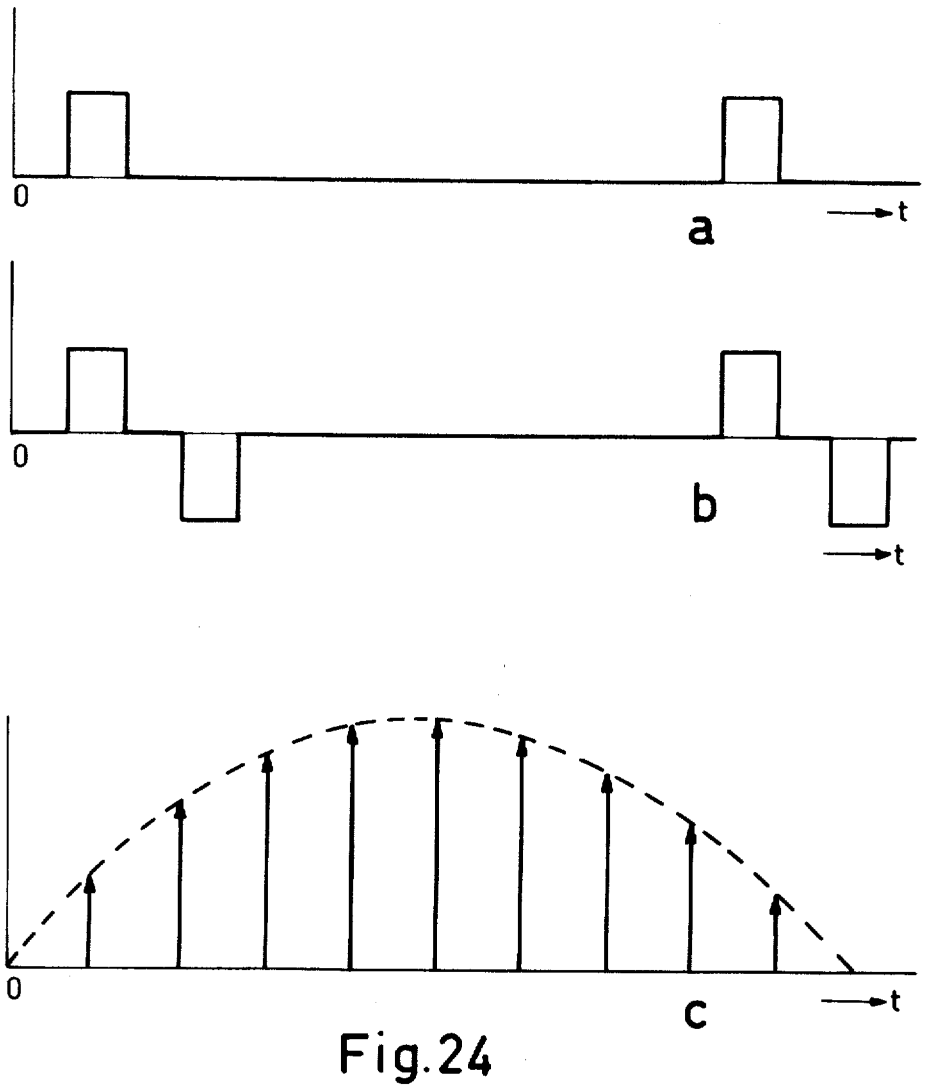
FIG. 24 shows some diagrams to explain the operation of the system of FIG. 23.

For the phase adjustment of the frequency component $\omega_m$ of the received adjusting signal selected in the sub-bandpass filters 38, 40, 47; 40', 47' the output signal from spectrum converter 111, shown in FIG. 24*b* is utilized and particularly phase control voltages are to this end generated by mixing the selected frequency component $\omega_m$ of the received adjusting signal with the output signal from the spectrum converter 111 in phase detectors 117, 118 constituted as push-pull modulators, which phase control voltages then effect the correct phase adjustment of the selected frequency component $\omega_m$ of the adjusting signal in the manner as shown in FIG. 9 in the phase control stage 41 with the proportional control amplifiers 58, 59.

For the amplitude adjustment the attenuation factor of the adjustable attenuator 73 connected to the combination device 70 is adjusted with the aid of the attenuator 72 of the amplitude reference source 71 to a value corresponding to the frequency component $\omega_m$ of the adjusting signal in which likewise in the manner as shown in FIG. 9 the correct amplitude adjustment is effected in the amplitude control stage 42 with the inverse control amplifier 65. Thus the output signal corrected both in phase and amplitude is derived from the amplitude control stage 65 which output signal is combined in the combination device 45 with the output signals from the other output channels 37.

To explain the operation of the system described the operation of the spectrum converter 111 will be described in greater detail. When $\alpha_m e^{j\omega_m t}$ in a formula represents the spectrum component of the angular frequency $\omega_m$ applied through lead 113 to the difference producer 112, in which $\alpha_m$ represents the amplitude of this component, the spectrum component of the angular frequency $\omega_m$ delayed over two clock periods 2 T in the delay circuit 114 is given by the formula:

$$\alpha_m e^{j\omega_m (t-2T)}.$$

Thus a signal of the shape:

$$\alpha_m e^{j\omega_m t}(1-e^{-2j\omega_m T})$$

will be produced at the output of the difference producer 112 which after some derivation may be written as:

$$2\,\alpha_m e^{j\omega_m t} \cdot e^{-j(\omega_m T-\pi/2)} \sin \omega_m T$$

from which it may be apparent that due to the spectrum converter 111 the spectrum component $\omega_m$, apart from a constant time delay T of one clock period, has undergone a shift of $\pi/2$ in its phase and is changed by a factor of sin $\omega_m$T in its amplitude.

For the purpose of illustration the frequency diagram of FIG. 24*c* shows the course in amplitude of the frequency components of the adjusting signal when using the said spectrum converter. This signal does not have the flat amplitude characteristic as in FIG. 5*b* but a sinusoidal variation in accordance with the function sin $\omega_m$T. It is to be noted in this FIG. 24c that the DC component is suppressed by the spectrum conversion.

As is evident from the previous mathematical explanation the spectrum components of the pulse source 48 are to be shifted over $\pi/2$ in phase for the phase reference. Instead of using a spectrum converter 111 in FIG. 23 which is the same as the spectrum converter at the transmitter end, this $\pi/2$ phase shift of the frequency components may alternatively be obtained in a different manner, for example, by using a broad-band phase shifter, by a differentiating network, by selecting each of the spectrum components of the adjusting signal and subsequently giving them a $\pi/2$ phase shift or by using the already present $\pi/2$ phase shift between the output signals from sub-bandpass filter 38, 40, 47 and the additional sub-bandpass filter 38', 40', 47' with the aid of a cross-coupling between these sub-bandpass filters 39, 40, 47; 38', 40', 47' and the phase detectors 117, 118, more specifically by coupling sub-bandpass filter 38, 40, 47 to phase detector 118 and by coupling sub-bandpass filters 38', 40', 47' to phase detector 117.

For the amplitude reference these signals are to have the sinusoidal course for the different spectrum components as is shown in FIG. 24c in which the amplitude reference of the output channel for the DC component is rendered equal to the value of O. Instead of using an output channel for the DC component with an amplitude reference of O, practice proves that it is advantageous to completely omit this output channel, inter alia, in connection with the economy obtained thereby.

FIG. 23a shows a modification for generating the phase control voltage for the phase control stage 41 in the system according to FIG. 23.

Whereas in FIG. 23 the phase control voltage obtained by difference production of the pulses from pulse source 48 applied through lead 113 and the delay network 114 to the difference producer and by subsequent mixing with the spectrum component selected in a subbandpass filter, for example, sub-bandpass filter 38, 40, 47 in a phase detector formed as a push-pull modulator 117, the phase control voltage is generated in a different manner in FIG. 23a, namely by exchanging the sequence of difference production and mixing. Particularly in this embodiment the pulses from pulse source 48 derived from lead 131 and delay circuit 114 are applied to two mixer stages 119, 120 which are fed in a parallel arrangement by the spectrum component selected in sub-bandpass filter 38, 40, 47 and difference production is effected by connecting the outputs of the mixer stages 119, 120 to a difference producer 121 whose output voltage controls the proportional amplifier 58 in the phase control stage 41 through smoothing filter 60 in the manner as is shown in FIG. 23. In practice this modification of the system shown in FIG. 23 for generating the phase control voltages is of special advantage because phase detectors 119, 120 formed as electronic switches can be used in this case.

Independent of the spectrum converter used, an accurate phase and amplitude equalization is always realized in this manner, namely by bringing the phase and amplitude references of the spectrum components of the adjusting signal in the automatic equalization system in conformity with those of the spectrum components of the adjusting signal at the output of the spectrum converter at the transmitter end. While maintaining its advantages an accurate phase and amplitude equalization is always obtained in a simple manner without limitation of the type of signals used. Thus the described equalization system may alternatively be used, for example, for equalization of carrier-modulated signals.

In all previous embodiments it may be advantageous for the construction of the different sub-bandpass filters 38, 40, 47; 38′, 40′, 47′ to adapt the attenuations of these sub-bandpass filters to the intensity of the selected frequency component of the adjusting signal.

Not only is the automatic equalization system according to the invention particularly suitable to be used for pre-set control as already extensively described hereinbefore, but it may also be utilized with special advantage for the adaptive control in which the adjustment of the automatic equalization system is effected in the time space of the information signal transmission.

In a first embodiment (compare FIG. 1) the time distributor 12 includes a time multiplex distributor which connects the switch 13 alternately to the pulse source 1 and to the test pulse pattern generator 33. At the receiver end the time distributor 19 (compare FIG. 2) includes a time multiplex distributor co-operating with the time multiplex distributor at the transmitter end which releases and blocks the switches 56, 57 so that the phase and amplitude adjustment is recontrolled every time during the transmission of the adjusting signal in the time space of the information signal transmission.

In a second embodiment of an automatic equalization system of the adaptive type the adjustment is effected by a test or adjusting signal transmitted simultaneously with the data signals as will now be described in greater detail with reference to the transmitter of FIG. 25 and the receiver of FIG. 26.

In the transmitter of FIG. 25 the information pulses from pulse source 1 are to this end directly combined with the pulses from test pulse pattern generator 33 as an adjusting signal in a combination device 122 without the interposition of a switch, whereafter the combined signal thus obtained and as already shown in FIG. 1 is transmitted to the receiver end through lead 5 after modulation on a carrier.

Periodical pulse patterns of pulses occurring in an irregular alternation are generated as an adjusting signal by test pulse generator 33 which to this end is formed as a pseudo-random pulse generator. Particularly in the given embodiment a pseudo-random pulse generator of a type known per se is used which is constituted by a feed-back shift register 123 having shift register elements 124, 125, 126, 127, whose contents are shifted by clock pulses of the time distributor 12, and in which the output of shift register 123 is fed back to its input and to a modulo-2-adder 128 incorporated between the shift register elements 126, 127.

When upon switching on the pseudo-random pulse generator 33 a starting pulse originating from a starting pulse source 129 is applied to the input of shift register 123, shift register 123 will start to generate pulse patterns as a result of the feedback with a recurrent repetition period which is equal to $2^n - 1$ clock periods in which n represents the number of shift register elements. In the given embodiment of the pseudo-random pulse generator 33 provided with 4 shift register elements pulse patterns having a repetition period of 15 clock periods are generated, in which course for a repetition period is illustrated in the time diagram of FIG. 27a.

Figure 27:
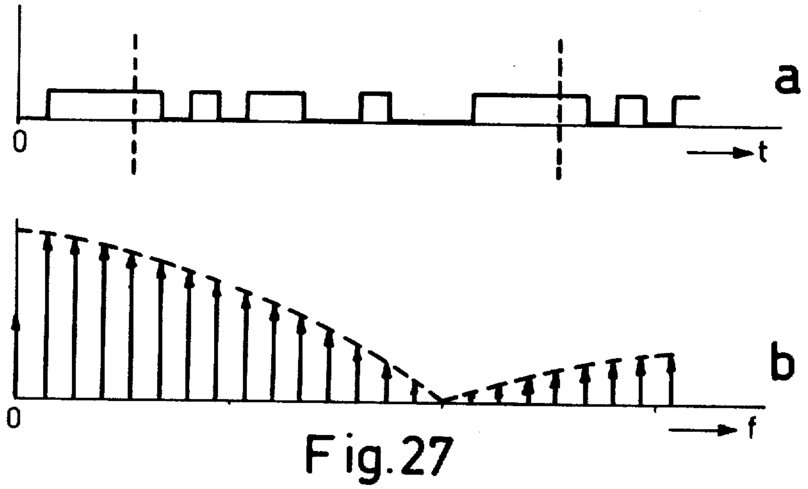
FIG. 27 shows some diagrams to explain the systems of FIGS. 25 and 26.

The periodical pulse pattern having a period of 15 clock periods generated by the pseudo-random pulse generator 33 has a line spectrum such as is shown in the frequency diagram of FIG. 27b whose frequencies are equal to an integral number of times the repetition frequency. In the given embodiment in which a clock period likewise as in the system of FIG. 1 is equal to 312.5 $\mu$ sec. the frequency components of the line spectrum are located at an integral number of times the repetition frequency of 213.33 . . . Hz.

FIG. 26 shows a receiver cooperating with the transmitter of FIG. 25 which receiver is formed as a modification of the receiver shown in FIG. 9. Elements corresponding to those in FIG. 9 have the same reference numerals.

Exactly in the manner as already described extensively with reference to FIG. 9 the phase control in this case is effected in a phase control stage 41 having proportional control amplifiers 58, 59 by means of a phase control voltage which is obtained by mixing the spectrum component of the periodical pulse patterns derived from the sub-bandpass filters 38, 40, 47; 38', 40', 47' with the phase reference of a phase reference source 130 to be described hereinafter in the phase detectors 62, 63 formed as electronic switches.

The amplitude adjustment is likewise effected in the same manner as in FIG. 9 in the amplitude control storage 42 including the inverse control amplifier 65 by making use of the amplitude reference originating from the attenuator 72 connected to the direct voltage source 71, while by combination of the output signals from the amplitude control stages 42 of each output channel in the combination device 45 the phase and amplitude-equalized output signal is derived from the automatic equalization system. Since for the adaptive equalization during transmission of the information pulses the phase and amplitude control voltages are continuously recontrolled and are not stored in storage networks as is the case in preset equalization, the electronic switches 75, 76, 77 of FIG. 9 are omitted in this system.

For the adaptive equalization the phase reference source 130 in the system described is formed as a pseudo-random pulse generator and an associated local oscillator 131 of clock frequency which is synchronized by the pseudo-random pulse generator 33 at the transmitter end and which has the same structure. In the Figure elements of the pseudo-random pulse generator 130 corresponding to those of the pseudo-random pulse generator 33 at the transmitter end have the same reference numerals but they are provided with indices.

For the synchronization of the pseudo-random pulse generator 130 this generator is included in a phase control device comprising a phase detector 132 connected to the pseudo-random pulse generator through an integrating network 133 having a time constant which is longer than the repetition period of a pulse pattern for the automatic phase correction and is connected to a frequency-determining member 134 of the local oscillator 131. For example, the time constant of th integrating network 133 is 0.5 sec. The transmitted signal which as already stated is constituted by the combination of the information pulses from pulse source 1 and the adjusting signal from pseudo-random pulse generator 33 is applied as a control signal to the phase detector 132. The control signal may be derived from the input of the frequency analyzer 35 or from the output of the combination device 45.

In spite of the presence of the information signal in the control signal, there is substantially no influence of the control signal derived from the integrating network 133. When it is assumed on the one hand that the information signal is represented by $u(t)$ and the pulse pattern employed as an adjusting signal by $v(t)$ and on the other hand the locally obtained pulse pattern by $v(t-\tau)$, in which $\tau$ is the time delay of the local pulse pattern relative to the pulse pattern generated at the transmitter end, an output voltage of the value $$\int_0^{kT}[u(t)+v(t)]v(t-\tau)dt=$$

$$\int_0^{kT}u(t)\cdot v(t-\tau)dt+\int_0^{kT}v(t)v(t-\tau)dt,$$

will be produced at the output of the integrating network 133, in which the integration limit kT is considerably larger than the repetition period of the adjusting signal, for example, a factor of 1000.

Since $u(t)$ and $v(t)$ are in principle uncorrelated, the first integral in the right-hand side member is substantially zero for all values of $\tau$ so that an output voltage of the value $$\int_0^{kT}v(t)v(t-\tau)dt$$

which is exclusively dependent on the mutually phase shifted pulse patterns $v(t)$ and $v(t-\tau)$ is produced at the output of the integrating network 133 and causes an accurate synchronization of the pseudo-random pulse generator 130 by controlling the frequency determining member 134. In the given embodiment an output voltage will be produced at, for example, the integration capacitor 133 as a function of the mutual time delay of the two pulse patterns $v(t)$ and $v(t-\tau)$ which starting from a maximum value upon coincidence of the two pulse patterns ($\tau=0$) in case of an increase of the mutual time delay $\tau$ will decrease to a clock period T, and then will assume a constant value in case of a further increase of the time delay $\tau$.

Without influencing by the transmitted information signal the pseudo-random pulse generator employed as a phase reference source 130 for generating the phase control voltages for the phase control stage 41 will be accurately synchronized in its phase by the co-transmitted adjusting signal. Likewise the information signals passed through the sub-bandpass filters 38, 40, 47; 38', 40', 47' in accordance with the given correlation effect will provide substantially no contribution to the formation of the phase control voltages in the lowpass filters 60, 61 for the phase control stage 41 so that the correct adjustment of the described adaptive equalization system is not noticeably influenced by the information signal.

In the practical embodiment it has been found to be advantages for the adjustment to provide a selection filter 142 incorporating a phase corrector between the output of the pseudo-random pulse generator 130 and the phase detectors 62, 63 for selecting, without a phase error, the relevant frequency component from the frequency spectrum of the output signal from pseudo-random pulse generator 130. Particularly the selection filters 142 incorporating the phase correctors may be formed as the frequency analyzer 35 already extensively referred to.

Together with its function as a phase reference source 130 the pseudo-random pulse generator is also utilized for a considerable suppression of the adjusting signal likewise occurring at the combination device 45. This purpose is realized in a simple manner by applying also the output signal from pseudo-random pulse generator 130 through a suitable lowpass filter 136 and an associated phase corrector 137 to a difference producer 135 connected to the combination device. Since for the phase control of the pseudo-random pulse generator 130 as well as of phase control stage 41 there is substantially no influence by the information signal, the components of the adjusting signal still remaining at the output of the difference producer 135 may be further attenuated without perturbation of the satisfactory operation of the equalization system by attenuating the pulse pattern of the pseudo-random pulse generator 33 at the transmitter end (FIG. 25) relative to the output pulses from pulse generator 1. In particular this is achieved by including an attenuator 138 having an attenuation factor of, for example, 10 dB between the pseudo-random pulse generator 33 and combination device 122 while a corresponding attenuator 139 is to be included at the transmitter end in the connection lead between pseudo-random pulse generator 130 and difference producer 135. As such this step has the additional advantage that the required power for the transmission of the adjusting signal can be reduced.

According to the further elaboration of the adaptive equalization system shown in FIGS. 25 and 26 the already slight influence of the information signals on the correct adjustment of the equalization system is found to be further reduced by using at the transmitter end a suitable signal transformation of the signals from the pulse source in a signal transformation device 140 before the combination device 122 while at the receiver end an inverse signal transformation device 141 is included after the combination device 45 for recovering the pulses transmitted by pulse source 1.

FIGS. 28 and 31 show some very advantageous embodiments of such signal transformation devices 140 and FIGS. 29 and 39 show the corresponding inverse signal transformation devices which will now be further described with reference to the accompanying frequency diagrams in FIGS. 30 and 33.

To reduce the influences of the signals from pulse source 1 on the adjustment of the automatic equalization system a suppression of discrete frequency components in the transmitted frequency spectrum of pulse source 1 is effected in the signal transformation device 140 shown in FIG. 28, which components coincide with the frequency components of the periodical pulse patterns of the pseudo-random pulse generator 33. It is just these components of the frequency spectrum of pulse source 1 that most strongly influence the adjustment of the automatic equalization system.

For this purpose the signal transformation device 140 includes a spectrum converter 143 of the kind as is denoted by 111 in FIG. 23, comprising a difference producer 144 to which the pulse orginating from pulse source 1 are applied directly on the one hand and on the other hand through a delay circuit 145 having a delay time which is an integral number of times the repetition period of the periodical pulse patterns of 15 T generated by the pseudo-random pulse generator 33. Particularly the delay circuit 145 is constituted by a shift register having fifteen shift register elements whose contents are shifted by the clock pulses of the time distributor 12 through lead 7.

Entirely in the same manner as in FIG. 23 the envelope of the frequency spectrum of the output signal from difference producer 144 will exhibit a sinusoidal variation which for the given proportioning of the delay time of 15 T is given by the formula sin $7.5\omega T$, whose zero points exactly coincide with the spectrum components of the output signals from pseudo-random pulse generator 33.

When FIG. 30*a* shows the frequency spectrum of the output signal from pseudo-random pulse generator 33 after filter 2, FIG. 30*b* shows the envelope of the signal derived from signal transformation device 140 likewise after passing through filter 2, while FIG. 30*c* shows the frequency diagram of the sum of these two signals which is obtained after combination in combination device 122 and passing through filter 22.

Both when generating the control voltages for pseudo-random pulse generator 130 at the receiver end and for the phase control stage 41 in the output channel of th frequency analyzer 37 due to the considerable reduction of the components from pulse source 1 at the area of and in the vicinity of the spectrum components of the adjusting signal (compare FIG. 30*c*), the already slight contributions of these components from pulse source 1 to the output signals of lowpass filters 133, 60, 61 will be still further attenuated which results in a further considerable reduction of the influence of the adjustment of the adaptive automatic equalization system.

In order to recover the binary pulse series from pulse source 1 in the inverse signal transformation device 141 in a very simple manner from the obtained pseudo-ternary pulse series at the transmitter end while using the described spectrum converter 143 in the signal transformation device 140, the signal transformation device 140 includes a modulo-2-adder 149 whose output is connected through the delay circuit 145 to an input and also to the difference producer 144, while the other input of the modulo-2-adder 149 is connected through lead 150 to pulse source 1. When using this modulo-2-adder 149 it is found that the inverse signal converter 141 may be formed by a simple full-wave rectifier as is diagrammatically shown in FIG. 29.

FIG. 31 shows a further embodiment of a signal transformation device 140 in which the reduction of the influence of the signals from pulse source 1 on the adjustment of the automatic equalization system is effected in accordance with a different principle. More particularly, the property of the line spectrum given by a pulse series is utilized in this case which dependent on the irregularity of occurrence of the pulses in the pulse series increasing and hence a pulse more closely approximaing the character of a noise signal enlarges the number of spectrum components of the line spectrum resulting in a corresponding decrease of the power and thus of the amplitude of each of the spectrum components of the line spectrum because the totally transmitted power remains essentially constant.

Using this principle so as to reduce the influence of the signals from pulse source 1 on the adjustment of the automatic equalization system the signal transformation device 140 is connected to the pulse source 1 is to this end formed as a pseudo-random pulse generator 151 of the kind denoted in FIGS. 25 and 26 by 33 and 130, respectively. Particularly the pseudo-random pulse generator 151 includes a feed-back shift register 152 having shift register elements 153, 154, 155, 156, . . . 157 whose output is connected to the input of shift register 152 through a modulo-2-adder 158 likewise connected to the output of shift register element 155 with the aid of a modulo-2-adder 159 which is fed through lead 150 by the pulses from pulse source 1, while the output pulses from modulo-2-adder 159 are derived from lead 160. The contents of shift register elements 153–157 are then shifted by clock pulses from the lead 7 connected to the time distributor 12.

Mathematically it can be provided that by using a pulse generator 151 of this kind, the irregularity of occurrence of the transmitted pulses is increased progressively with the number of shift register elements. Particularly this increase in irregularity of occurrence of the transmitted pulses follows the increase of the repetition period of pseudo-random pulse generator 151 which, as already stated, is given by the formula $2^n - 1$ in which n is the number of shift register elements.

For the purpose of illustration of the effect described hereinbefore FIGS. 33*a* and 33*b* show some frequency diagrams on scale for the case where the pseudo-random pulse generator 151 has four shift register elements. For example, FIG. 33*a* shows the line spectrum of pulse signals applied to the input of pseudo-random pulse generator 151 while FIG. 33*b* shows the line spectrum of the output signal from pseudo-random pulse generator 151.

As may be evident from these frequency diagrams the number of spectrum components of the transmitted pulse signals is increased to a considerable extent particularly by a factor of $2^4 - 1 = 15$ corresponding to a reduction of the power of each of the spectrum components by a factor of 15 and of th amplitude by a factor of $\sqrt{15}=3.88$. In the practical use of this signal transformation device a considerably larger number of shift register elements is used, for example, 20 in the pseudo-random pulse generator.

Likewise as the signal transformation device 141 shown in FIG. 29 the influence of the adaptive automatic equalization system is reduced to a considerable extent by the signals from pulse source 1, namely in this case there also applies that for generating the control voltages for the pseudo-random pulse generator 130 at the receiver end and for th phase control stage 41 in the output channel 37 of frequency analyzer 35 the considerable reduction in amplitude of the components of the transformed frequency spectrum of pulse source 1 at the area and in the vicinity of the spectrum components of the adjusting signal, the already slight contributions of these components of the transformed pulse spectrum to the output signals from the low pass filters 133, 60, 61 still further attenuates.

FIG. 32 shows the inverse signal transformation device 141 which performs the inverse signal processing on the output signals from the equalization system after possible pulse formation for the purpose of recovering pulses transmitted by pulse source 1. For this purpose a device having a shift register 151′ is used as in the signal transformation devices 140 at the transmitter end, which shift register, apart from the absence of feedback, is formed identically as the signal transformation device 140 at the transmitter end. In this case the output signals from the automatic equalization system are applied through lead 161 to the input of the inverse signal transformation device 141, while the shift pulses from shift register 152′ are derived from the lead 31 (compare FIG. 2) connected to time distributor 29.

Elements corresponding to those in the signal transformation device 140 at the transmitter end have the same reference numerals but are provided with indices. Since the inverse signal transformation device 141 is formed in the same manner as the signal transformation device 140 at the transmitter end, but the feedback is omitted, the inverse signal transformation device 141 will accurately perform the inverse signal processing so that the pulses transmitted by the pulse source are derived from the output lead 160′ of modulo-2-adder 159′ which are fed by the input pulses and the output pulses from shift register 152′.

In the system described the above-mentioned signal transformation device 140 brings about a very effective reduction of the influence of the signals from pulse source 1 on the adjustment of this adaptive equalization system because a progressive action is obtained as the influence of the adjustment of the local pseudo-random pulse generator 130 and that of the phase control stage 41 in the output channels 37 of frequency analyzer 35 is simultaneously reduced by the signals from pulse source 1. A characteristic feature of the adaptive equalization system according to the invention is that the influence on the adjustment is reduced to a minimum by the signals from pulse source 1.

FIG. 34 and FIG. 35 show a further embodiment for adaptive equalization with the transmitter shown in FIG. 34 and the receiver shown in FIG. 35 in which together with the information pulses of the pulse source 1 the pulses of a test pulse pattern generator 33 are transmitted as an adjusting signal. In the manner as already described with reference to FIG. 14 an important improvement of the equalization system is obtained on the one hand by rendering the successive connecting points of the weighting networks 38–40 on the delay circuit 36 equal to the clock period T and on the other hand a considerable improvement of the equalization characteristic is realized by such a phase stabilization of the local test pulse pattern generator 130 on half the clock frequency of the received test pulse signal that the phase deviation between this frequency component in the output channel 177 connected to the frequency analyzer 35 and that in the local test pulse pattern is substantially an integral number of times k the phase shift $\tau$ with $k = 0, 1, 2, 3 \ldots$ Likewise as in the transmitter of FIG. 25 the pseudo-random pulse generator 33 is provided with a feedback shift register 191 which in the given embodiment is constituted by three shift register elements 192, 193, 194 whose contents are shifted by shift pulses and in which the output of the shift register 191 is fed back to its input through a modulo-2-adder 195 included between the shift register elements 192, 193. When upon switching on the pseudo-random pulse generator 33 a starting pulse originating from a starting pulse source 129 is applied to the input of shift register 191, shift register 191 will start to generate pulse patterns as a result of the feedback with a recurrent repetition period which is equal to $2^n-1$ periods of the shift pulses in which $n$ represents the number of shift register elements.

In order to ensure that half the clock frequency in the spectrum of the transmitted pseudo-random pulse pattern occurs with a sufficient intensity, the output pulses from the feed-back shift register 191 are applied to an AND-gate 196 with peridic pulses of half the clock frequency derived from a frequency divider 197 connected to clock pulse lead 7 and having a division factor of 2, which frequency divider 197 also provides the shift pulses of the feed-back shift register 191. In the time diagram of FIG. 37*a* the output pulses of the AND-gate 196 during one period of the pseudo-random pulse pattern are shown for the purpose of illustration.

The AND-gate 196 constitutes an amplitude modulator, in which the half clock frequency constitutes the carrier and the modulating signal is constituted by th output pulses from the feed-back shift register 191 having a spectrum which at half the clock frequency has a spectral zero point as a result of the shift register of half the clock frequency. In the output signal of the AND-gate 196 operating as an amplitude modulator the amplitude modulation causes the carrier oscillation constituted by half the clock frequency to occur with a great intensity as is shown by the broken-line arrow F in the frequency diagram of FIG. 37*b*. In the given embodiment the half clock frequency constitutes the highest transmitted frequency of the transmitted pseudo-random pulse pattern.

Before the pseudo-random pulse pattern is combined with the information pulses in the combination device 122 through attenuator 138 it is found in practice that it is advantageous to use a spectrum correction of the spectrum of the pseudo-random pulse pattern in a spectrum corrector 198, for example, a frequency-dependent attenuation network so as to obtain the flat frequency spectrum co-transmitted with the information pulses and being shown by the solid-line arrows in FIG. 37*b*.

FIG. 35 shows a receiver cooperating with the transmitter of FIG. 34 which is formed as a modification of the receiver shown in FIG. 14. Elements corresponding to those in FIG. 14a have the same reference numerals.

In the manner as already described with reference to FIG. 14 the phase control is effected in this case. Particularly the output channel 37 is provided with a phase control stage 41 including proportional control amplifiers 58, 59, while the control voltages for the control amplifiers 58, 59 are obtained by comparing the spectrum component of the received test pulse signal derived from sub-bandpass filters 38, 40, 47; 38', 40', 47' in a phase detector 62, 63 with the corresponding spectrum components of a local test pulse pattern assembly selected in selection filters 142 originating from a local test pulse pattern generator 33' in the phase referecne source 130 to be described hereinafter; the output channel 177 which passes the half clock frequency of the test pulse signal does not include a phase control stage because phase synchronisation of the local test pulse pattern generator 33' ensures that likewise as in the receiver of FIG. 14 the mutual phase difference between the frequency component of half the clock frequency in the received test pulse signal in the output channel 177 and the relevant component of the phase reference source 130 is equal to $k\ \pi$ with $k = 0, 1, 2, 3, \ldots$.

The amplitude adjustment of the output channels is also effected likewise as in FIG. 14 in amplitude control stages 42 including inverse control amplifiers 65 in which the amplitude control voltages are obtained while using a direct voltage source 71 as an amplitude reference. A combination of the output signals from output channels 37, 177 in a combination device 45 yields the output signal from the equalization system in which in the manner as already described with reference to FIG. 26 the equalized information pulses are obtained through a difference producer 135 and an inverse signal transformation device 141 to be described hereinafter. Since for the given adaptive equalization the phase and amplitude control voltages are continuously recontrolled during transmission of the information signals, and are not stored in storage networks as is the case in preset equalization, the electronic switches 75, 76, 77, 184 of FIG. 1 are omitted in this system.

As is illustrated diagrammatically and in greater detail in FIG. 36 for the receiver using adaptive equalization, the phase reference source 130 used includes a pseudo-random pulse generator 33' of the same structure as that at the transmitter end as well as a phase control circuit 199 which together with the pseudo-random pulse generator 33' constitutes a phase stabilization loop. In the Figure elements of the pseudo-random pulse generator 33' corresponding to those of the pseudo-random pulse generator 33 at the transmitter end are denoted by the same reference numerals, but are provided with indices.

Together with its function in the phase reference source the local pseudo-random pulse generator 33' is also utilized for a large suppression of the adjusting signal likewise occurring at the combination device 45 in the form of a pseudo-random pulse pattern. This purpose is realized in a simple manner by applying to the difference producer 135 connected to the combination device 45 also the output signal from the pseudo-random pulse generator 33' through an attenuator 139 and suitable lowpass filter which is combined with a spectrum corrector to one network 136, and a phase corrector 137. In that case the equalized information pulses are obtained at the output of the inverse signal transformation device 141 with a large suppression of the adjusting signal.

Entirely in the manner as described in the foregoing with reference to FIG. 14 the phase synchronization of the local pseudo-random pulse generator 33' causes the phase deviation between the frequency component of half the clock frequency of the received adjusting signal in the output channel 177 and the corresponding frequency component in the local pseudo-random pulse pattern 33' to be brought to substantially the value $k\pi$ with $k = 0, 1, 2, 3$ which is again achieved by applying the frequency component of half the clock frequency derived from output channel 177 through control lead 181 and phase-shifting network 182 as a control signal to the phase control circuit 199 of the local pseudo-random pulse generator 33'. It is also ensured that the received and the local pseudo-random pulse pattern mutually occupy the correct time position by using adjusting pulses which are derived from the selected repetition frequency of the received pseudo-random pulse pattern, for example, as in FIG. 14, of the output channel 37. In this case the output signal from the sub-bandpass filter 38, 40, 47 in the output channel 37 is not directly utilized as is the case in FIG. 14 but the phase control voltages of the phase detectors 62, 63 associated with this output channel 37 and connected for this purpose through leads 200, 201 to the phase control circuit 199.

In the described phase control and phase adjustment of the local pseudo-random pulse generator 130 for the given adaptive equalization likewise as the equalization of the preset type described with reference to FIG. 14, the remarkable and surprising effect is found to be realized that the equalization characteristics are improved to a considerable extent, or conversely the number of output channels can be reduced in case of the equalization characteristics remaining the same. Also in this case the curves Y' and Z' apply for the equalization characteristics obtained which curves are shown in FIG. 15*a* and FIG. 15*b*.

FIG. 36 shows in greater detail the phase reference source 130 which is provided with pseudo-random pulse generator 33' as well as the phase control circuit 199 in the form of a phase stabilization loop which successively includes a phase detector 202, a lowpass filter 203 and a frequency-determining member 204 of shift pulse generator 205 of half the clock frequency, for example, an adjustable capacitor, while the output of the pseudo-random pulse generator 33' may be connected through a selection filter 206 serving for the selection of half the clock frequency to the phase detector 202. When the sub-bandpass filter 38, 40, 47 in the output channel 177 is connected through control lead 181 to phase detector 202, the desired fixed phase difference of $k\pi$ with $k = 0, 1, 2, 3, \ldots$ between the frequency components of half the clock frequency in the output channel 177 and in the local pseudo-random pulse generator 33' independent of the properties of the transmission path will occur due to the $\pi/2$ phaseshifting network 182 in the control lead 181. The operation of the phase stabilization loop described is already extensively described with reference to FIG. 14 and need not be further explained hereinafter.

In order to ensure the correct time position between the received and the locally generated pseudorandom pulse pattern, a phase adjusting stage 207 provided with two parallel-arranged channels 208, 209, is included between the shift pulse generator 205 of half the clock frequency and the pseudo-random pulse generator 33', each channel 308, 209 including a selection gate in the form of an AND-gate 210, 211 and an inverter 212 in the channel 208 in which adjusting pulses to the AND-gates 210, 211 are applied originating from an adjusting pulse generator 213 controlled through leads 200, 201 by the phase control voltages of the phase detectors 62, 63. More particularly the adjusting pulse generator 213 has two decision switches 214, 215 connected to the leads 200, 210 at which pulses having a lower repetition frequency than the repetition frequency of the pseudo-random pulse patterns are obtained by frequency division in a frequency divider 216 of the pulses from shift pulse generator 205. Furthermore the adjusting pulse generator 213 includes selection gates in the form of AND-gates 217, 218 connected to the decision switches 214, 215 in which each output of the selection gates is connected to an input of the AND-gate 210, 211 of the phase adjusting stage 207. A threshold device 219 procedes the decision switch 214 in the given embodiment while the output of the decision switch 215 and of the AND-gate 218 are connected through inverters 220, 221, respectively, to the AND-gate 217 of the adjusting pulse generator 213 and to the AND-gate 211 of the phase adjusting stage 207.

In the described adjusting pulse generator 213 the property is used of the two phase control voltages of the phase detectors 62, 63 giving an unambiguous indication through leads 200, 201 of the mutual time position between the received and the locally generated pseudo-random pulse patterns. Particularly in the case of the desired mutual time position of the received and locally generated pseudo-random pulse patterns, the phase control voltage of the phase detector 62 connected through lead 200 to the decision switch 214 will exceed the threshold voltage to the threshold device 219 which has the result that the decision switch 214 does not pass pulses of the frequency divider 216, the AND-gates 217, 218 remain blocked and the shift pulses from the shift pulse generator 205 can reach the shift register 191' unhampered through the AND-gate 211 which is connected through the inverter 221 to the output of the blocked AND-gate 218.

If the desired mutual time position between the two pseudo-random pulse patterns does not occur, the phase control voltage through lead 200 is located below the threshold value of the threshold device 219 and the pulses from frequency divider 216 are applied through the decision switch 214 to the two AND-gates 217, 218, while the decision switch 215 passes or does not pass the pulses from frequency divider 216 depending on the polarity of the phase control voltage applied through lead 201, which indicates whether the time position of the generated pseudo-random pulse pattern leads or lags relative to the received pseudo-random pulse pattern.

In case of lagging of the generated pseudo-random pulse pattern the decision switch 215 will not pass pulses from frequency divider 216, the AND-gate 217 connected through inverter 220 to the output of the decision switch 215 produces an output pulse and the AND-gate 210 in the phase adjusting stage 207 provides an additional shift pulse for the shift register 191'. During the subsequent repetition periods of the pulses from frequency divider 216 the process described is repeated until the generated pseudo-random pulse pattern is brought to the desired time position.

Conversely, in case of leading of the generated pulse pattern the pulses from frequency divider 216 will be passed by decision switch 215, the AND-gate 218 provides an output pulse and the AND-gate 211 in the phase adjusting stage 207 suppresses during the successive repetition periods of the pulses from frequency divider 216 a shift pulse from the shift pulse generator 205 to the shift register 191' until the generated pseudo-random pulse pattern is brought to the desired time position.

Thus in the system shown in detail in FIG. 36 the generated pseudo-random pulse pattern is brought to the desired time position simultaneously with the desired phase stabilization at half the clock frequency of the received pseudo-random pulse pattern.

The special advantages of the automatic equalization system is preset and adaptive embodiments were already extensively described hereinbefore but it may alternatively be used to advantage for the preequalization type in which the transmitted signals are given a phase and amplitude predistortion of such a value that these are precisely compensated for by the phase-frequency characteristic and the amplitude-frequency characteristic of the transmission path. For this purpose this type of automatic equalization system has two separate frequency analyzers, namely one at the transmitter end and one at the receiver end, in which the phase and amplitude comparators and the associated reference source for generating the phase and amplitude control voltages are incorporated at the receiver end and the phase and amplitude control stages are incorporated at the transmitter end in the output channels of the frequency analyzer, which control stages are controlled by the phase and amplitude control voltages transmitted from the receiver end, for example, through a separate return circuit from the transmitter to the receiver by making use of a transmission method as frequency modulation which is little dependent on the transmission path.

Also for the construction of the different types of equalization such as preset, adaptive and preequalization, it is found that there is no limitation at all for the automatic equalization system according to the invention.

The invention has revealed a new way in the field of automatic equalization which may be qualified as an important technical advance in its different aspects as is evident from the previous extensive considerations. A characteristic feature is the simultaneous occurrence of the advantages which are remarkable for automatic equalizations, notably a minimum acquisition period, stable operation even for transmission paths of very poor quality, universality for the different types of automatic equalization and no limitations in the use of different types of signals but moreover also the advantages which make the practical realization very attractive such as the surprisingly simple structure which is especially suitable for construction in digital techniques and integration in semi-conductor bodies, in which also come further simplifications in the adaptation to the properties of the transmission path.

What is claimed is:

1. A system for automatic equalization of the transmission characteristic constituted by the amplitude-frequency characteristic and the phase frequency characteristic of a transmission band associated with a transmission path and allotted to the transmission of information signals comprising a system input circuit arranged to receive said information signals, a frequency analyzer coupled to said system input circuit for splitting up said transmission band into a number of adjacent frequency subbands, said frequency analyzer comprising a delay circuit for delaying said information signals and a number of parallel output channels, each of said output channels incorporating a subband pass filter and an additional subband pass filter, each filter comprising weighting networks connected between points of different time delay in said delay circuit and a combining circuit for selecting one of said frequency subbands, said weighting networks in said subband pass filter and said additional subband pass filter being arranged so as to provide a sample anplitude-frequency characteristic for corresponding frequency subbands, and a constant mutual phase shift of $\pi/2$ between the phase-frequency characteristics of said corresponding subbandpass filters and additional subband pass filters, said subbandpass filters in all said parallel output channels being further arranged so as to jointly provide an uninterrupted pass region without reject areas for the frequency components of said information signals, said output channels further incorporating means for coupling the outputs of the combining circuits in said subbandpass filter and said additional subbandpass filter to a common channel output, said coupling means comprising phase control means constituted by a first and a second control circuit each having a control input and being coupled between said common channel output and the combining circuit in said subbandpass filter and said additional subbandpass filter, respectively, and amplitude control means having a control input and being coupled with said first and second control circuit, a control voltage generator comprising a number of comparator means connected to said output channels for generating the control voltages for said phase control means and said amplitude control means, said comparator means comprising a phase comparator including a first and a second phase detector, each having one input coupled to the combining circuit in said subbandpass filter and said additional subbandpass filter, respectively, to receive at least one spectrum component of an adjusting signal transmitted through said transmission path to said system input circuit, and another input coupled to a local reference source producing a reference signal having spectrum components of the same frequency as those of said adjusting signal, said first and said second phase detector producing a first and a second phase control voltage, respectively, in response to the phase difference of the spectrum component of said adjusting signal at the output of the combining circuit in said subbandpass filter and said additional subbandpass filter, respectively, with respect to the spectrum component having the same frequency of said reference signal, said phase comparator further including means for applying said first and said second phase control voltage to the control input of said first and said second control circuit, respectively, said comparator means further comprising means coupled to combining circuits in said subbandpass and additional subbandpass filters and to a local amplitude reference circuit for producing an amplitude control voltage, and means for applying said amplitude control voltage to the control input of said amplitude control means, a system output circuit comprising means for coupling said common channel outputs to a common system output.

2. A system as claimed in claim 1, wherein the system for pre-equalization includes a first and a subsequent second frequency analyzer, the second frequency analyzer including comparators for generating the phase and amplitude control voltages which control phase and amplitude control circuits located in the output channels of the first frequency analyzer.

3. A system as claimed in claim 1, wherein the delay circuit is constituted by a digital shift register having a number of shift register elements whose contents are shifted by pulses from a shift pulse generator and that an analog-to-digital converter is provided before the shift register for generating a digital signal which is applied as an input signal to the digital shift register, the weighting networks being connected to elements of the shift register and a digital-to-analog converter being coupled thereto.

4. A system as claimed in claim 1, wherein the weighting networks of the frequency analyzer are included in a matrix in which the points having a different time delay in the delay circuits are connected to the weighting networks located in a column of the matrix, while the sub-bandpass filters of the output channels of the frequency analyzer are constituted by connecting the weighting networks located in a row of the matrix to a combination device.

5. A system as claimed in claim 1, wherein the time delay between two successive connection points of the weighting networks of the delay circuit is at most equal to one period of the highest signal frequency.

6. A system as claimed in claim 5, wherein the time delays taken every time between two successive connection points of the weighting networks of the delay circuit are rendered mutually equal.

7. A system as claimed in claim 1, wherein the sub-bandpass filters constituted by delay circuits having weighting networks connected thereto have amplitude-frequency characteristics which overlap each other for adjoining pass regions, the sub-bandpass filters suppressing the frequency components of the adjusting signal located outside the allotted pass regions of said sub-bandpass filters.

8. A system as claimed in claim 7, wherein the sub-bandpass filters are constituted as filters of the kind sin $(\omega - \omega_m) / (\omega - \omega_m)$ in which is the angular frequency and $_m$ is the angular frequency of a component of the received adjusting signal located in the pass region.

9. A system as claimed in claim 4, wherein the weighting factors $C_{rq}$ of the weighting networks for the sub-bandpass filters and the weighting factors $C'_{rq}$ of the weighting networks for the additional sub-bandpass filters are dimensioned in accordance with the functions:

$$C_{rq} = \cos [2\pi r (q - a) / KN] \text{and}$$

$$C'_{rq} = \sin [2\pi r (q - a) / KN]$$

in which the indices $r$ frorom o to $R - 1$ and the indices $q$ from $o$ to $KN - 1$ denote the rows and columns, respectively, of the matrix, while $a$ is a constant which is proportional to the delay between the input of the delay circuit and the combined output of the sub-bandpass filters and K denotes the ratio between the clock period T and the time delays between successive connection points of the weighting networks of the delay circuit.

10. A system as claimed in claim 9, wherein the value taken for the constant $a$ is approximately $KN/2$.

11. A system as claimed in claim 1, wherein a frequency component in the received signal is suppressed, characterized in that the automatic equalization system is formed by omitting the output channel of the frequency analyzer for this signal frequency.

12. A system as claimed in claim 1, wherein the reference source provided with a reference signal generator provides a frequency spectrum as a reference signal which includes frequency components corresponding to components located at discrete frequency values of the adjusting signal constituted by a frequenty spectrum, the instant of occurrence of the reference signal constituting the phase reference of all received components of the adjusting signal.

13. A system as claimed in claim 12, wherein the adjusting signal is constituted by one single pulse.

14. A system as claimed in claim 12 wherein the reference signal generator included in the reference source is constituted by a pulse generator which upon release provides one single pulse for the adjustment,

15. A system as claimed in claim 12, wherein the received adjusting signal is provided by a test pulse pattern generator, and that the reference signal generator included in the reference source is formed as a local test pulse pattern generator corresponding to said test pulse pattern generator, which local test pulse pattern generator is synchronized with the first-mentioned test pulse pattern generator.

16. A system as claimed in claim 15, wherein the local test pulse pattern generator provides a periodic series of regularly occurring pulses as a test pulse pattern.

17. A system as claimed in claim 15, wherein the local test pulse pattern generator is formed as a pseudo-random pulse generator which provides periodic pulse patterns of pulses occurring in an irregular alternation as a test pulse pattern.

18. A system as claimed in claim 15, wherein a selection filter is included at the output of the test pulse pattern generator for the purpose of selecting the different frequency components of the locally generated test pulse pattern, which frequency components constitute the phase reference of the frequency components of the received adjusting signal selected in the sub-band pass filters.

19. A system as claimed in claim 18, wherein the selection filters are incorporated in a number of parallel arranged output channels connected to a delay circuit, which selection filters are constituted in that each of the output channels is connected through a number of weighting networks to points having a different time delay in the delay circuit.

20. A system as claimed in claim 18, wherein the amplitude reference source is also constituted by the test pulse pattern generator with the selection filter included at the output, in that the amplitude of the frequency components selected in the output filter constitutes the amplitude reference of the components of the received adjusting signal selected in the frequency analyzer.

21. A system as claimed in claim 12, wherein the reference source not only includes the reference signal generator for the phase reference but also an amplitude reference source separated from the reference signal generator.

22. A system as claimed in claim 21, wherein the amplitude reference source is constituted by a direct voltage reference source in which the direct voltages derived from the direct voltage reference source constitute the amplitude reference for the amplitude of the components of the adjusting signal selected in the sub-bandpass filters.

23. A system as claimed in claim 21, wherein the amplitude reference source is constituted by attenuators incorporated in the amplitude control voltage channels whose attenuation factors constitute the amplitude reference for the amplitude of the components selected in the sub-bandpass filters.

24. A system as claimed in claim 1, wherein the phase detectors are connected as a phase comparator to the outputs of the subbandpass filters of the frequency analyzer, which phase detectors are also fed by the phase reference of the local reference source for generating a phase control voltage which is derived from a lowpass filter connected to the outputs of the phase detector.

25. A system as claimed in claim 24, in which a pulsatory voltage is provided as a phase reference by the local reference source, wherein the phase detectors are constituted as electronic switches which are released when the pulsatory phase reference voltage occurs.

26. A system as claimed in claim 24, wherein a pulse duration modulator is connected to the lowpass filter at the output of the phase detectors which modulator converts the phase control voltage into a duration modulated pulse series.

27. A system as claimed in claim 24, in which output channels of the frequency analyzer incorporate a sub-bandpass filter and an additional sub-bandpass filter, wherein in that a phase detector and associated lowpass filter is connected as a phase comparator both to the sub-bandpass filter and to the additional sub-bandpass filter, said two phase detectors being fed by the same phase reference signal from the local reference source.

28. A system as claimed in claim 27, wherein an amplitude control device is connected as a phase control stage both to the sub-bandpass filter and to the additional sub-bandpass filter in an output channel of the frequency analyzer, which amplitude control device is controlled by the output voltages of the phase detectors.

29. A system as claimed in claim 28, wherein the amplitude control devices are constituted as proportional amplitude control devices which provide output voltages proportional to the output voltages of the phase detectors.

30. A system as claimed in claim 28, provided with a pulse duration modulator connected to a lowpass filter at the output of the phase detector, wherein the amplitude control devices are constituted as electronic switches which are controlled by the duration-modulated pulse series from the pulse duration modulator.

31. A system as claimed in claim 28, wherein the output voltages of the amplitude control devices are connected to a combination device.

32. A system as claimed in claim 27, wherein for generating the amplitude control voltages the amplitude comparator includes squaring devices at the outputs of the lowpass filters of the phase detectors connected to the sub-bandpass filter and the additional subbandpass filter, the output voltages of said squaring devices being controlled in value by the amplitude reference after combination in a combination device.

33. A system as claimed in claim 32, provided with a pulse duration modulator connected to a lowpass filter at the output of the phase detector, wherein the squaring devices are constituted by electronic switches which are controlled by the output pulses from the pulse duration modulators while the output voltages of the lowpass filters are applied to the input of said electronic switches.

34. A system as claimed in claim 32, wherein the amplitude control stage included after the phase control stage is constituted as an inverse amplitude control device, which provides an output voltage inverse relative to the amplitude control voltage and that the amplitude control voltage lead from the combination device connected to the squaring devices to the amplitude control stage incorporates an attenuator whose attenuation factor constitutes the amplitude reference.

35. A system as claimed in claim 32, wherein the amplitude control stage precedes the phase control stage and is constituted by a control amplifier connected to the sub-bandpass filter and the additional sub-bandpass filter, which control amplifier is feedback controlled by the amplitude control voltage derived from a difference producer to which the output signal from the combination device connected to the squaring devices and the amplitude reference in the form of a direct voltage is applied.

36. A system as claimed in claim 32, wherein the phase control stage and the amplitude control stage are combined in one stage constituted by connecting a proportional amplitude control device to the sub-bandpass filter and the additional sub-bandpass filter, which amplitude control device provides an output voltage proportional to the control voltage which control voltage is derived from adjustable attenuators located between the lowpass filters of the phase detectors and the proportional amplitude control devices, the control voltage for the adjustable attenuators being derived from the combination device connected to the squaring devices through an attenuator serving as an amplitude reference.

37. A system as claimed in claim 24 in which periodic pulses are provided as a phase reference by the reference signal generator and in which the phase control stage precedes the amplitude control stage, wherein the amplitude control stage is constituted as a control amplifier and that the amplitude comparator is constituted as a return circuit between input and output of the control amplifier, which return circuit is provided with the cascade arrangement of a difference producer fed by the output voltage from the control amplifier and the amplitude reference constituted by a direct voltage, a lowpass filter connected in cascade thereto as well as an electronic switch which is released every time by the pulsatory phase reference for generating in the lowpass filter an amplitude control voltage which is given by the amplitude difference of the output voltage of the control amplifier at the instant of occurrence of the pulsatory phase reference and of the amplitude reference constituted by the direct voltage.

38. A system as claimed in claim 1 in which the received signal includes a DC component wherein the output channel of the frequency analyzer constituted without an additional sub-bandpass filter for the DC component is exclusively provided with an amplitude control stage while a phase control stage is omitted, the DC component selected in the sub-bandpass filter being controlled in its value by the amplitude reference for generating the amplitude control voltage serving for the amplitude control stage.

39. A system as claimed in claim 1, for the equalization of pulse signals whose instants of occurrence are characterized by a fixed clock frequency, wherein an integral number of times the time delay between successive connection points of the weighting networks has been made equal to one clock period.

40. A system as claimed in claim 39, wherein the delay time between successive connection points of the weighting networks is rendered equal to one clock period while the frequency range of the sub-bandpass filter proportioned for the highest pass region is at most located near the Nyquist frequency equal to half the clock frequency.

41. A system as claimed in claim 40 in which the delay circuit is constituted by a digital shift register, wherein an integral number of times P of the period of the shift pulses from the shift pulse generator is rendered equal to one clock period, the weighting networks being connected to the shift register every time after P shift register elements.

42. A system as claimed in claim 41, wherein the shift pulse generator is synchronized by locally generated clock pulses.

43. A system as claimed in claim 39, in which the adjusting signal is constituted by a periodic pulse pattern from a test pulse pattern generator, the pulses of said periodic pulse pattern coinciding with clock pulses occurring at a clock period T, while the phase reference source incorporates a local test pulse pattern generator, wherein the frequency component selected in a selector and located at half the clock frequency in the received adjusting signal comprising this frequency component is applied as a control signal to a phase control circuit connected to the local test pulse generator, which circuit brings the phase deviation between this frequency component in the output channel connected to the frequency analyzer and that in the local test pulse pattern of the local test pulse pattern generator substantially to an integral number of times $k$ the phase shift $\pi$ with $k = 0$ 1, 2, . . .

44. A system as claimed in claim 43, wherein the output channel which passes the half clock frequency of the received adjusting signal is connected through a control lead to the phase control circuit of the local test pulse pattern generator and is formed by a phase stabilization loop provided with a phase detector in which the half clock frequency of the received adjusting signal and the corresponding frequency component of the local test pulse pattern generator are compared for the purpose of generating a phase control voltage which controls the local test pulse pattern.

45. A system as claimed in claim 44, wherein the control lead connected to the phase control circuit of the local test pulse pattern generator includes a $\pi/2$ phase-shifting network.

46. A system as claimed in claim 43 in which the test pulse pattern generator is constituted by a pseudo-random pulse pattern generator provided with a shift register fed back through a modulo-2-adder and having a number of shift register elements whose contents are shifted by a shift pulse generator, wherein the output of the feed-back shift register is connected to a selection gate and also to the output of the shift pulse generator which provides shift pulses of half the clock frequency.

47. A system as claimed in claim 39, wherein the local reference source includes a test pulse pattern generator which is synchronized by locally generated clock pulses, the repetition frequency of said clock pulses being an integral multiple of the repetition frequency of the periodic pulse patterns generated by the local test pulse pattern generator.

48. A system as claimed in claim 39, wherein the amplitude references derived from the amplitude reference source for all frequency channels are mutually equal.

49. A system as claimed in claim 1, in which the adjusting signal is constituted by a periodic pulse pattern of a test pulse pattern generator, while the phase reference source includes a local test pulse pattern generator wherein adjusting pulses derived from the output channel which passes the repetition frequency of the received pulse pattern which adjusting pulses are used for controlling the local test pulse pattern generator, said adjusting pulses adjusting the mutual time position of the received and the locally generated test pulse pattern at a fixed value approximately corresponding to a time distance which is equal to half the time delay of the delay circuit of the frequency analyzer.

50. A system as claimed in claim 49, wherein the outputs of the phase detectors connected to the sub-bandpass filter and the additional sub-bandpass filter in the comparator of the output channel passing the repetition frequency of the received test pulse patterns is connected to an adjusting pulse generator which for the purpose of adjusting the mutual time position between the received and locally generated test pulse patterns controls a phase adjusting stage in the phase control circuit of the local test pulse switch.

51. A system as claimed in claim 50, wherein the adjusting pulse generator is constituted by a first and a second decision switch to which the phase control voltages of the phase detectors are connected directly and through a threshold device, respectively, and also pulses having a lower repetition frequency than the repetition frequency of the test pulse patterns, the adjusting pulse generator furthermore including two selection gates which are each provided with two inputs, the first input of each selection gate being directly connected to the output of the first decision switch and the second input of each selection gate being connected directly and through an inverter, respectively, to the output of the second decision switch, while the adjusting pulses are derived directly and through an inverter, respectively, from the outputs of the two selection gates.

52. A system as claimed in claim 50, wherein the phase adjusting stage is constituted by second parallel-arranged channels each provided with a selection gate having two inputs in which the pulses from a pulse generator in the local test pulse generator are applied directly and through an inverter, respectively, to the first input of the two selection gates, while the adjusting pulses from the adjusting pulse generator are applied to the second input of the two selection gates.

53. A system as claimed in claim 1, wherein in which a part of the transmission path has a linear phase-frequency characteristic and a constant amplitude-versus frequency characteristic, wherein the sub-bandpass filters for the said part of the transmission path exhibit a pass region which passes a number of components of the adjusting signal.

54. A system as claimed in claim 53, wherein one of the components of the adjusting signal located within the sub-bandpass filter is selected which is applied to the phase and amplitude comparator for generating the phase and amplitude control voltage.

55. A system as claimed in claim 53, wherein all components of the adjusting signal located within the sub-bandpass filter are supplied to the phase and amplitude comparator for generating the phase and amplitude control voltage, the amplitude reference being rendered equal to the product of the number of spectrum components of the adjusting signal passed and the amplitude reference applying to one of these components.

56. A system as claimed in claim 53, wherein the local reference source includes a test pulse pattern generator which is included in a phase control loop provided with a phase detector to which a control signal together with the output signal from the local test pulse pattern generator is applied, said control signal being derived from a mixer stage to which two successive components of the received adjusting signal are applied which components are derived from two sub-bandpass filters.

57. A system as claimed in claim 56, wherein the output channels of the frequency analyzer for the said frequency range are constituted without phase control stages in the case of the same phase-frequency characteristic of the said part of the transmission path and of the relevant components of the local test pulse pattern generator.

58. A system as claimed in claim 1 in which the received adjusting signal is passed over a spectrum converter, wherein the reference signal generator has a phase shifting network at its output which brings about a phase shift of the frequency component of the adjusting signal, which shift is the same as that in the spectrum converter.

59. A system as claimed in claim 58, wherein the phase shifting network is constituted at the output of the reference signal source by a spectrum converter in accordance with the spectrum converter over which the received adjusting signal is passed.

60. A system as claimed in claim 59, in which the spectrum converter is constituted by a difference producer to which the adjusting signal is applied directly on the one hand and on the other hand through a delay network, wherein the phase comparator has two phase detectors in the form of electronic switches which are fed in a parallel by the frequency component of the received adjusting signal selected in a sub-bandpass filter, one phase detector being controlled directly and the other phase detector being controlled through a delay network having the same time delay as that of the said spectrum converter by the phase reference signal from the reference source, while the phase control voltage is derived from the outputs of the two phase detectors through a difference producer connected to said outputs.

61. A system as claimed in claim 2, in which the received adjusting signal is passed over a spectrum converter which brings about a $\pi/2$ phase shift, the phase detectors in the phase comparators are cross-coupled with the sub-bandpass filter and the additional sub-bandpass filter.

62. A system as claimed in claim 1 for preset equalization in which an adjusting signal is transmitted prior to the signal transmission, wherein the phase and amplitude comparators in the system include storage networks and electronic switches, which electronic switches are released by switching pulses from a time distributor after the adjusting period for maintaining the generated phase and amplitude control voltages in the storage network during signal transmission.

63. A system as claimed in claim 1 adapted for preset equalization in which the adjusting signal is constituted by a periodic pulse pattern of a test pulse pattern generator, while the phase reference source includes a local test pulse pattern generator, wherein a pulse converter for generating the adjusting pulses for the local test pulse pattern generator is connected to the sub-bandpass filter of the output channel which passes the repetition frequency of the received test pulse pattern, said adjusting pulses adjusting the mutual time position of the received and the locally generated test pulse pattern at a fixed value which corresponds approximately to a time distance equal to half the delay time of the delay circuit of the frequency analyzer.

64. A system as claimed in claim 63, wherein the pulse converter is constituted by a slicer, a differentiating network and a threshold device which passes only pulses having a given polarity.

65. A system as claimed in claim 63, wherein an electronic relay is arranged in cascade with the pulse converter which relay is opened by switching pulses from a time distributor after the time adjustment of the local test pulse pattern generator.

66. A system as claimed in claim 62, wherein for the adaptive equalization the signal transmission and the transmission of the adjusting signal is effected in time division multiplex, the time distributor including a time division multiplex distributor which alternately releases and blocks the electronic switches in accordance with the rhythm in which the signals to be transmitted and the adjusting signal are received.

67. A system as claimed in claim 17, wherein for adaptive equalization the transmitted signal is combined with the adjusting signal originating from a pseudo-random pulse generator and that a corresponding local pseudo-random pulse generator is included in the equalization system which generator is connected to a phase detector in a phase control loop to which also the received signal constituted by the combination of the transmitted signals and the adjusting signal is applied for the purpose of generating a phase control voltage which after smoothing in a lowpass filter having a time constant which is longer than the repetition frequency of the received adjusting signal controls a frequency-determining member connected to the pseudo-random pulse generator.

68. A system as claimed in claim 67, wherein the pseudo-random pulse generator is constituted by a feed-back shift register having a number of shift register elements whose contents are shifted by a shift pulse generator.

69. A system as claimed in claim 66, wherein the adjusting signal is derived from the output of the equalization system for the purpose of synchronization of the reference signal generator in the reference source.

70. A system as claimed in claim 67, wherein a difference producer is connected to an output of the equalization system, constituted by a combination device, said difference producer being connected to the local pseudo-random pulse generator for suppressing the received adjusting signal.

71. A system as claimed in claim 70, wherein the adjusting signal from the pseudo-random pulse generator is passed through an attenuator before combination with the transmitted signals, the local pseudo-random pulse generator being likewise connected through an attenuator to the difference producer.

72. A system as claimed in claim 70, wherein for reducing the influence on synchronization of the pseudo-random pulse generator in the phase reference source by the transmitted signals, these signals are applied prior to combination of said signals with the adjusting signal to a signal transformation device and that an inverse signal transformation device is provided after the difference producer.

73. A system as claimed in claim 72 adapted for the transmission of pulse signals whose instants of occurrence are characterized by a fixed clock frequency, wherein the signal transformation device includes a spectrum converter which is provided with a difference producer to which output pulses from a modulo-2-adder are applied directly on the one hand and on the other hand through a shift-register having a time delay which is equal to an integral number of times the repetition period of the periodic pulse patterns of the pseudo-random pulse generator, the modulo-2-adder having inputs which are fed by the output pulses from the shift register and by the pulse signals to be transmitted, the inverse signal transformation device being constituted by a full-wave rectifier.

74. A system as claimed in claim 72 adapted for the transmission of pulse signals whose instants of occurrence are synchronized by a fixed clock frequency, the signal transformation device is constituted by a shift register whose output is fed back to the input through a modulo-2-adder to which modulo-2-adder also the pulse signals to be transmitted are applied, while the inverse transformation device is constituted identically as the signal transformation device while omitting the feedback, the output circuit of the inverse signal transformation device being constituted by a modulo-2-adder to which the input and the output of the shift register are connected.

* * * * *

UNITED STATES PATENT OFFICE

CERTIFICATE OF CORRECTION

Patent No. 3,845,390 Dated October 29, 1974

Inventor(s) FRANK DE JAGER ET AL

It is certified that error appears in the above-identified patent and that said Letters Patent are hereby corrected as shown below:

Col. 44, line 31, "$\tau$" should read --$\pi$--;

Col. 45, line 39, "synchronisation" should read --synchronization-

Signed and Sealed this

*eighteenth* Day of *November 1975*

[SEAL]

*Attest:*

RUTH C. MASON
*Attesting Officer*

C. MARSHALL DANN
*Commissioner of Patents and Trademarks*